US011558924B2

(12) United States Patent
Balasubramanian et al.

(10) Patent No.: US 11,558,924 B2
(45) Date of Patent: Jan. 17, 2023

(54) METHOD AND APPARATUS FOR SELECTIVELY RELEASING USER EQUIPMENT DEVICES TO EFFICIENTLY OPERATE AN ENTERPRISE WIRELESS COMMUNICATION NETWORK

(71) Applicant: Celona, Inc., Cupertino, CA (US)

(72) Inventors: Srinivasan Balasubramanian, San Diego, CA (US); Mehmet Yavuz, Palo Alto, CA (US); Preethi Natarajan, Saratoga, CA (US)

(73) Assignee: Celona, Inc., Campbell, CA (US)

( * ) Notice: Subject to any disclaimer, the term of this patent is extended or adjusted under 35 U.S.C. 154(b) by 63 days.

(21) Appl. No.: 17/318,930

(22) Filed: May 12, 2021

(65) Prior Publication Data
US 2022/0151019 A1    May 12, 2022

Related U.S. Application Data

(63) Continuation-in-part of application No. 17/214,655, filed on Mar. 26, 2021, which is a
(Continued)

(51) Int. Cl.
*H04W 76/30* (2018.01)
*H04W 76/38* (2018.01)
(Continued)

(52) U.S. Cl.
CPC .......... *H04W 76/38* (2018.02); *H04W 24/02* (2013.01); *H04W 24/08* (2013.01); *H04W 76/34* (2018.02); *H04W 84/12* (2013.01)

(58) Field of Classification Search
CPC . H04B 7/18539; H04B 7/18558; H04L 29/06; H04L 29/06176; H04L 49/253;
(Continued)

(56) References Cited

U.S. PATENT DOCUMENTS 9,647,918 B2    5/2017 Raleigh
2003/0236094 A1*  12/2003 Jami ..................... H04W 76/38
                                                                455/450
(Continued)

FOREIGN PATENT DOCUMENTS

BR    PI 0312065-1 B1    8/2017
WO    2022098558          5/2022
(Continued)

OTHER PUBLICATIONS

Carrasco et al., Techniques for advanced radio resource centralised management and 5G network coordination, Deliverable D3.1, 5G Essence, 212 pages, Jun. 30, 2018.*
(Continued)

*Primary Examiner* — Frank Duong
(74) *Attorney, Agent, or Firm* — Jaquez Land Greenhaus & McFarland LLP; Bruce W. Greenhaus, Esq.

(57) ABSTRACT

A method and apparatus for managing wireless Enterprise Networks (EN) for greater efficiency by developing inactivity timers for packet streams on bearers, monitoring the packet streams of UEs on the bearers, and if inactivity is found determining whether or not to release or modify a bearer, or maintain the current status of the UE considering factors such as congestion, expected lull time, reconstruction cost, and UE type and location. Accordingly, UEs can be more efficiently allocated the EN's available resources. To learn the timers, packet streams are monitored over a period of time, the packet streams are sorted by service type and bearer (and optionally time), and an inter-burst packet arrival time is determined. Timers are developed that provide inactivity time limits and an expected lull time that predicts the behavior of the packet streams based on service type and bearer, and optionally time.

19 Claims, 27 Drawing Sheets

Related U.S. Application Data continuation-in-part of application No. 17/126,839, filed on Dec. 18, 2020.

(60) Provisional application No. 63/111,516, filed on Nov. 9, 2020.

(51) Int. Cl.
  *H04W 76/34* (2018.01)
  *H04W 24/08* (2009.01)
  *H04W 24/02* (2009.01)
  *H04W 84/12* (2009.01)

(58) Field of Classification Search
  CPC ..... H04W 24/02; H04W 24/08; H04W 76/30; H04W 76/34; H04W 76/36; H04W 76/38; H04W 84/12
  See application file for complete search history.

(56) References Cited

U.S. PATENT DOCUMENTS

| | | |
|---|---|---|
| 2010/0195447 A1 | 8/2010 | George |
| 2012/0014332 A1 | 1/2012 | Smith et al. |
| 2012/0122405 A1* | 5/2012 | Gerber .............. H04W 52/0232 455/67.11 |
| 2012/0289232 A1 | 11/2012 | Ostrup et al. |
| 2014/0136709 A1 | 5/2014 | Chin et al. |
| 2014/0321282 A1 | 10/2014 | Pragada et al. |
| 2015/0312950 A1 | 10/2015 | Cartmell |
| 2016/0183156 A1 | 6/2016 | Chin et al. |
| 2016/0234877 A1 | 8/2016 | Bangolae et al. |
| 2016/0330602 A1 | 11/2016 | Das et al. |
| 2018/0007587 A1 | 1/2018 | Feldman et al. |
| 2019/0045371 A1 | 2/2019 | Fang et al. |
| 2019/0215729 A1 | 7/2019 | Oyman et al. |
| 2020/0068411 A1 | 2/2020 | Vagelos |
| 2020/0205062 A1 | 6/2020 | Azizi et al. |
| 2021/0243651 A1* | 8/2021 | Syed .................... H04B 17/318 |
| 2021/0360739 A1* | 11/2021 | Cui ...................... H04W 4/027 |
| 2022/0007199 A1 | 1/2022 | Mahalingam |
| 2022/0070682 A1 | 3/2022 | Mahalingam |
| 2022/0150752 A1 | 5/2022 | Balasubramanian et al. |
| 2022/0150760 A1 | 5/2022 | Balasubramanian et al. |

FOREIGN PATENT DOCUMENTS

| | | |
|---|---|---|
| WO | 2022098560 | 5/2022 |
| WO | 2022098561 | 5/2022 |

OTHER PUBLICATIONS

Thomas, Shane, International Search Report and Written Opinion received from the USRO dated Jan. 26, 2022 for appln. No. PCT/US21/57110, 39 pgs.

Rodriguez, Kari, International Search Report and Written Opinon received from the USRO dated Jan. 31, 2022 for appln. No. PCT/US21/57107, 16 pgs.

Rodriguez, Kari, International Search Report and Written Opinon received from the USRO dated Feb. 1, 2022 for appln No. PCT/US21/57114, 14 pgs.

Duong, Frank, Office Action received from the USPTO dated Jun. 24, 2022 for U.S. Appl. No. 17/126,839, 18 pgs.

* cited by examiner

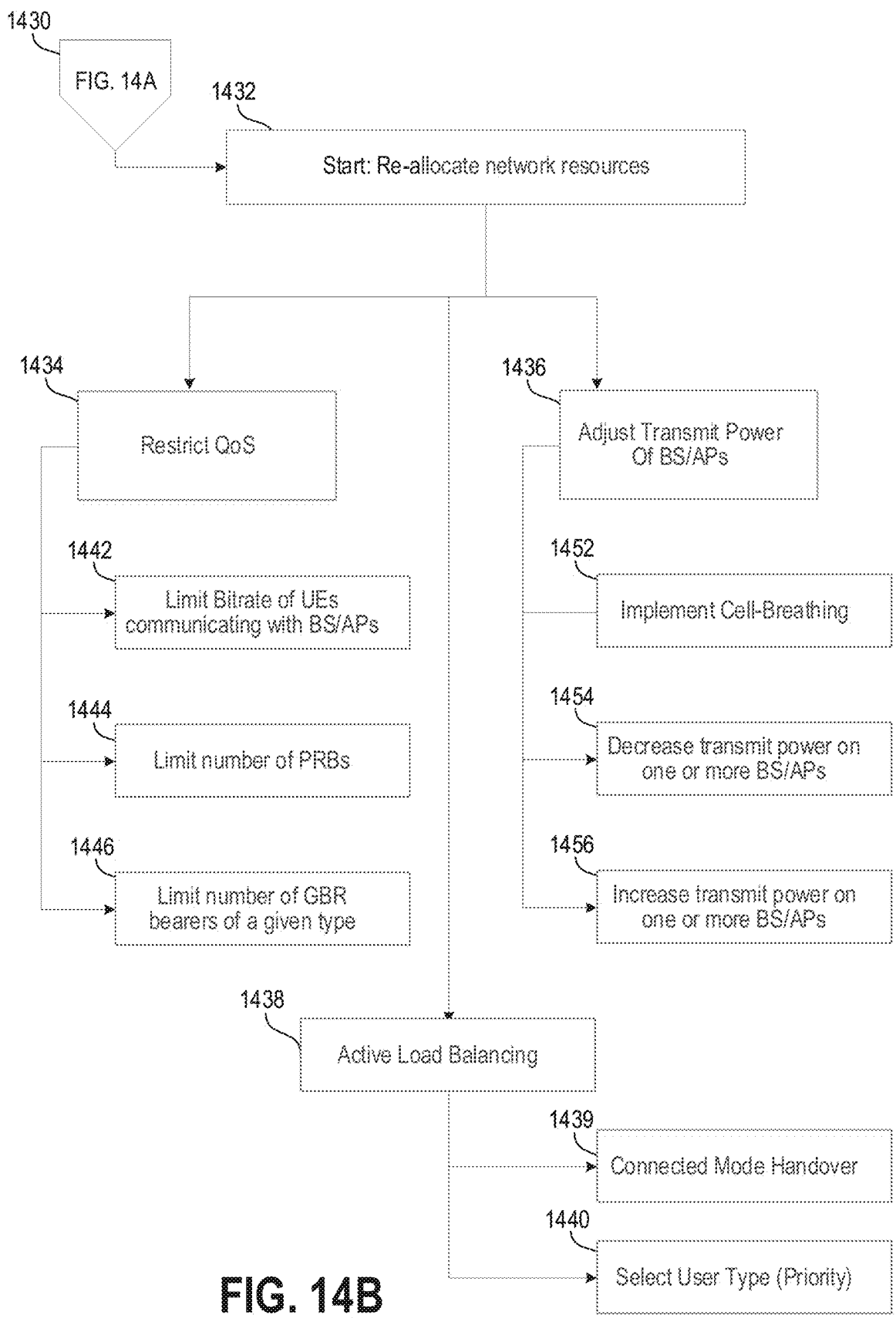

METHOD AND APPARATUS FOR SELECTIVELY RELEASING USER EQUIPMENT DEVICES TO EFFICIENTLY OPERATE AN ENTERPRISE WIRELESS COMMUNICATION NETWORK

CROSS-REFERENCE TO RELATED APPLICATIONS

Claim of Priority

The present application is a Continuation-in-Part and claims priority to commonly-assigned and co-pending U.S. application Ser. No. 17/214,655, filed Mar. 26, 2021, entitled "Method and Apparatus for Determining Wireless MNO Coverage and Efficiently Operating an Enterprise Wireless Communication Network". Application Ser. No. 17/214,655 is a Continuation-in-Part and claims priority to commonly-assigned and co-pending U.S. application Ser. No. 17/126, 839, filed Dec. 18, 2020, entitled "Method and Apparatus for Load Control of an Enterprise Network on a Campus Based Upon Observations of Busy Times and Service Type". Application Ser. Nos. 17/214,655, 17/126,839, and the present application, claims priority to U.S. Provisional Application No. 63/111,516, filed Nov. 9, 2020, entitled "Method and Apparatus for Load Control of an Enterprise Network on a Campus Based Upon Observations of Busy Times and Service Type", which are all incorporated by reference in their entirety.

BACKGROUND

Technical Field

The disclosed method and apparatus relate to methods and apparatus for efficiently managing network operations on an enterprise wireless communication network at a campus location, and particularly for managing network operations by developing inactivity measures for an individual enterprise network, monitoring packet streams for inactivity indications, and selectively releasing resources for use by others.

Background

The wireless industry has experienced tremendous growth in recent years. Wireless technology is rapidly improving, and faster and more numerous broadband communication networks have been installed around the globe. These networks have now become key components of a worldwide communication system that connects people and businesses at speeds and on a scale unimaginable just a couple of decades ago. The rapid growth of wireless communication is a result of increasing demand for more bandwidth and services. This rapid growth is in many ways supported by standards. For example, 4G LTE has been widely deployed over the past years, and the next generation system, 5G NR (New Radio) is now being deployed. In these wireless systems, multiple mobile devices are served voice services, data services, and many other services over wireless connections so they may remain mobile while still connected.

Wireless networks have a wide range of applications and uses. Enterprises particularly have a great interest in implementing wireless networks at their locations (campuses), and implementing digital solutions generally, to improve efficiency and reduce costs. Enterprises benefit from optimizing their computing, storage and networking infrastructure, and improving performance of the business applications. For this purpose, wireless network systems that make effective use of the spectrum within a business enterprise for wireless communication, improve the efficiency of communication within the organization and between the organization and the external entities. This improved communication capability increases business efficiency and reduces cost.

Enterprise Networks and MNOs

An enterprise wireless communication network (EN) is one type of private network, which is operated for use within a limited area by a limited group of authorized users. One or more ENs can be created at a location such as a warehouse, factory, research center or other building, and are usually operated by an organization for its own use. Other types of private networks may be operated by a private network manager for use by more than one organization.

Communication Network Configurations

FIG. 1 is an illustration of a basic configuration for a communication network 100, such as a "4G LTE" (fourth generation Long-Term Evolution) or "5G NW" (fifth generation New Radio) network. Through this network configuration, user equipment (UE) 101 can connect to External Packet Data Networks (PDNs) 103 and access any of a variety of services such as the Internet, Application Servers, Data Services, Voice Services, and others. UEs, BS/APs As used herein, the term "UE", or "devices", or "UE devices" refers to a wide range of user devices having wireless connectivity, such as a cellular mobile phone, an Internet of Things (IOT) device, virtual reality goggles, robotic devices, autonomous driving machines, smart barcode scanners, and communications equipment including for example cell phones, desktop computers, laptop computers, tablets and other types of personal communications devices. In some cases, the UEs may be mobile; in other cases, they may be installed or placed at a fixed position within a campus location. In the illustration of FIG. 1, the UEs 101 include a first mobile phone 101a, a second mobile phone 101b, a laptop computer 101c (which can be moved around), and a printer 101d (typically situated at a fixed location). In other examples, the UEs may include factory sensors installed at fixed locations from which they can remotely monitor equipment such as an assembly line or a robotic arm's movement.

The UEs 101 connect wirelessly over radio communication links 105 to a Radio Access Network (RAN) 107 that typically includes multiple base station/access points (BS/APs) 109 that include antennas, amplifiers and other electrical and control units for communicating with the UEs. Typically, the radio communication links 105 operate using a Radio Resource Control (RRC) protocol, which is managed by circuitry in the BS/APs. One of the advantages of such wireless networks is their ability to provide communications to and from multiple wireless devices and provide these wireless devices with access to a large number of other devices and services even though the devices may be mobile and moving from location to location.

The term "BS/AP" is used broadly herein to include base stations and access points, including at least an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, a Wide Area Network (WAN) access point, and should also be understood to include other network receiving hubs and circuitry that provide access to a network of a plurality of wireless transceivers within range of the BS/AP. Typically, the BS/APs are used as transceiver hubs, whereas the UEs are used for point-to-point communication and are not used as hubs. Therefore, the BS/APs transmit at a relatively higher power than the UEs.

Core Network

The RAN 107 connects the UEs 101 with the Core Network 111, which provides an interface between the RAN 107 and other networks. The Core Network can have multiple functions. In one important function, the Core Network 111 provides access to other devices and services either within its network, or on other networks such as the External PDNs 103. Particularly, in cellular networks and in private networks, the BS/AP 109 can receive wireless signals from, and send wireless signals to, the UEs 101. The RAN 107 is coupled to the Core Network 111; therefore, the RAN 107 and the Core Network 111 provide a system that allows information to flow between a UE in the cellular or private network and other networks, such as the Public Switched Telephone Network (PSTN) or the Internet. Wireless data transmission between a UE 101 and the BS/AP 109 occurs on an assigned channel, such as a specific frequency. Data transmission between the BS/AP 109 and the Core Network 111 utilizes any appropriate communication means, such as wireless, cable, and fiber optic.

In addition to providing access to remote networks and allowing information to flow between the cellular network and the external PDNs 103, the Core Network 111 includes RAN Control Units 113 that manage the wireless network and provide control of the air interface between the BS/AP 119 and the UEs 101. The Core Network 111 may also coordinate the BS/APs 109 to minimize interference within the network.

CBRS Networks

One type of wireless network that recently became available for general use by enterprise locations is a Citizen's Broadband Radio Service (CBRS) network, which utilizes the CBRS radio band of 3550-3700 MHz, nominally divided into fifteen channels of 10 MHz each. Particularly, the US Federal Government recently approved use of the CBRS band of the frequency spectrum and finalized rules (Rule 96) that allow general access to the CBRS band. The CBRS rules set forth detailed requirements for the devices that operate in a CBRS network and how they communicate. CBRS supports both LTE and 5G devices. CBRS provides enormous wireless networking power to organizations that have never had such option before and opens up and creates opportunities for a range of new applications.

FIG. 2 is a diagram of an example of a CBRS wireless communication network 200. In FIG. 2, a plurality of BS/APs 202 are deployed within a location 203 on the enterprise's campus, providing service to a plurality of UEs 204. In a CBRS system, the BS/APs may be termed CBSDs.

In FIG. 2, each BS/AP 202 has a range that represents its respective wireless coverage. A first UE 202a is wirelessly connected to a first BS/AP 204a, which is providing service to it. A second UE 204b is wirelessly connected to a second BS/AP 202b, and is providing service to that second UE 204b. Other UEs 204 connect to their respective BS/APs, for example third UE 204c, fourth UE 204d, fifth UE 204e, sixth UE 204f, and seventh UE 204g are shown in the enterprise location 203. All the BS/APs are connected to an operator Core Network 222 by any appropriate communication means, such as wire, fiber optic, wireless radio and/or a PDN 220. The operator Core Network 222 includes components such as an OAM Server 207, a SON assist unit 208, a Domain Proxy 209, an Automatic Configuration Server (ACS) 210, a Location Database 211, and other databases 212, all of which are connected to each other within the operator Core Network 222 by any appropriate means. The operator Core Network 222 is connected to an SAS 232, which is connected to a Spectrum Database 233 that includes data regarding the spectrum that it is managing. Collectively, the SAS 232 and the Spectrum Database 233 are referred to as a Spectrum Management Entity (SME) 234.

Base stations (BS/APs) within a CBRS network are termed "CBSDs", and UEs are termed End User Devices (EUDs). CBSDs are fixed Stations, or networks of such stations, that operate on a Priority Access or General Authorized Access basis in the Citizens Broadband Radio Service consistent with Title 47 CFR Part 96 of the United States Code of Federal Regulations (CFR).

Regardless of complexities, the CBRS band provides an opportunity to create new wireless networks, and there is a desire for utilizing and making maximum use of spectrum in the CBRS band while following the rules pertaining the CBRS usage, including effectively responding to directions from the SAS.

Generally, in an enterprise wireless network there is a need for efficient use of resources, for cost reasons of course, but also to provide high levels of service to the UEs attached to the wireless network. Therefore, managing enterprise networks to more efficiently allocate the available network resources is an important objective.

SUMMARY

The following description discloses a method and apparatus for managing wireless Enterprise Networks (EN) for greater efficiency by developing an inactivity timer for packet streams on bearers, monitoring the packet stream activity of UEs on the bearers, and determining whether to release a bearer, modify the bearer, or maintain the current status of the UE on the bearer to provide better utilization of the EN's communication resources. Accordingly, UEs wirelessly connected to the EN, and UEs that request to be wirelessly connected to the EN, can be more efficiently allocated the EN's available resources, which allows greater overall UE utilization of the available resources.

The following description discloses a method and apparatus that monitors packet communications over a period of time and learns a timer that provides an inactivity limit for short communication pauses that typically occur between bursts of activity in the packet streams in the communication traffic through the bearers of the particular EN. This inactivity time limit provides an inactivity time limit and an expected lull time that predicts the behavior of the packet streams based on service type and bearer, which allows the EN to more efficiently allocate network resources. The inactivity timer may also be based upon time: time of day, day of week.

The method and apparatus monitors real-time communication and utilizes the inactivity timer to determine whether or not to release a UE from a bearer. Particularly, the method and apparatus monitors packet communications on those bearers, determines and appropriate inactivity timer based upon service type and bearer, and optionally time. If the inactivity time limit is exceeded, then a decision is made that determines whether or not to release the bearer from a UE considering factors such as congestion, predicted congestion, expected lull time, probability and cost of reconstruction, service type, UE type, the UE's subscription type, and UE location. If the UE is released or modified due to inactivity, then the bearer may be reassigned to another UE for active use.

The term "bearer" is used broadly herein and includes communication links between two or more nodes in a communication system. In a Core Network, a bearer is an end-to-end communication link that defines a particular Quality of Service (QoS), so that communications assigned to that bearer by the network can be promised the QoS suitable for its needs. Generally, a single core network bearer can carry multiple packet streams; for example, core network bearers may include two types: one type restricted to specific UEs and another type that carries traffic for a group of UEs, such as network slice/application-type bearers. In a Radio Access Network (RAN), a Radio Bearer (RB) provides a bearer for a single UE, which provides communication between the UE and the RAN Network. The core bearers may span across an enterprise edge, a DC/private cloud, a metro edge, and/or a public cloud, based on the node where the functions are deployed. A DC refers to a "Data Center, and a DC/private cloud is a virtualized cloud running in the private data center of an enterprise.

Various methods and apparatus are disclosed herein. A method is disclosed of releasing a wireless User Equipment device (UE) from a bearer assigned to the UE by a wireless Enterprise Network (EN) to provide an assigned path for a packet stream with the UE. The EN provides bearers that define assigned paths for a plurality of packet streams with a plurality of UEs. The method includes learning a plurality of inactivity timers, including monitoring a plurality of packet streams in the EN over a period of time, determining the service type of each of the plurality of packet streams, responsive to the packet streams, bearers, and service types, determining an inter-burst packet arrival time for each service type and bearer (and optionally time), and responsive to the inter-burst arrival time, learning a timer for each service type and bearer, including an inactivity time limit. Once the timer has been learned, a plurality of packet streams in the EN are monitored in real time, including determining a service type and bearer for each packet stream. Responsive to the service type and bearer (and optionally time), an inactivity timer is selected for each packet stream. Responsive to the inactivity time limit for each packet stream, a determination is made whether or not to release a UE from the bearer associated with the UE. If a determination is made to release the UE from the bearer, then the UE is released.

A network apparatus is disclosed for proactively releasing UEs from bearers of packet-based communication traffic in a wireless Enterprise Network (EN) communication system. The apparatus includes a packet stream monitoring and data processing module for monitoring, collecting, and processing packet stream data on communication traffic on at least one of the bearers, an inter-burst packet arrival time unit connected to the module for calculating the interpacket arrival time responsive to the packet stream data, an inactivity timer learning unit for learning an inactivity timer including an inactivity limit and an expected lull time responsive to the inter-burst packet arrival time, a data storage unit for storing the inactivity timer; and a UE release decision unit responsive to the inactivity timer.

In some embodiments the enterprise wireless network operates on the Citizen's Broadband Radio Service (CBRS band), the BS/APs in the RAN comprise CBRS Devices (CBSDs) that are located at a campus location and form part of an enterprise network. A CBRS system is a spectrum-controlled system in which the CBSDs must be registered before operation in order to avoid interference with other users such as incumbent users that have higher priority to use the CBRS band. In alternative implementations, other network architectures and other technologies, such as mm wave, or spectrum purchased/licensed from others, could be utilized.

BRIEF DESCRIPTION OF THE DRAWING

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIGS. 14A and 14B are flow charts that combine to show operations to learn busy times in a wireless communication network and anticipate and control the load on the radio link to provide service to the UEs attached to the BS/APs. Particularly, FIG. 14A is a flow chart that shows overall load control operations based upon predicted congestion, and FIG. 14B is a flow chart of operations to allocate resources.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION (1) Enterprise Network

Enterprise wireless communication networks have been moving towards digital solutions and therefore are continually searching to optimize their computing, data storage and networking infrastructures to provide optimal performance of their applications and connectivity for their users. For this purpose, wireless network systems are being developed to make effective use of the wireless spectrum available on the enterprise's campus locations. More efficient use of spectrum improves communication capabilities, reduces costs, and increases organizational efficiencies.

An implementation of an enterprise wireless communication network (EN) at a campus location is described herein. The term "enterprise" is used herein in its broadest sense to include any organization, such as businesses, research organizations, schools, colleges, hospitals, industry organizations, and any other organization, regardless of whether or not for profit. The term "campus" is used in its broadest sense to include any area in which the enterprise operates, such as the grounds and/or buildings operated or managed by the enterprise, college campuses, research centers, industrial complexes, any business or industrial site, and others.

An enterprise wireless communication network (EN) is one type of private network. Private networks are operated for use within a limited area by a limited group of authorized users, whereas public networks generally cover a larger area and are open for use by anyone that subscribes to the service by the network operator. One or more ENs can be created at a location such as a warehouse, factory, research center or other building, and are usually operated by an organization for its own use. Other types of private networks may be operated by a private network manager for use by more than one organization.

Although described in the context of an enterprise wireless communication network, the principles disclosed can also apply to any private wireless network that has a campus in which wireless coverage is provided by external wireless providers (PSPs), within at least some region of the campus.

(2) Campus Location, Wireless Coverage, EN and MNO

Figure 1:
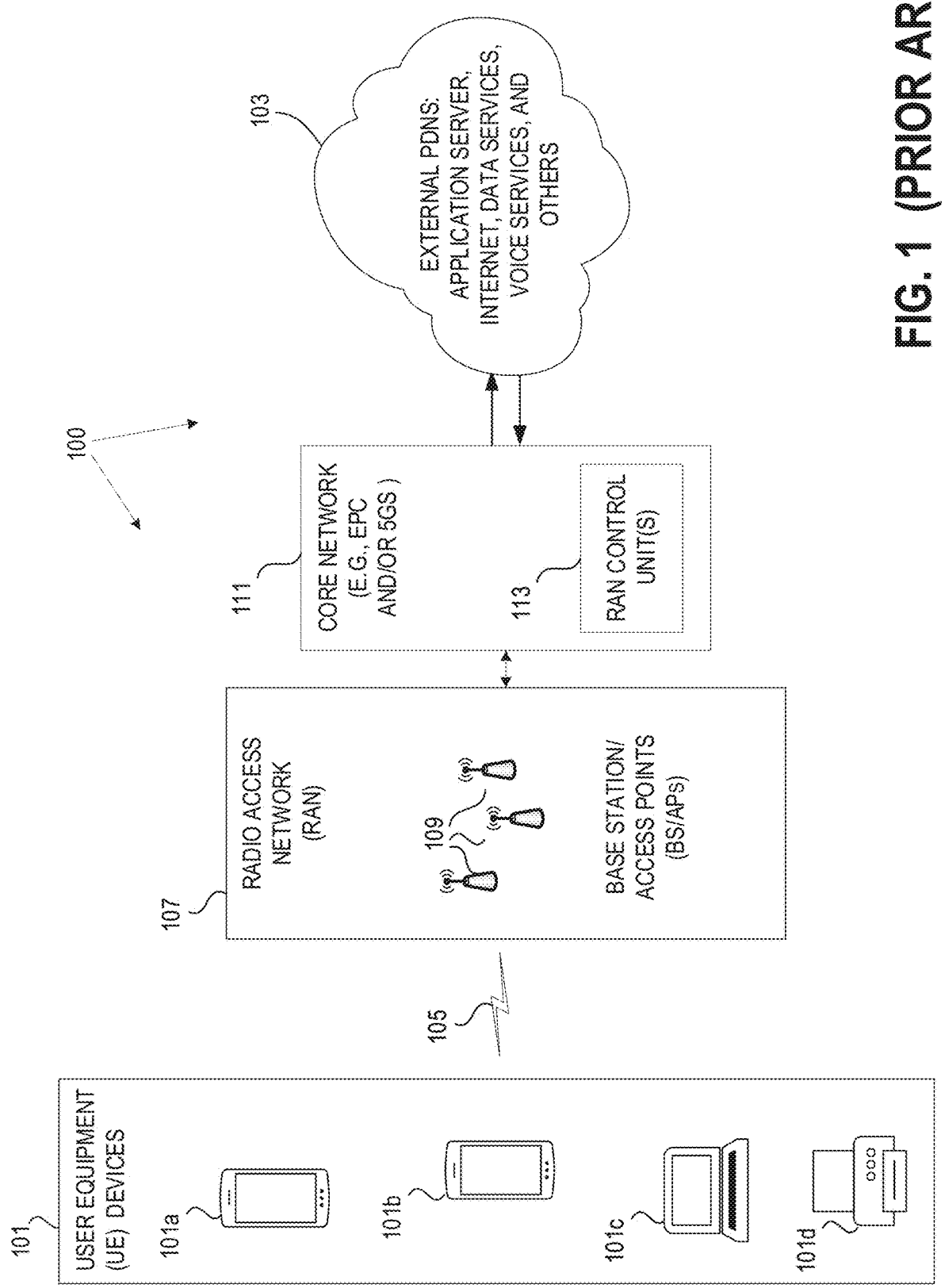
FIG. 1 is an illustration of a basic configuration for a communication network, such as a "4G LTE" (fourth generation Long-Term Evolution) or "5G NR" (fifth generation New Radio) network.
Figure 2:
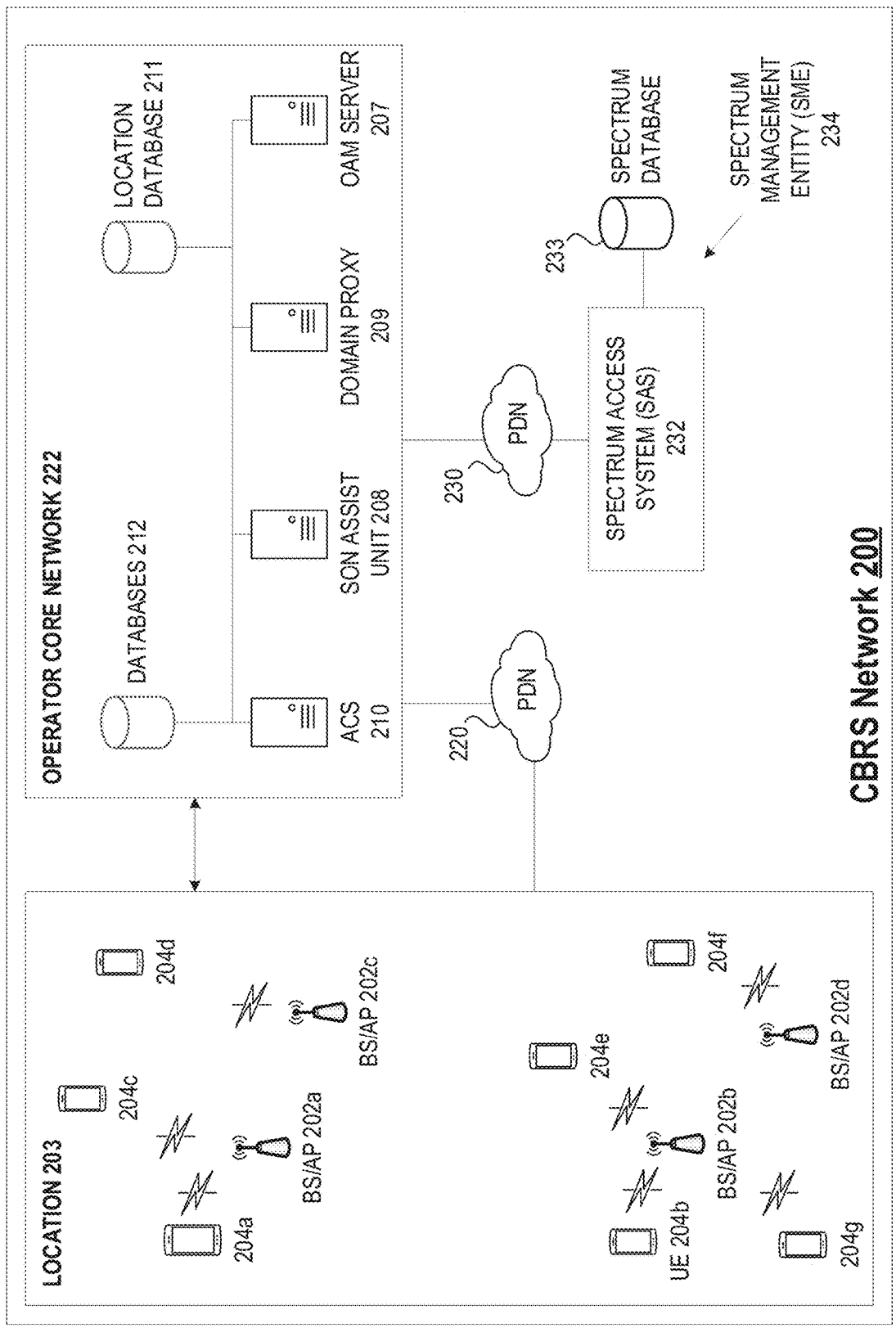
FIG. 2 is a block diagram of a wireless communication network in which a CBRS system is implemented, including BS/APs deployed at an enterprise location, UEs wirelessly connected to them, and an operator network connected to a Spectrum Management Entity (SME).
Figure 3:
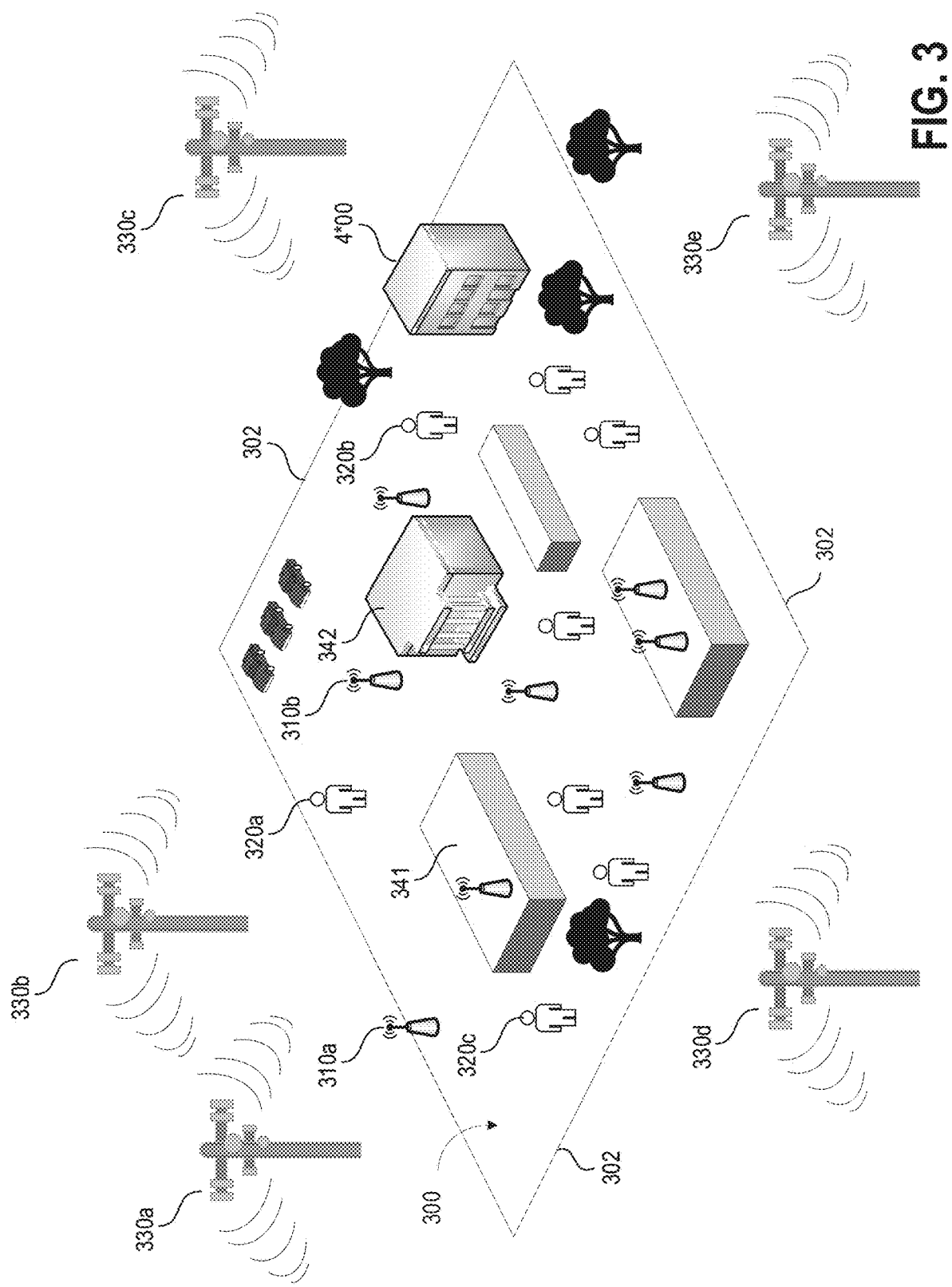
FIG. 3 is a perspective illustration of a campus location in which a plurality of BS/APs of an Enterprise Network (EN) are installed to provide wireless coverage to a plurality of mobile users.
Figure 4:
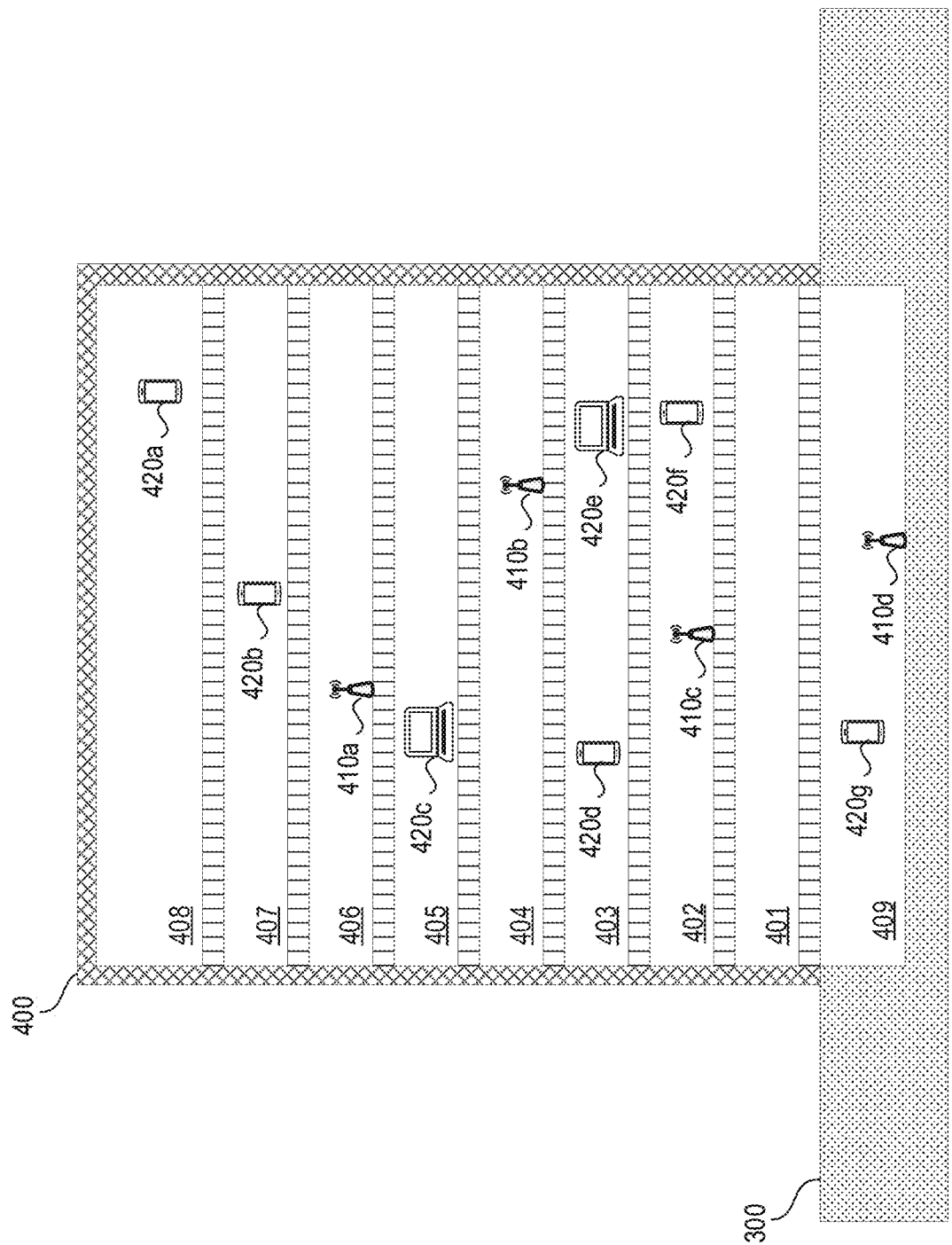
FIG. 4 is a cross-sectional view of a building on the campus location in which BS/APs are installed on different floors.
Figure 5:
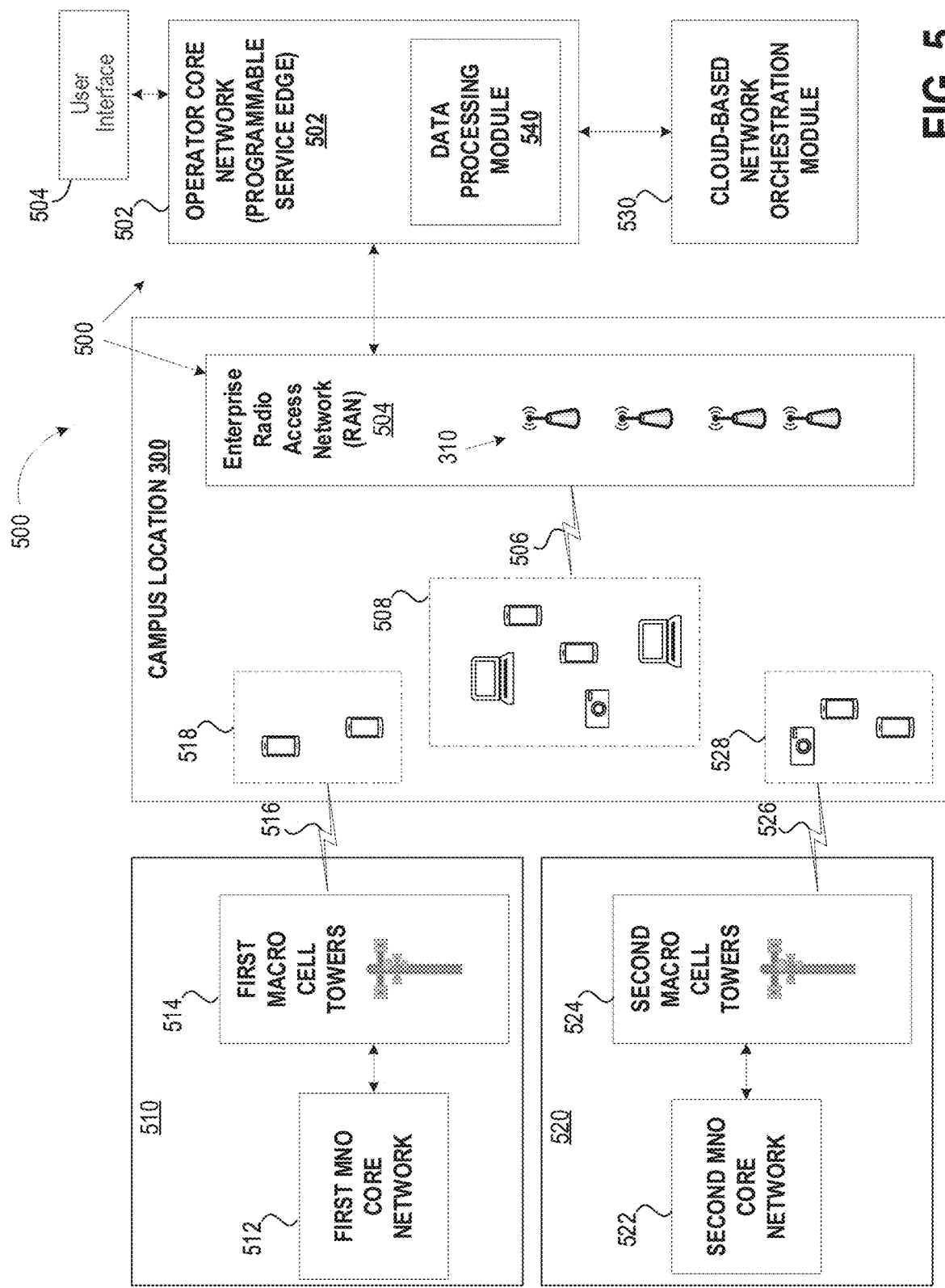
FIG. 5 is a block diagram of an Enterprise Network that provides wireless coverage on the campus location, and a Mobile Network Operator (MNO) Network that has wireless coverage on at least part of the campus location.
Figure 6:
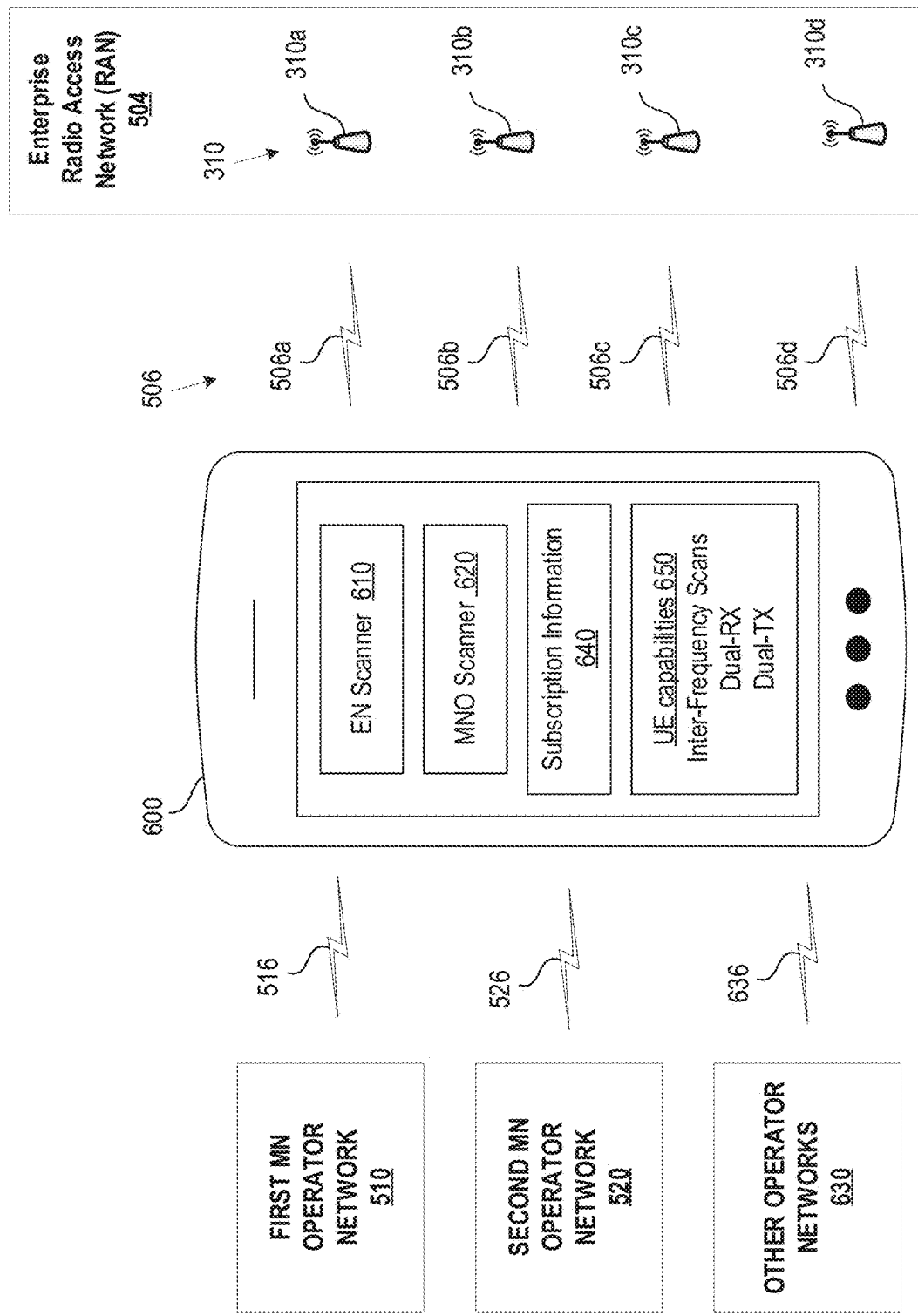
FIG. 6 is a diagram of a mobile phone, illustrating functional components that can be utilized as one of the UEs on the campus location.

FIG. 3 is a perspective illustration of a campus location 300 that has wireless coverage. FIG. 4 is a cross-sectional view of a building 400 on the campus location 300. FIG. 5 is a block diagram of an Enterprise Network 500 that provides wireless coverage on the campus location 300 and an MN Operator (MNO) Network that has wireless coverage on at least part of the campus location 300. FIG. 6 is a diagram of a mobile phone 600, illustrating functional components that can be utilized as one of the UEs on the campus location 300. The following discussion refers collectively to FIGS. 3, 4, 5, and 6.

FIG. 3 is a perspective illustration of a campus location 300 in which a plurality of BS/APs including at least a first BS/AP 310a, a second BS/AP 310b (collectively 310) of an Enterprise Network (EN) 500 are installed to provide wireless coverage to a plurality of mobile users such as a first user 320a a second user 320b, and a third user 320c (referred to collectively as 320). Each mobile user 320 may be carrying one or more UEs such as a mobile phone, laptop computer, or some other device that can be connected to the EN 500.

The campus location 300 defines a boundary perimeter 302, and the BS/APs 310 are deployed within the boundary 302. The positions and configuration of the BS/APs 310 deployed within the campus location 300 are selected to provide wireless coverage to the plurality of users 320 for the Enterprise Network (EN) 500. The BS/APs 310 may be installed indoors and outdoors, and may comprise any type of BS/AP. The BS/APs 310 generally provide wireless coverage substantially throughout the campus location 300, indoor and outdoor, with coverage usually extending to surrounding areas at least to some extent. In one embodiment the BS/APs 310 comprise CBSDs and the EN 500 includes a CBRS network. In some embodiments some of the BS/APs 310, particularly the BS/APs installed indoors, have a UE built into them. These built-in UEs can be used for making measurements that can be used to determine the MN footprint information, as described herein.

In addition to the wireless coverage at the campus location provided by the BS/APs 310 (of the EN 500), there may be other, external networks that provide wireless coverage, at least to some extent, in some regions of the campus. For purposes of description, these external networks will be referred to as Macro Networks (MNs). Often, this other coverage is provided by large well-known mobile networks operators (MNOs), using relatively high-power signals from antennas on the top of tall Macro Network (MN) towers such as a first tower 330a, a second tower 330b, a third tower 330c, a fourth tower 330d, and a fifth tower 330e (collectively 330) that may be located some distance outside the campus location 300. Although usually the MN towers 330 are located outside the campus location 300, in some cases one or more MN towers (possibly smaller cell towers) may be located within the campus boundaries 302. Each of the MN towers 330 may be utilized by one MNO or by two or more MNOs.

Within any campus location 300, the RF environment can vary due to a variety of causes. Physical obstacles like buildings 341, 342, and 400 affect the RF environment, also the relative positioning of the transmitters and UEs, interference, campus layout, features, and building construction: walls, materials, carpeted/non-carpeted all can affect the RF environment and may vary widely between locations. Some of the RF effects are unchanging (static), but others, such as interference can change over time. This variation in RF environment can cause wireless coverage variations that can adversely affect the EN's ability to provide adequate service to the UEs throughout the campus location. Complicating the EN's role in providing adequate service are issues such as variations in types of users (UEs), device types, types of services operating on the network, times of usage, grades of services, and network loading in general.

Figure 7:
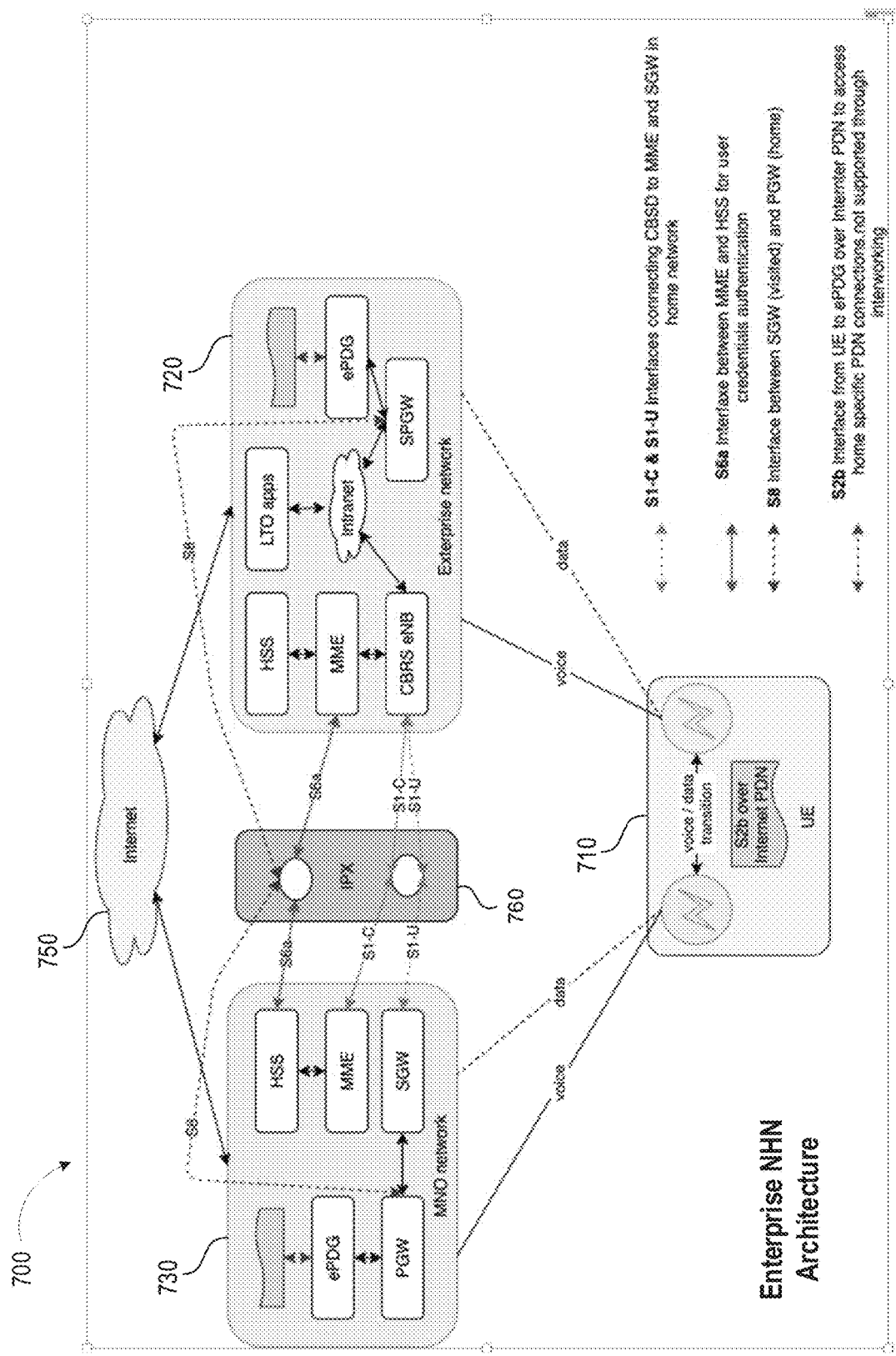
FIG. 7 is a block diagram of one example of a Neutral Host Network (NHN), which is an interconnected network configuration that allows a UE to connect with an MNO network via the EN.

Regarding MNO networks, although their wireless coverage can extend a long distance from the higher-power MN towers 330, the RF environment of the campus location 300 also affects MNO wireless coverage within the campus, particularly within buildings. To address this issue, MNOs have developed partnerships with ENs that provide for interworking with their MNO networks. A Neutral Host Network (NHN), one example of which is shown in FIG. 7, provides interworking between an EN and one or more MNOs, allowing a UE to connect to the MNO through the EN, which allows the MNO to be treated as a home network even though the UE is connected to the EN. Generally, an NHN is an enterprise network that allows UE devices to connect to an MNO through established business arrangements with the MNO.

(3) In-Building Wireless Coverage

FIG. 4 is a cross-sectional view of a building 400 on the campus location 300 in which a plurality of BS/APs of the RAN of the EN 500 are installed on different floors. In this example, a first BS/AP 410a is installed on the sixth floor 406, a second BS/AP 410b is installed on the fourth floor 404, a third BS/AP 410c is installed on the first floor 401, and a fourth BS/AP 410d is installed in the basement 409. As discussed previously, it is very unlikely that the MN signals from the towers 330 will penetrate to the basement 409 as well as the interior of the building 400, and therefore the installation of BS/AP 410d in the basement and the interior of the building can be very useful to extend coverage. In some embodiments, the indoor BS/APs 410 have a UE built into them. These UEs can be used for making measurements that can be used to determine the MN footprint information.

(4) EN and MNs on a Campus Location

FIG. 5 is a block diagram that shows a first MNO network 510, a second MNO network 520, and an EN 530 all providing wireless coverage to a plurality of UEs on the campus location 300. The UEs are grouped in the block diagram by the network to which they are connected: a first group of UEs 518 is wirelessly connected to the first MNO network 510, a second group of UEs is wirelessly connected to the second MNO network 520, and a third group of UEs is wirelessly connected to the EN 530. The placement of the UEs on the block diagram of FIG. 5 is intended to show the UEs' wireless connections wherever they may be on the campus, and does not necessarily represent their physical position in the campus location.

The first MNO network 510 includes a first MNO Core Network 512 connected to a first group 514 of MN towers such as the first MN tower 330a and the second MN tower 330b that wirelessly connect via a wireless link 516 to UEs in the first UE group 518. The second MNO network 520 includes a second MNO Core Network 512 connected to a first group 514 of MN towers such as the third MN tower 330c and the fourth MN tower 330d that wirelessly connect via a wireless link 516 to UEs in the first UE group 518. The MNO network towers may include macro cells, outdoor CBRS, indoor CBRS, and the MNO networks may be traditional large mobile carriers, a CBRS system, or others.

The EN 500 includes a radio access network (RAN) 504 that includes the plurality of BS/APs 310 wirelessly communicating with a plurality of UEs including the third UE group 508 over a wireless link 506. As described earlier, the BS/APs 310 are installed in the campus 300. The RAN 504 may also include other functional components, some of which may be on the campus 300, and others may be located externally, such as in the Core Network 502. The placement of the BS/APs 310 on the block diagram of FIG. 5 is intended to show wireless, as connections wherever they may be on the campus, and does not necessarily represent the BS/APs' physical position in the campus location.

The EN 500 also includes an Operator Core Network 502 (also called a Programmable service edge or "PSE") that provides a variety of services for the network, which is described in more detail with reference to FIGS. 8 and 9. The BS/APs in the RAN 504 are connected to, and operated and controlled by, the EN Operator Network 500. Some of the RAN services may be provided by the Core Network 502. A User Interface 504 is provided and connected to the Core Network 502 for administration. In some embodiments the EN 500 also includes a cloud-based network orchestration module 530 that provides administrative services, databases, and other functional units such as machine learning and artificial intelligence units.

(5) UE Capabilities

FIG. 6 is a diagram of a mobile phone UE 600, which is one example of a UE carried by users 320 on the campus location 300. Mobile phones have many capabilities; the diagram of FIG. 6 illustrates some of the functional components that can be utilized in one or more of the UEs. Generally, as the users travel through campus location 300, the plurality of mobile UEs measures signals from the plurality of BS/APs, and the mobile UEs also measure one or more wireless signals from the plurality of MNs that it can detect.

The UE 600 includes frequency scanners that look for wireless signals, and if found, measure signal qualities such as the Reference Signal Received Power (RSRP). As shown in FIG. 6, an MNO scanner 620 in the UE 600 scans appropriate frequencies and looks for wireless signals 516 from the first MNO Network 510, looks for wireless signals 526 from the second MNO Network 526, and looks for wireless signals 636 from other operator networks 630. If any of these signals are found, then signal qualities are measured.

An EN scanner 610 in the UE 600 scans EN-RAN bands for wireless signals 506 from the BS/APs 310 in the RAN 504. Particularly, the EN scanner 610 looks for wireless signals from all the BS/APs, and measures signal qualities from those within its range. In FIG. 6, the UE 600 looks for a first wireless signal 506a from a first BS/AP 310a, a second wireless signal 506b from a second BS/AP 506b, a third wireless signal 506c from a third BS/AP 310c, and a fourth wireless signal 506d from a fourth BS/AP 310d. Any of the signals 506 that are detectable are measured by the UE 600.

The UE 600 also maintains subscription information 640 for all the networks that it can connect to. Each UE 600 has subscription information 640 that gives it access to one or more of the MNOs, the EN, and other operator networks 630 to which it is subscribed. If the UE 600 detects a signal from a network, and if the UE 600 is a subscriber to that particular network, the UE 600 may request admission (i.e., entry) to the network using the credentials in the subscription information 640, and if authenticated, then the UE 600 can be admitted. UEs typically have service subscriptions with one or more wireless networks. The subscriptions can belong to any Macro (or Mobile) network operator (MNO), a Multiple System Operator (MSO), Mobile Virtual Network Operator (MVNO) (collectively termed MNOs herein) or a private enterprise network operator. Each UE in the EN can also have a subscription with one or more MNOs that may also have coverage on the campus, which presents an opportunity to offload some or all of the services being provided to a UE by the EN to an MNO, and vice versa, if it can be determined whether or not coverage exists in the area where the UE is operating.

As mentioned above, any UE can have many capabilities that are implemented in functional units. Each UE can have different capabilities, and it can be useful for a network to know the capabilities of the UEs to which it is connected. Therefore, each UE 600 can provide a description of its capabilities 650 to a requesting network. Examples of such capabilities 650 are dual-RX, dual-TX, and inter-frequency scans.

(6) Neutral Host Network (NHN)

FIG. 7 is a block diagram of one example of a Neutral Host Network (NHN) 700, which is an interconnected network configuration that allows a UE to connect with an MNO network via the EN 500. An EN (and more generally any deployed network) that can accommodate users with subscriptions from different operators, and the UE treats these networks to be same as their home network is considered to be an NHN. Any given MNO network (MN) and enterprise network (EN) can be enabled to act as an NHN. The home network operators that allow for connectivity into the neutral host networks may be called Participating Service Providers (PSP).

The NHN of FIG. 7 is connected to a UE 710 that has capabilities to connect to either an EN 720 or an MNO network 730. The UE 710 can separate voice communications from data communications, so that voice may be communicated over the MNO network 730 while data may be communicated over the EN 720, for example. Both the EN 720 and the MNO network 730 are connected to the Internet 740, and therefore the UE 710 can connect to the Internet 740 through either network.

The EN 720 and the MNO network 730 are connected via an appropriate network interface such as the IPX interface 760 and bearers S8, S6a, S1-C and S1-U. IPX refers to Internetwork Packet Exchange which is a network layer protocol that may also act as a transport layer protocol.

A central concept of an NHN is sharing deployed network components; for example, by routing the MNO call through the EN, many resources are effectively shared: antennas, access networks, transmission, Spectrum, RF Design/Planning, and Core Network. Advantageously, this sharing can effectively extend the coverage of the MNO networks.

One of the key aspects that allows for the network sharing is spectrum. For example, as discussed elsewhere, the FCC opened the CBRS band to the public defining specific procedures for how to acquire part of the spectrum for localized use. Given this spectrum can be used by any of the network operators both public and private, this creates a certain ecosystem of end user devices and networks that can support offload. This offload to the NHN based on the business agreement can be aggressive to accommodate immediate transfers or conservative to serve as a coverage extension when the footprint for the home network operator is poor or non-existent. An NHN can be used for offloading UEs, for load balancing congested scenarios. In the context of congestion control, offloading the UE could include transferring the UE between the EN and the MNO within the NHN (i.e., not using the MN cell towers).

(7) Enterprise Network Diagram

Figure 8:
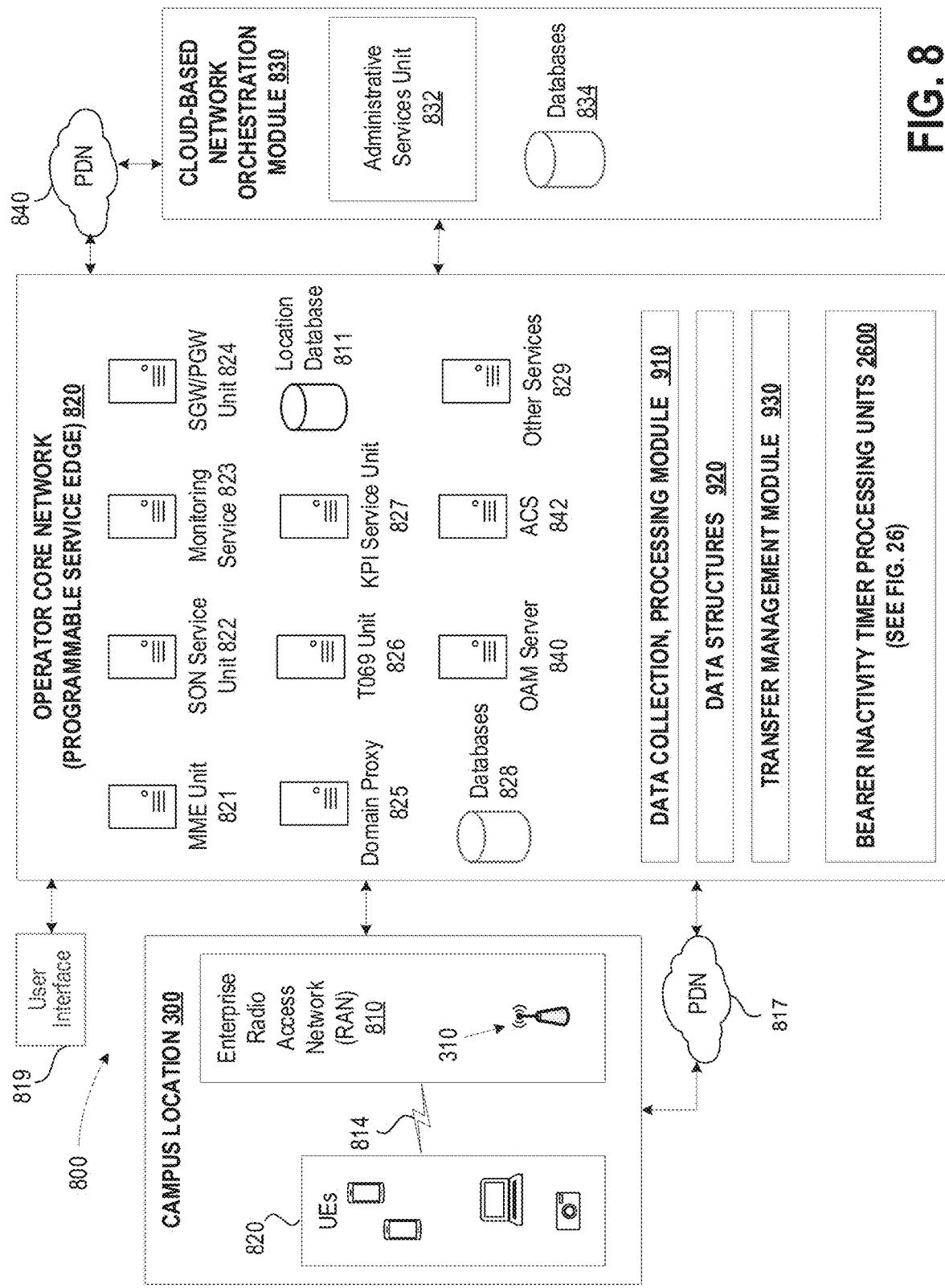
FIG. 8 is a block diagram of an implementation of an Enterprise Network (EN).
Figure 9:
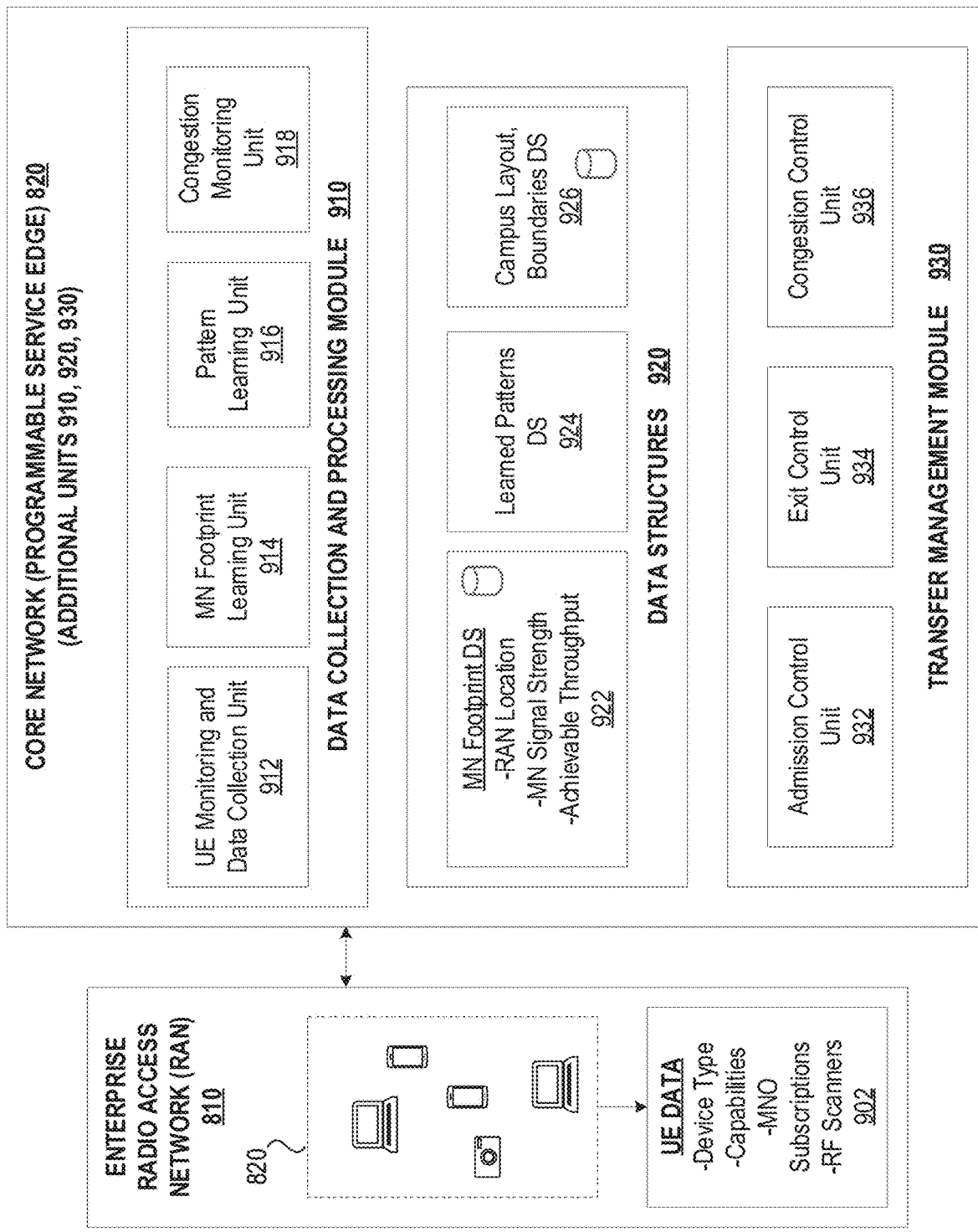
FIG. 9 is a block diagram illustrating additional components of the EN of FIG. 8, including a Data Collection and Processing Module, Data Structures, and a Transfer Management Module.

FIG. 8 is a block diagram of an implementation of an Enterprise Network (EN) 800, and FIG. 9 is a block diagram illustrating particular components of the EN 800. The following discussion refers collectively to both FIGS. 8 and 9.

The EN 800 includes a Radio Access Network (RAN) 810 comprising a plurality of BS/APs 310 that are wirelessly connected to a plurality of UEs 802. The RAN 810 is connected to an Operator Core Network 820 by any suitable connection. For example, all the BS/APs 310 in the RAN 810 may be connected to a Packet Data Network (PDN) 817 by any appropriate communications means, such as wire, fiber optic, and wireless radio, which is then connected to the Core Network 820. The BS/APs in the RAN 504 are connected to, and operated and controlled by, the Core Network 820. Some of the RAN services may be provided by the Core Network 820. The RAN 810 provides wireless connection and services to a plurality of UEs on the campus location 300. A user interface 819 is provided and connected to the Core Network 810 for administration of the EN 800.

In an enterprise network deployment, the BS/APs 310 and elements of the RAN 810 will be located on the campus location 300, and it is very likely that the Core Network 820 will be physically located at or near the enterprise location, especially in large or multiple deployments in the same area. However, for smaller deployments, or for multiple small deployments, it may be more cost effective to physically locate the Core Network remotely from the enterprise location.

In some embodiments the Core Network 820 is connected to a Network Orchestration module 830 that may include an Administrative Service Unit 832 for remote administration of the enterprise network, databases 834, other components as may be necessary or useful, and other functional units such as machine learning and artificial intelligence units. The Orchestration Module 830 is connected to the Core Network 820 by any appropriate communications means, such as a PDN 840. Generally, the Network Orchestration Module 830 supports the Core Network 820 and can provide additional services.

The Core Network 820 (which may also be called a Programmable service edge or "PSE") provides a variety of services for the EN 800 using a plurality of components connected to each other by any appropriate means. In the illustrated embodiment of FIG. 8, the components include a MMF (Mobility Management Function) unit 821, a SON (Self Organizing Network) service unit 822, a monitoring service unit 823, an SGW/PGW (Serving Gateway/Packet Data Network Gateway) unit 824, a domain proxy 825, a TR069 unit 826, a KPI (Key Performance Indicator) service unit 827. The Core Network 820 may also include databases such as a Location Database 811 and other databases 828, and other units such as an Operations, Administration, and Maintenance (OAM) Server 840, an Automatic Configuration Server (ACS) 842, and units for Other Services 829.

The Core Network 820 also includes units described with reference to FIG. 9, including a Data Collection and Processing Module 910, Data Structures 920, and a Transfer Management Module 930.

Figure 26:
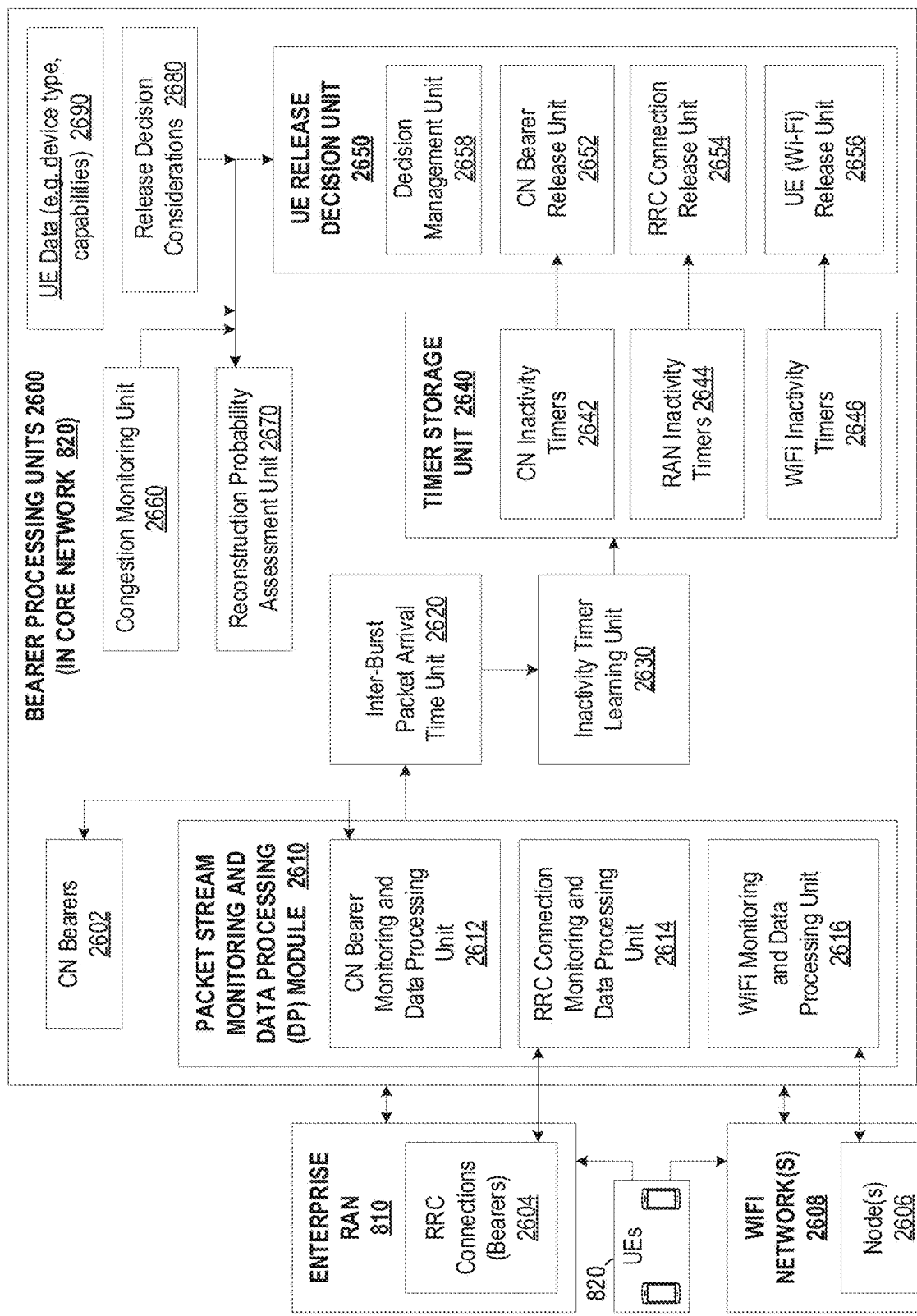
FIG. 26 is a block diagram of an EN in one embodiment that implements and utilizes inactivity timers to manage the network.

The Core Network 820 also includes Bearer Inactivity Timer Processing Units 2600 shown in FIG. 26.

Communication networks and system components may be described herein using terminology and components relating to 4G, 5G, and CBRS systems and their approved (registered) interfaces including 4G (LTE) (IEEE 802.16e), 5G NR 3GPP TS 38.300, E_UTRA (3GPP TS 36.300) communication systems. For instance, the term "CBSD" is one implementation of a Base Station/Access Point (BS/AP), and used herein for descriptive purposes in the context of a CBRS system. The principles of the communication network described herein more widely apply to other communication networks and systems, and particularly to any spectrum-controlled communication system and network. In some embodiments, the enterprise wireless communication network operates on the CBRS band and the BS/APs comprise CBRS devices (CBSDs) that are located at a campus location.

(8) Additional Core Network Units

FIG. 9 is a block diagram of the Core Network 820 shown in FIG. 8, and including additional component units 910, 920, and 930. As in FIG. 8, the Core Network 820 is connected to a RAN 810 that is wirelessly connected to a plurality of UEs 820. The additional units are grouped into a Data Collection and Processing Module 910, a Data Structures 920, and a Transfer Management Module 930. All these units and modules are interconnected by any appropriate network structure.

The Data Collection and Processing Module 910 includes a UE Monitoring and Data Collection Unit 912, an MN Footprint Learning Unit 914, a Pattern Learning Unit 916, and a Congestion Monitoring Unit 918.

The Data Structures (DS's) 920 include an MN Footprint DS 922, a Learned Patterns DS 924, and the Campus Layout and Boundaries DS 926.

The Transfer Management Module 930 includes an Admission (UE Entry) Control Unit 932, an Exit Control Unit 934, and a Congestion Control Unit 936.

The UE Monitoring and Data Collection Unit 912 is connected to the RAN 810 to receive UE Data 902, from the UEs 820. The UE Data 902 includes any relevant UE data such as device type, UE capabilities, MNO subscriptions, RF scanners, and RAN location. The UE Monitoring and Data Collection Unit 912 requests and receives all this information, and collects it to make it available for reference and for further processing. The UE Monitoring Unit is connected to the Transfer Management Module 930 to supply UE information to the Admission Control Unit 932, the Exit Control Unit 934, and the Congestion Control Unit 936.

Figure 10:
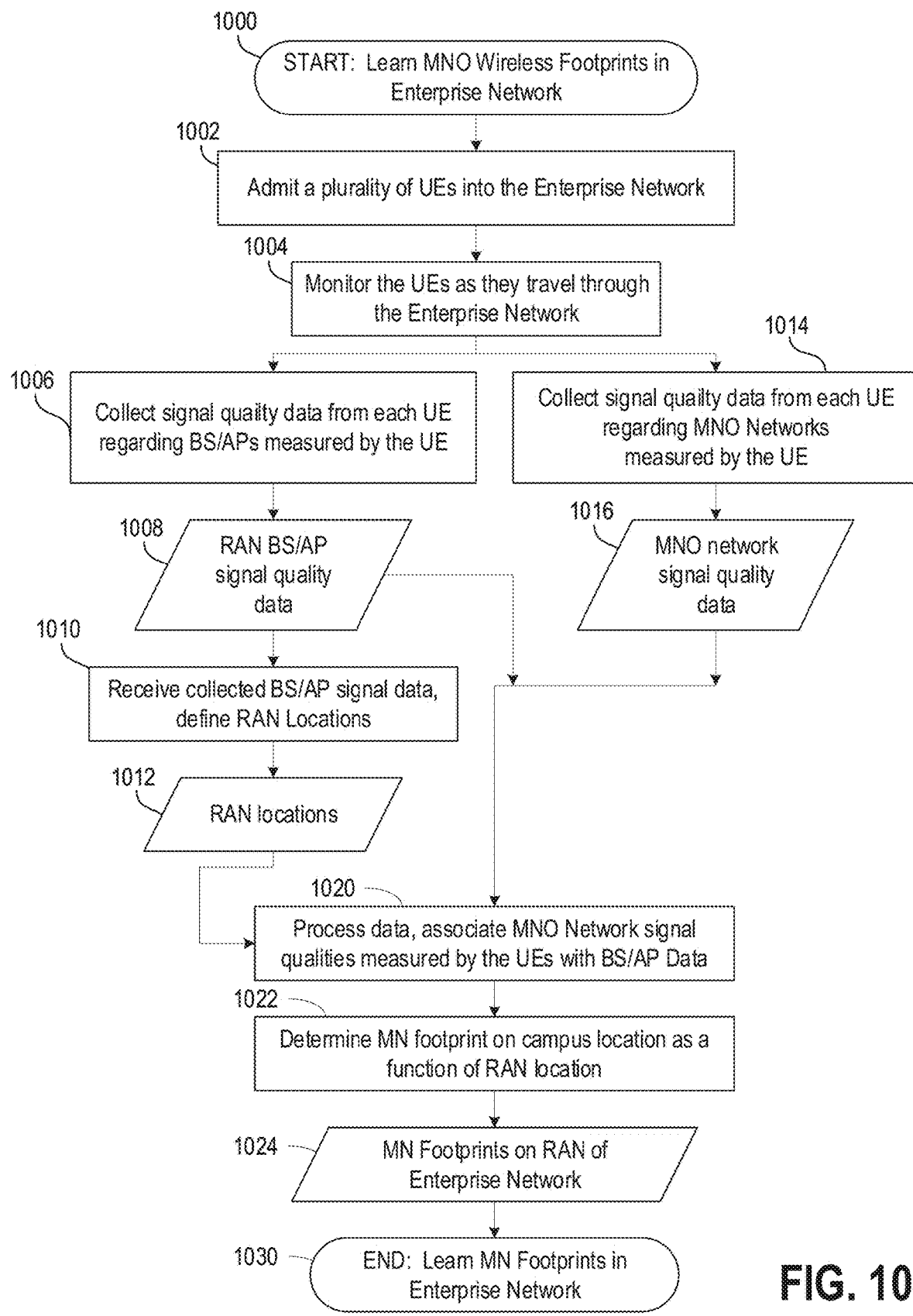
FIG. 10 is a flowchart of operations of one embodiment to learn the wireless MNO Network (MN) footprint within (and around) the campus location for each MNO Network as a function of a RAN location.

The MN Footprint Learning Unit 914 contains circuitry to learn the MN footprint of all the MNO Networks operating on or around the campus location. One embodiment is illustrated in FIG. 10 and described therewith. The MN footprint learning unit 914 may include machine learning and other AI circuitry to learn the footprint. The MN Footprint Learning Unit 914 stores the MN footprints in the MN Footprint DS 922, from which it is made available to the units in the Transfer Management Module 930.

The Pattern Learning Unit 916 learns exit patterns and stores them in the Learned Patterns Data Structure (DS) 924. The Exit Control Unit 934 is connected to the Patterns DS 924 to receive pattern data. The Pattern Learning unit 916 may include machine learning and other AI circuitry to learn exit patterns.

Figure 11:
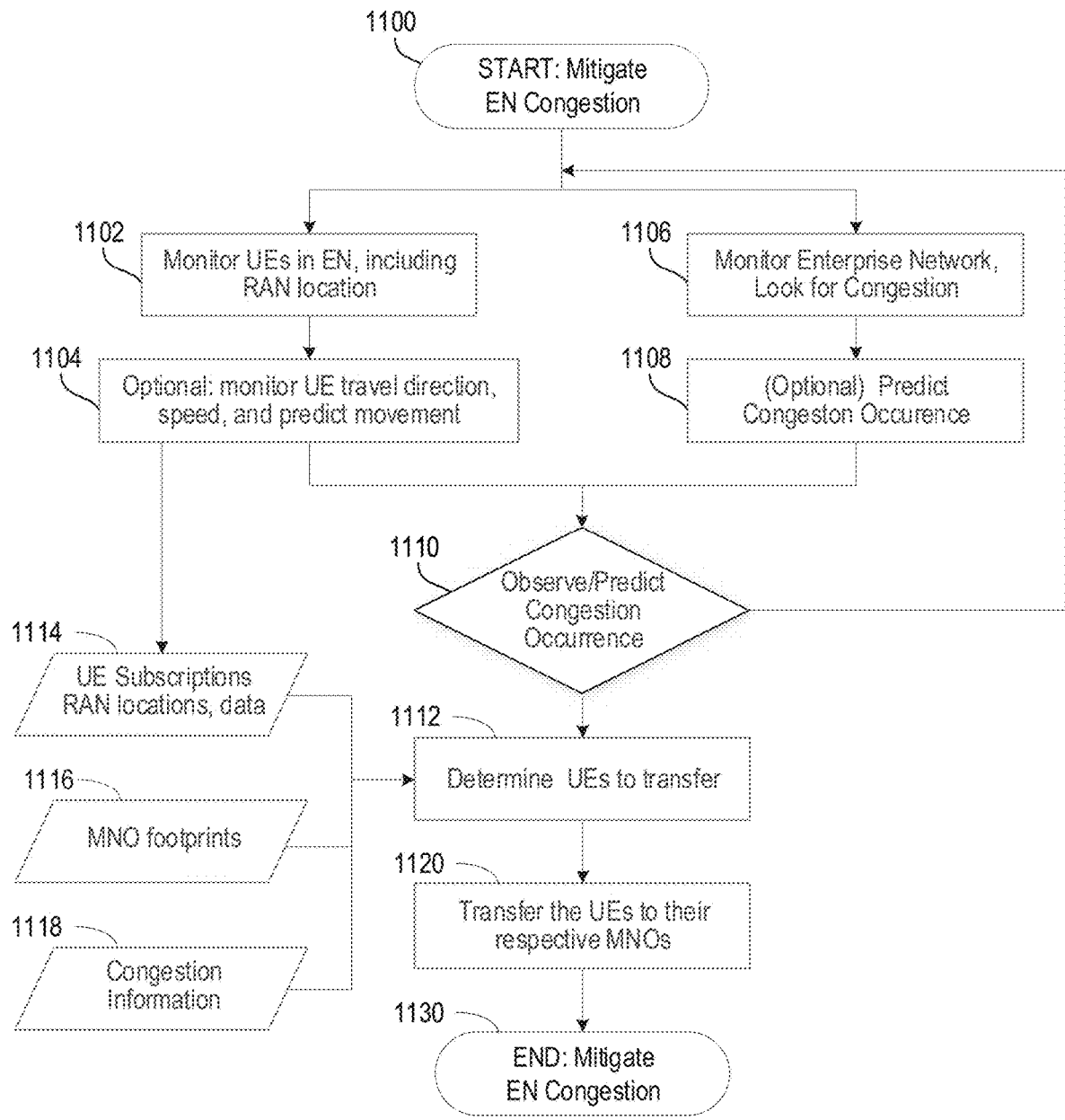
FIG. 11 is a flow chart of operations to mitigate congestion in an EN that has coinciding wireless coverage with MN Networks on its campus location.

The Congestion Monitoring Unit 918 is connected to the UE Monitoring and Data Collection Unit 912 to receive UE data, and determine congestion in the EN, such as shown in FIG. 11.

The MN Footprint DS stores the footprints of each of the MNO Networks that have some coverage on the campus location as a function of RAN location. The MNO information stored can include signal strength (e.g., RSRP) and achievable throughput.

The Learned Pattern DS is connected to store patterns from the Pattern Learning Unit 916 and supply them to the Exit Control Unit 934.

The Campus Layout, Boundaries DS 928 stores information regarding the layout of the campus, its boundaries and other relevant features regarding the campus.

Figure 12:
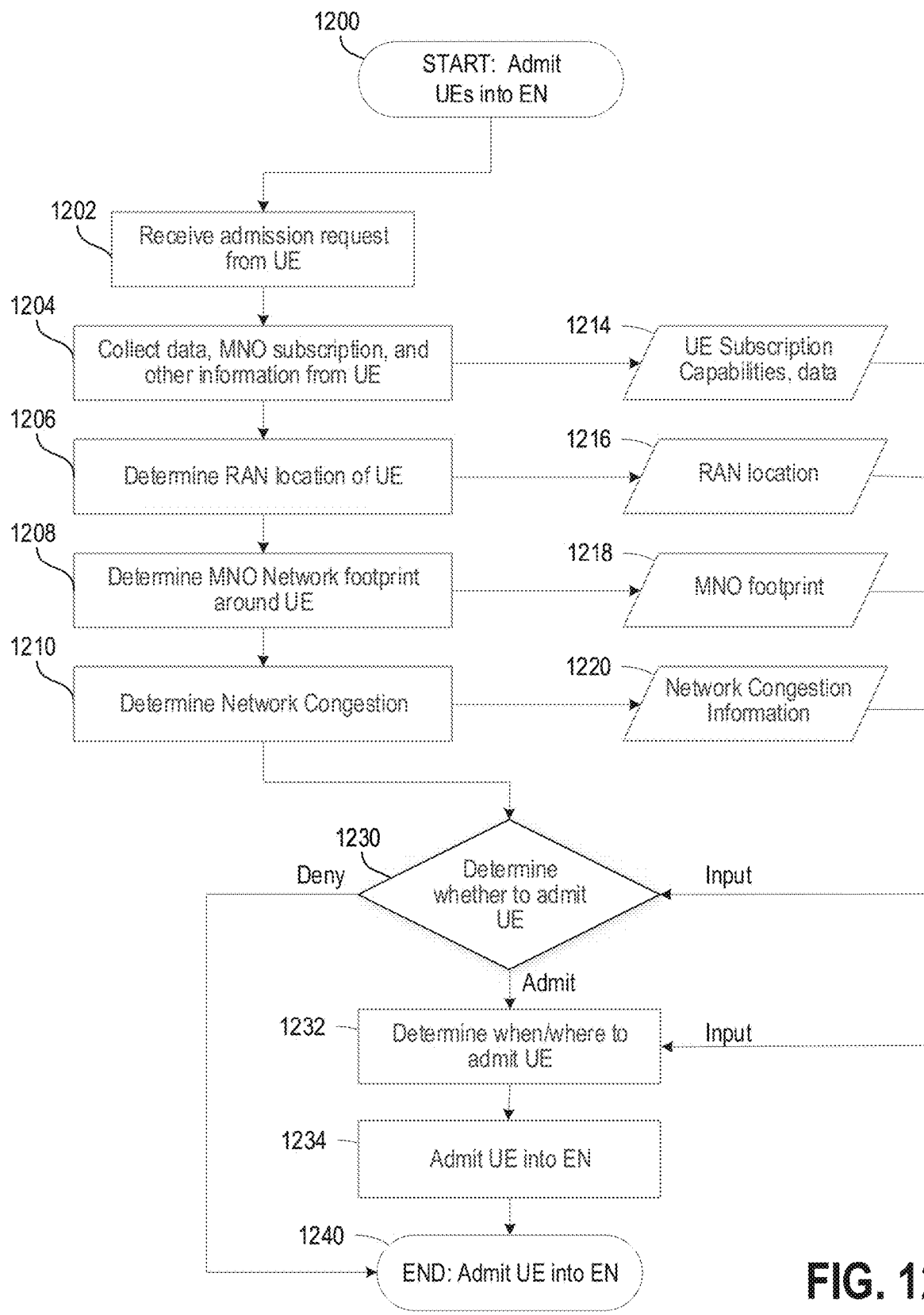
FIG. 12 is a flow chart of operations to admit a UE into the EN.

The Admission Control Unit 932 includes circuitry to control admission of UEs into the EN. It is connected to receive UE data from the UE Monitoring and Data Collection Unit 912, congestion information from the Congestion Monitoring Unit 918, and MN Footprints from the MN footprint DS 922, and may operate as shown in FIG. 12 and described in related text.

Figure 13:
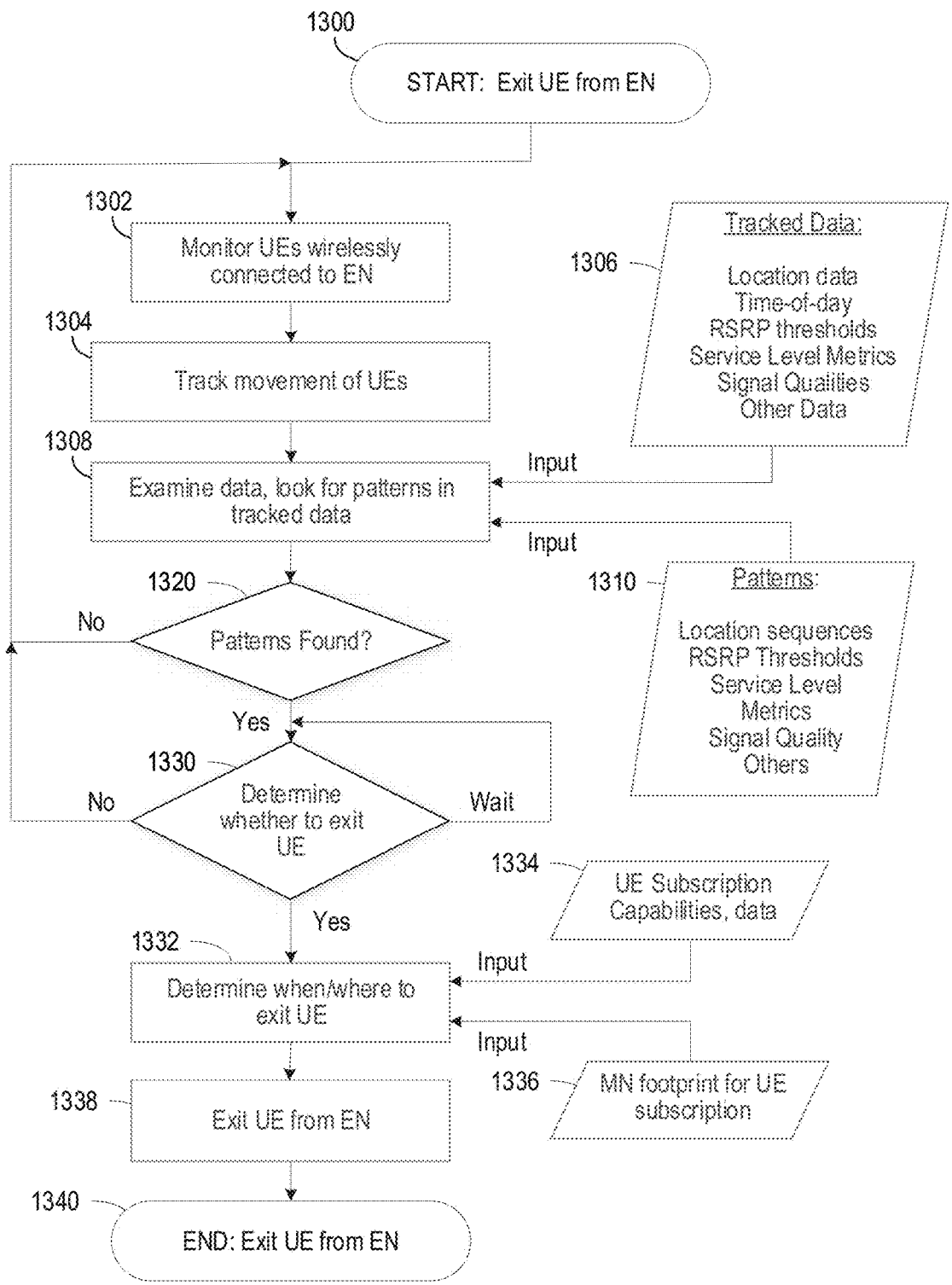
FIG. 13 is a flow chart of operations to exit a UE from the EN.

The Exit Control Unit 934 is connected to receive exit patterns from the Learned Patterns DS 924, and to receive UE data from the UE Monitoring and Data Collection Unit 912, and may operate as shown in FIG. 13 and described in related text.

The Congestion Control Unit 936 is connected to receive UE data from the UE Monitoring and Data Collection Unit 912, congestion information from the Congestion Monitoring Unit 918, and MN Footprints from the MN footprint DS 922. The Congestion Control Unit 936 may operate as shown in FIG. 13 and described in related text.

(9) Quality of Service (QoS)

Quality of Service (QoS) relates to communication qualities that may be assigned by a network to a UE for use during a communication session across the network. Different applications have different requirements, and in order to provide an appropriate level of service for different applications, the radio control system must have the capability to vary QoS quantities in order to provide the appropriate QoS. QoS selection allows the radio control unit to assign different priorities to packets of different applications, users, or data flows, or to guarantee a certain level of performance to a data flow.

QoS can be defined by a combination of one or more quantities such as a required bit rate, delay, delay variation, packet loss, or bit error rates. The radio controller may guarantee a particular QoS for a particular application; for example, a required bit rate, delay, delay variation, packet loss, or bit error rates may be guaranteed. An appropriate QoS is important for any wireless service, particularly real-time streaming multimedia applications such as voice over IP, multiplayer online games, and IPTV, since these often require fixed bit rate and are delay sensitive. Furthermore, QoS is especially important in networks where the capacity is a limited resource, for example in cellular data communications.

A network or protocol that supports QoS for its users may agree on a traffic contract with the application software and reserve capacity in the network nodes, for example during a session establishment phase. During the subsequent session the network may monitor the achieved level of performance, for example the data rate and delay, and dynamically control scheduling priorities in the network nodes.

(10) Artificial Intelligence

Artificial Intelligence (AI) techniques may be utilized herein. One definition of the AI field is the study of "intelligent agents" which include any devices that perceive their environment and take actions maximizing their chances of successfully achieving their respective goals. The term "artificial intelligence" describes machines (or computers) that have learning and/or problem-solving capabilities.

"Automated planning and scheduling", sometimes referred to as simply "AI planning", is a branch of artificial intelligence that develops and implements strategies or action sequences, for execution by, for example, intelligent agents, autonomous robots, and unmanned (self-driving) vehicles. Unlike classical control and classification problems, the solutions are complex and are typically discovered and optimized in multidimensional space. AI planning may also be related to decision theory. In known environments with available models, AI planning can be done offline. Solutions can be found and evaluated prior to execution. In dynamically unknown environments, the strategy often needs to be revised online. Models and policies must be adapted. Solutions usually resort to iterative trial and error processes commonly seen in artificial intelligence, which may include dynamic programming, reinforcement learning and combinatorial optimization. Languages used to describe planning and scheduling may be called action languages.

"Data mining" as used herein is a broad term for mining the data for information, utilizing exploratory data analysis through unsupervised learning and recognition of patterns. The patterns found by data mining may be easily observable by rote learning and memorized, repeated occurrences, or they may be much more complicated. Machine Learning (ML) is a more specific type of data mining in which the patterns to be recognized may be hidden and difficult to find.

Machine learning (ML) is the study of computer algorithms that improve automatically through experience. It is seen as a subset of artificial intelligence, and there are many types and methods of machine learning, any of which can be implemented herein as appropriate. Methods of machine learning include classification, regression, and clustering, and others. Classification machine learning methods may build a model based on sample data, known as "training data", in order to make predictions or decisions without being explicitly programmed to do so. Regression methods fit the data to a curve or function. Clustering methods use techniques to find a centerpoint and define clusters (e.g., placing dots on a screen to define a number and size of clusters).

"Deep learning" is a subset of machine learning. In one implementation multi-layered neural networks—modeled to work like the human brain—'learn' from large amounts of data. Within each layer of the neural network, deep learning algorithms perform calculations and make predictions repeatedly, progressively 'learning' and gradually improving the accuracy of the outcome over time. In the same way that the human brain absorbs and processes information entering the body through the five senses, deep learning ingests information from multiple data sources and analyzes it in real time.

In summary, machine learning is a subfield of artificial intelligence. Deep learning is a subfield of machine learning, and neural networks make up the backbone of deep learning algorithms. The number of node layers, or depth, of neural networks distinguishes a single neural network from a deep learning algorithm, which may have more than three node layers.

(11) Learning MN footprint

The RF (Radio Frequency) environment of individual campus deployments can vary widely from campus-to-campus and can be difficult or impossible to predict. RF environmental variations can be caused by a wide range of factors; some variabilities include campus layout, features, building construction, walls, materials, and whether the floors are carpeted or non-carpeted. For example, at any location in the RAN, the signal strength may be only partially related to distance of the BS/AP from the UE, but many other factors may come into play. For example, a particular BS/AP that has a clear path to the UE may have a more powerful signal strength than another BS/AP that is physically closer, but blocked by objects such as walls, floors, or other obstacles. Learning the MN footprint and selectively transferring the UEs between the EN and MNO, provides an EN with an ability to adapt its wireless network to the RF environment on its individual campus location.

FIG. 10 is a flowchart of operations of one embodiment to learn the wireless MNO Network (MN) footprint within (and around) the campus, for each MNO Network, as a function of a RAN location of the EN. The MN footprint includes not just the location but also the extent of coverage in terms of the signal strength and achievable throughput in the different locations of the campus. Some of these operations may be performed in the UE Monitoring and Data Collection Unit 912, and the MN Footprint Learning Unit 922.

After the start (STEP 1000) a plurality of UEs 600 are admitted into the EN (STEP 1002). Each of these UEs 600 provides data about itself to the EN, such as shown in FIG. 6: its scanning ability (MNO scanner 620), its subscription information 640, and other UE capabilities 650. In embodiments in which the BS/APs have a UE built into them, these UEs may be admitted (if necessary or useful) and provide data about themselves to the EN.

The UEs are monitored as they travel through the EN (STEP 1004), and data is collected regarding the wireless environment is collected as the UE travels through the campus. In embodiments in which UEs are built in to the BS/APs, data measurements regarding the wireless environment are also collected from theses built-in UEs, which are stationary. This data is collected by the EN (STEP 1006), which uses the data to manage the EN, including the RAN and UEs in it.

Particularly, as each UE travels through campus, it typically can detect and measure the RSRP (Reference Signal Received Power), or some similar measure, of multiple BS/APs as it scans for EN signals, and this information can be provided via the RAN to the UE Monitoring and Data Collection Unit 912. Because each scan by each UE scans and measures the BS/APs signals within a short period of time, the measurements in each scan can be considered as having been received at approximately the same time and same location, given the typical relatively slow rate of movement of the UEs on the campus. Thus, the measurements from each scan can be considered to be a "location"

in and around the campus location. Thus, the BS/AP signal quality data (DATA 1008) received is collected from each UE regarding the BS/APs measured by the UE (STEP 1010), and used to define RAN locations (DATA 1012). The data collected from various UEs providing data may be combined using appropriate data processing techniques such as artificial intelligence techniques to provide a group of standard RAN locations that can be used as a consistent reference for the MN footprints. RAN locations are used to define a wireless "location" from the perspective of the RAN and the BS/APs in it. In this sense, the "location" defined by RAN locations is not defined in geographical terms as a geolocation, rather it is defined by the relative strength of the BS/APs in the RAN as measured by a UE at that position. In some circumstances and EN embodiments, the EN may provide wireless coverage outside the boundary perimeter of the campus location. In that situation, a UE in the EN, traveling outside the boundary perimeter, would still be collecting measurements of the BS/APs in the EN even though outside the boundary perimeter, and in that case the RAN location would correspond to a physical location outside of the campus location, but still be part of the EN.

Referring to STEP 1014, at or about the same time as the EN BS/APs are being scanned, the MNO scanner 620 in the UE is scanning for signal quality data regarding MNO Networks, and measuring signals it can detect. Particularly, as the UE is scanning (with the MNO scanner 620) for MNO Network signals, it may be able to detect and measure the RSRP (Reference Signal Received Power), or some similar measure, of one or more MNOs as it scans. Any detected MNO Network signals and their measurements are provided to the UE Monitoring and Data Collection Unit 912 and collected there (STEP 1014), which provides MNO Network signal quality data (DATA 1016).

The RAN BS/AP signal quality data (DATA 1008), the RAN locations (DATA 1012) and the MNO network signal quality data (DATA 1016) are than processed (STEP 1020) and utilized to determine (STEP 1022) an MN footprint (DATA 1024) for each MNO that has some wireless coverage on the campus location. Generally, MNO Network signal qualities do not vary over time in any significant way. However, it is possible in some circumstances that MNO Network signal qualities may vary over the day, and in that case it may be useful to observe and in some cases predict the signal variations and incorporate that into the MN footprint as a time dependency.

After the MN footprints have been determined for all the MNO that have some coverage on the campus location, operation then ends (STEP 1030).

(12) Managing network and Transferring UEs
(13) Introduction

The MN footprints and RAN locations of the UEs can be utilized to effectively manage the EN in a number of ways. Congestion occurrences, observed or predicted, can be mitigated or even eliminated without undue service disruption by using the MN footprints to select particular UEs to transfer between the EN and the MNO Network. For example, under "high" congestion conditions, the MN footprint information and the RAN location of UE can used to select which UEs will be admitted into the system. By using the MN footprint and a UE's RAN location to determine when to transfer, the UE can be transferred between the EN and the MNO Network smoothly and efficiently. For example, when the UE requesting admission is in an area where the MN footprint is stronger and larger, then entry into the EN can wait for the UE to be in RRC idle state before attempting to transfer from MNO network to the Enterprise network, which advantageously allows for a smoother transition. By monitoring the UEs RAN location and movement, and knowing the RAN locations that are near or outside the boundaries of the campus, the UE's exit can be predicted, and communication can be transferred to the MNO Network proactively, or an appropriate time can be chosen (such as when the UE is in an idle state), or a location can be chosen where the MNO Network has a strong signal, to promote a smooth transfer from the EN to the MNO Network.

(14) Congestion Control

Network congestion in an EN can occur at any time of the day, and at any location on a campus location. Congestion can occur for a number of reasons; typically congestion is due to a large amount of wireless traffic that is sufficient to overload EN system resources. The congestion may be related to wireless coverage and the RF environment for example, it may relate to the number and types of users, the types and grades of services operating on the network, and device types. Regardless of the cause, network congestion is a problem for users and network administrators alike. Congestion issues are discussed in detail elsewhere in this specification, for example beginning with the section titled Overview of a Network Load Control System, and in the figures beginning at FIG. 14A, methods and apparatus for predicting and observing congestion, and responding to congestion, are described therein. A congestion occurrence may be observed or predicted using any appropriate technique, including the techniques described therein.

A congestion occurrence, observed or predicted, can be mitigated or even eliminated without undue service disruption by using the MN footprints to select particular UEs to transfer between the EN and the MNO Network.

FIG. 11 is a flow chart of operations to mitigate congestion in an EN that has coinciding wireless coverage with MN Networks on its campus location. After start (STEP 1100) the EN monitors (STEP 1102) the UEs in the EN, monitoring information such as the UEs' current RAN locations. The EN may also monitor (STEP 1104) the UEs' travel direction, speed, and predict their movement. At the same time, the EN monitors (STEP 1106) its network operations, including looking for a congestion occurrence. Also, based upon the current network operation and other factors such as history and time, the EN may predict (STEP 1108) a congestion occurrence in the future. The congestion occurrence may be limited to a particular area (e.g., a group of RAN locations), or it could affect substantially the entire network. The congestion occurrence may be time-limited and happen at a particular time, or may be predicted to happen at a particular time. Generally, the congestion occurrence can have any of a number of causes and have a variety of effects on the network. Operations stay in this state until a congestion occurrence is observed.

After a congestion occurrence is observed and/or predicted by the EN (STEP 1110), the UEs to be transferred are determined (STEP 412). Inputs (DATA 1114) to this determination include UE subscriptions, RAN locations, other UE data such as the capabilities of each UE, and the MN footprints (DATA 1116) such as described with reference to FIG. 11 which indicate the MNO coverage available at and around the UEs' RAN locations. Congestion information (DATA 1118) from the EN, provided from STEPs 1106 and 1108 is also suppled which indicates details of the congestion, such as extent and area of congestion. Responsive to this data and information, a determination is made (STEP 412) as to which UEs to transfer to their respective MNO Networks. The UEs to be transferred to the MNO Network may be those in or near the location of the congestion occurrence. UEs that are nearing exit may be transferred to the MNO, anticipating that they will soon be exiting the EN. Preferences for selecting the UEs to transfer may be given as described in the General Considerations section below.

After the determination is made as to which UEs are to be transferred, the EN then transfers (STEP 1120) those UEs to their respective MNO. The transfer is accomplished in any appropriate way: in some cases, the EN may communicate with the MNO to coordinate the transfer (see FIG. 7 and associated description, for example). In other cases, the transfer may be accomplished by the EN terminating the connection with the UE knowing that the UE can connect to the MNO, or the UE may be requested to terminate the connection with the EN and connect to the MNO Network. The UE device's capability information may be used to determine the transfer point (e.g., RAN location] and the type of transfer that is to be executed.

After the UEs have been transferred to their respective MNO, then operations end (STEP 1130).

(15) General Considerations Relating to Transferring UEs

The EN utilizes the MN footprints to select when and where to transfer UEs to and from the MNO Networks. Particularly each UE's RAN location, and the associated MN footprint (including the MNO's signal strength and extent of coverage around the UE's RAN location) are primary considerations when deciding whether or not to transfer the UE to an MNO Network.

ARP (Address Resolution Protocol) routing policies may be relevant in selecting the UEs for transfer.

The UE's capability for performing inter-frequency scans, dual-Rx, dual-Tx can also be utilized in selecting the UEs, because these capabilities may make it easier to perform the transfer, which would provide a smoother transfer, particularly for some device types. More generally, the ease with which transfer can be accomplished can be a factor in selecting the UEs to transfer.

As part of the EN's decision of which UEs to transfer, three perspectives (MNO, EN, UE) may be balanced.

MNO: From an MNO perspective, the MNO's preference is to offload calls and other communications to the enterprise network primarily when their own networks are providing poor coverage, or lack coverage for any of a number of reasons, such as lack of infrastructure, technical issues, or other issues. Otherwise, the MNO would usually prefer to keep the UE in its network. This preference may be for monetization purposes.

EN: From an enterprise network perspective, a primary importance is accommodating the users, subject to constraints of resource availability. In some implementations, and in the future, some monetization aspects may be available for the EN, but at the current time the EN primarily provides a service to the users building upon the enterprise's IT service dependability.

User (UE): From a user's perspective, service availability and dependability is of primary importance. Generally, a user wants a dependable connection (no dropped connections) that provides the type and speed of service needed, and preferably enhanced.

Generally, the MN footprints, the RAN locations of the UEs in the EN, and the MNO subscriptions of the UEs are used to determine which UEs that will be selected to transfer from the enterprise system and into the MNO network.

In some embodiments, an active use of Local Traffic Offload (LTO) services may be implemented to avoid moving certain UEs out of the system. Also, priority inversion will be required under specific conditions.

(16) Entry Control into EN

One aspect of EN operations relates to admitting UEs into its wireless network. The EN is not required to admit all UEs who request admission. In many cases the UE must have at least a subscription with the EN before being admitted, and the EN may refuse admission for other reasons. One reason to refuse admission is to mitigate network congestion: e.g., if a congestion occurrence is observed or forecast in the near future, admission may be denied in order to mitigate the congestion, or prevent the congestion from occurring or getting worse.

FIG. 12 is a flow chart of operations to admit a UE into the EN. At the start (STEP 1200) of the admission (entry) operations, it is assumed that the EN is operating and has wireless coverage on and around the campus location. When the UE is within the range of the EN wireless coverage, it makes an admission request which is received by the EN (STEP 1202). The EN collects (STEP 1204) data and other information from the UE, such its capabilities and the MNO (or MNOs) with which it has subscriptions, and provides this as DATA 1214. The EN then determines (STEP 1206) the RAN location of the UE and provides this as DATA 1216. The EN determines (STEP 1208) the MNO's footprint around UE's RAN location and provides this as DATA 1218. The EN may also have been monitoring network congestion as discussed elsewhere, and the congestion at this time, and predicted congestion may be determined (STEP 1210), and provides this as DATA 1220.

To determine whether or not to admit (STEP 1230) the UE into the EN, the decision receives input UE subscription information, UE capabilities, other data from the UE (DATA 1214), the UE's RAN location (DATA 1216), the MN footprint (DATA 1218), and Congestion Information (DATA 1220). Responsive to this input data, the EN makes a decision (STEP 1230) as to whether or not to admit the UE into the EN.

A number of considerations may enter into the admission decision (STEP 1230). An important consideration is network congestion, another consideration may be the relative priority of the UE in the EN. One technique to mitigate congestion is to control admission of UEs into the EN, which prevents the system from becoming more overloaded, or in the case of a predicted congestion occurrence, controlling admission may prevent the congestion from occurring in the first place. When a congestion occurrence is predicted or observed, (e.g., under "high" congestion conditions), the MN footprint information and the RAN location of the UE can be used to select which UEs will be admitted into the system.

If the EN determines not to admit the UE, then the request is denied, and the admission operation ends (STEP 1240). If the EN determines to admit the UE, then the next step is to determine (STEP 1232) when to admit the UE. Also, the UE to wait until it arrives at a particular location before entering the EN. By using the MN footprint and the UE's RAN location to determine when to transfer, the UE can be transferred between the EN and the MNO Network smoothly and efficiently. For example, when the UE requesting admission is in an area where the MN footprint is stronger and larger, then entry into the EN can wait for the UE to be in RRC idle state before attempting to transfer from MNO network to the Enterprise network, which advantageously allows for a smoother transition.

(17) Exit from EN

When the UE is exiting the campus location with active service with the Enterprise Network, the campus location's wireless footprint will eventually be lost, and therefore an effective mechanism to transfer the UE to an MNO network will be required. One objective of the transfer mechanism from the UE's perspective may be to make the exit transfer happen smoothly and seamlessly, another objective from the EN's perspective may be to enable a smooth transition, and also to reduce congestion in the EN.

FIG. 13 is a flow chart of operations to exit a UE from the EN. At start (STEP 1300) the EN is in operation, and a number of UEs, such as mobile phones, are wirelessly connected to the EN. The UEs are monitored (STEP 1302) to determine their RAN locations and other data, and their movements are tracked (1304) by the EN. In addition to location data, the data tracked (DATA 1306) can include any of time-of-day, RSRP thresholds of the EN's BS/APs and MNO cells (towers), service level metrics of PER, signal quality such as delay, jitter, and throughput, and the RSRP of MNO Networks. The tracked location data may include RAN locations and other location in other formats. For example, if other positioning systems are available to one or more of the UEs, such as a GNSS (GPS) system, those UEs may also provide their position to the EN in that format.

Each of the UEs is tracked. Each UE's movement data is examined (STEP 1308) to look for patterns 1310 suggesting that the respective UE will soon be exiting the EN. For example, the patterns 1310 may include inter-cell mobility sequences leading to specific EN BS/APs that are towards the extremities of the network. Other patterns 1310 may include time-of-day patterns; for example, near the end of the day, the UEs are more likely to exit. Also, RSRP threshold patterns of both Enterprise and MNO cells, service level metric patterns of PER, and signal quality patterns such delay, jitter, and throughput patterns may be examined.

Advantageously, transferring from the EN to the MNO can be done proactively upon detecting the pattern of the UE leaving the campus, rather than waiting for a "loss of coverage" event which could otherwise disrupt the UE's service.

The patterns 1310 may be developed by the EN, by collecting movement data of UEs in the EN over time, observing which UEs exit the EN after exhibiting the patterns, and using AI techniques to learn and predict an exit when a particular pattern is observed. Some patterns 1310 may include a knowledge of which BS/APs are near the boundary perimeter, and when a UE encounters any of these BS/APs, this may be an indication that the UE will soon exit the EN.

If patterns that sufficiently correlate with exit are not found (STEP 1320), then operation returns to continue monitoring the UEs (STEP 1302). However, if patterns are found for a particular UE, then operation moves to determine (STEP 1330) whether or not to exit that UE from the EN. In some cases, such as when there is little or no network congestion, the system may wait until more time passes to determine (STEP 1330) whether or not the UE will be exiting the system, and hold until then. If it is eventually determined not to exit the UE, then operation returns to continue monitoring the UEs (STEP 1302). However, if it is determined (STEP 1330) to exit the UE, then the next step (STEP 1332) is to determine when and/or where to exit (transfer) the UE to the MNO Network.

The UE device's capability information, its UE subscription (DATA 1334) and the corresponding MN footprint (DATA 1336) may be used to determine the transfer point (e.g., RAN location) and the type of transfer that is to be executed. This DATA 1334 and 1336 is available to the EN for each UE, as described elsewhere herein. Network congestion may also be a factor; in the presence of network congestion the UE may be transferred to the MNO sooner, rather than waiting.

After it is determined when and where to exit, the UE is exited (transferred) from the EN (STEP 1338). This transfer can be accomplished any of a number of ways, such as by communicating cooperatively with the MNO network and transferring the active RRC connection from the Enterprise to the MNO network. Another way of transferring is to abort the RRC connection on the EN, forcing the UE to go to RRC idle mode and transfer to the MNO network. In the latter case, before aborting, the EN should ensure that conditions are such that the entry criteria for the EN will not be met, to prevent the UE from re-entering the EN.

After the UE has transferred to its respective MNO, then operations end (STEP 1340).

(18) Overview of Network Load Control System

A system is disclosed herein for anticipating and controlling the load on the radio link in a wireless communication network. Some embodiments include a method of proactively controlling the wireless communication load in an enterprise network situated in a campus location that includes several BS/APs wirelessly communicating with at least one UE on the campus. One purpose of load control is to provide appropriate service to all UEs attached to the BS/APs in the network. Particularly, data is collected over time, the busy hours (times) in the day are recognized (in one embodiment they are recognized as a time series of events), predictions are made regarding when busy times are likely to occur (or when the time series of events happen), and resources are allocated proactively, such as re-allocating transmit power among the BS/APs, and restricting QoS grants to the UEs to allow more users to be supported in the system.

As described herein, data is collected on a BS/AP basis (i.e., for each BS/AP) to identify the peak time periods, and more generally traffic variations over time, observed at each BS/AP. Predicted heatmaps, as a function of time and/or as a time series of events, are identified using ML techniques; particularly ML) methods, such as deep learning are performed to develop predicted heatmaps associated with regions of the campus. Also, the peak time periods and traffic variations over time tend to reflect the trends of population movement on the campus, and from these population movements, ML techniques are used to estimate the ability to defuse communication congestion by offloading traffic to neighboring BS/APs or other networks that may be available, such as Mobile Network Operator (MNO) networks.

Also, the footprint of the enterprise's Wi-Fi network relative to the BS/APs in the enterprise network and the loading on that system can be monitored to make a collective decision. Responsive to this information, AI Planning techniques can be applied to determine pre-emptive steps to prevent users from attaching to the enterprise network, possibly direct them to the Wi-Fi network, and therefore reduce the possibility of overloading.

Artificial Intelligence (AI) systems are implemented, based upon any or all of the heatmaps, the estimated ability to defuse congestion by offloading traffic, and preemptive steps to prevent users from attaching to the enterprise network. The AI systems are implemented to monitor and anticipate congestion in the enterprise network, and respond proactively and appropriately using any of the techniques described herein to control the BS/APs and the network to reduce congestion or otherwise ensure that service needs of the UEs are met. Any or all of the AI techniques, including AI Planning, data mining, machine learning, and deep learning may be implemented and performed on site (on-line), or remotely (off-line); but preferably the AI modules are located on-site, where the enterprise network can learn its own patterns of behavior without requiring outside resources.

(19) Monitoring BS/AP Traffic Usage Over Time.

Figure 14A:
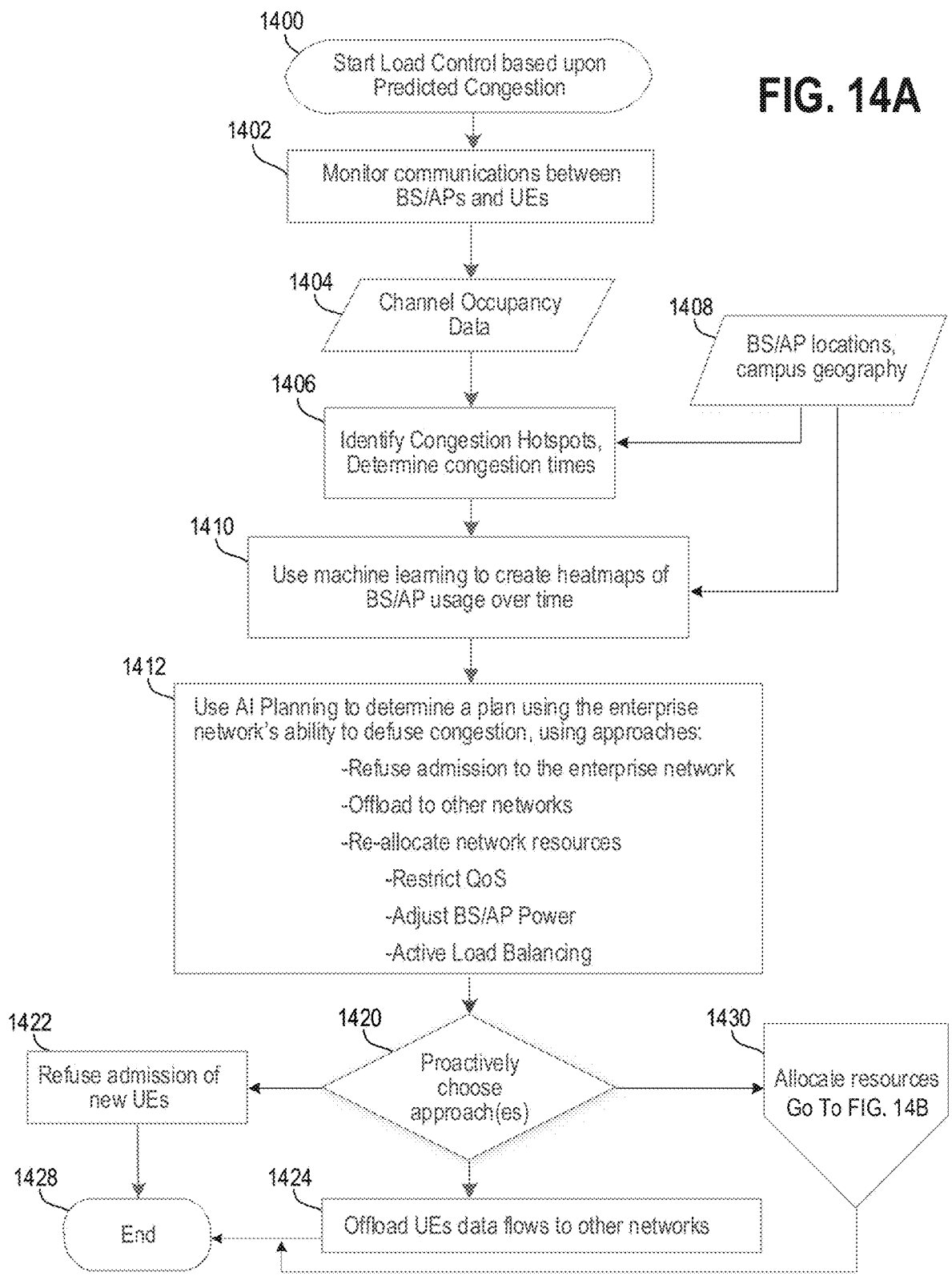

FIGS. 14A and 14B are flow charts that combine to show operations to learn busy times in a wireless communication network and anticipate and control the load on the radio link to provide service to the UEs attached to the BS/APs. After starting operations to control load, based upon predicted congestion (STEP 1400), the RAN, and more particularly in some embodiments each BS/AP begins monitoring communication traffic over a period of time to determine, among other things, usage and service data for the BS/APs 511 (STEP 1402). Particularly, the channel occupancy at each BS/AP can be measured. To measure channel occupancy, measurements can be made of the total Physical Resource Block (PRB) traffic at each BS/AP, and/or the PRB traffic with each UE, to determine the usage at each of the BS/APs in the network. The PRBs are defined according by the network architecture (e.g., in LTE a PRB is the smallest unit of resources that can be allocated to a user, which can be one slot long in time and 180 kHz wide in frequency).

The resulting channel occupancy data (DATA 1404) provided from the previous step can be collected over time for each BS/AP by monitoring the PRBs associated with each BS/AP at the RRC scheduler. The data is typically measured on a periodic basis with intervals short enough to capture whatever bursts of activity occur, without collecting excessive amounts of data. The interval can be selected based upon the particular deployment; for example, the intervals could be short (e.g. 30 seconds or 2 minutes) or longer (e.g., 10 minutes or one hour). The intervals should be short enough to capture and identify bursts of activity, such as the bursts of activity that occur between classes on a college campus.

In addition to the collected channel occupancy data, it can be useful to know the location of the BS/APs and the UEs, the geography of the campus and the placement of the BS/APs within the campus, the specifications (e.g., capacity) of each BS/AP, and other information relevant to communication usage and capabilities of the wireless network.

(20) Identify Congestion Hotspots (STEP 1406)

The channel occupancy data 1404 can then be used to identify congestion hotspots (STEP 1406). This can be done by analyzing the data and observing which of the BS/APs become congested, and at which times. The data can be analyzed using conventional AI techniques, such as AI planning to proactively re-allocate resources and balance the number of users with the level of service supported with the network resources available. Accordingly, data mining the channel occupancy data can be performed to identify congestion hotspots as a function of time. Alternatively, or in addition, ML can be used to predict heatmaps for individual BS/APs and to recognize demand patterns for services. Thus, the peak traffic time periods and other congestion can be identified on an BS/AP basis, as a function of day-of-the-week and time-of-day, and/or as a time-series of events. If the BS/AP locations and campus map (DATA 1408) is known, the identified congestion hotspots can be mapped on a geographical basis across the campus.

(21) Create Heatmaps of Usage Over Time (STEP 1410)

The channel occupancy data 1404, and any other relevant data (such as usage and service data) from monitoring the BS/APs, is processed (STEP 1410) using data mining, machine learning, and/or deep learning techniques to create heatmaps that include BS/AP usage and communication congestion across the campus as a function of time or a time-series of events. The data is processed responsive to the congestion identified and the population movement as a function of time based on the day-of-the-week and time-of-day. Particularly, using the BS/AP locations and campus map data 1408, heatmaps associated with regions of campus are generated that provide predictions showing where communication is likely to be adversely impacted by congestion, and the extent of that congestion as a function of time or as a time-series of events. In some embodiments, usage and service data includes location data, and the usage and service patterns include location in a time-series of events. In some embodiments, responsive to the congestion hotspots and the channel occupancy data, data mining is performed to create the heatmaps of BS/AP usage over time and to make congestion predictions as a function of time.

By observing the heatmaps sequenced over time, trends and patterns of population movement on campus can be seen, which may be repeated each day, or week, for example. These patterns may be useful in predicting congestion and proactively responding to it.

(22) Estimate the Ability to Defuse the Congestion (STEP 1412)

The information in the heatmaps, including the predicted congestion and population movement patterns over time are then processed (STEP 1412) using Artificial Intelligence (AI) techniques such as automated scheduling and planning (AI planning) to consider possible approaches by the wireless network and develop viable responses to proactively defuse the predicted congestion utilizing one or more of these approaches. In some embodiments, responsive to predicted congestion, artificial intelligence (AI) planning is used to determine a plan for the network to reduce the predicted congestion by at least one of re-allocating resources, refusing admission of new UEs, and offloading UEs to other networks.

Accordingly, one approach to defuse the predicted congestion is refusing admission of one or more UEs into the network. This approach, which denies service to UEs that may expect to connect to the network, is simple to implement in some situations, but may not be preferable in other situations.

Other approaches to defusing congestion may be available and can be considered. One approach to defusing predicted congestion is to allocate resources to a given BS/AP in a way that allows a larger number of UEs to communicate with the BS/AP. For example, in one embodiment, resources can be allocated to a given BS/AP by restricting, adjusting and/or controlling the Quality of Service (QoS) provided by the BS/AP to the UEs to which it is attached. The QoS may be adjusted for those BS/APs currently attached, and for those requesting services, the new QoS grants can be reduced to allow a larger number of UEs to communicate.

Another approach is to transfer the load from the center of congestion by adjusting the transmit power of the BS/AP and its neighboring BS/APs to offload currently-attached UEs to one or more of the neighboring BS/APs; particularly, to reduce the transmit power on one BS/AP and increase the power on one or more nearby BS/AP(s) to transfer a load from the predicted center of congestion. a technique that may be called "cell-breathing".

Another approach is to direct a handover of an attached UE from the BS/AP to a neighboring BS/AP, as part of an approach that is called "active load balancing". In this approach, a connected mode handover controlled by the network transfers communication of an attached UE from one BS/AP to another BS/AP, even though that transfer may lower the QoS. In some embodiments the load balancing approach is performed selectively based upon the user type, allowing for different behaviors. For example, higher priority users such as campus executors/administrators may be given a higher priority to stay on a BS/AP than a regular employee, a student, or a visitor. As another example, a user with a higher security level may be given a higher priority than one with a lower security level.

Still another approach is to offload specific user flows, or one or more IP address(es), or all traffic of some of the currently attached UEs from the enterprise network to another network, such as an available Wi-Fi network (which may be a Wi-Fi network operated by the enterprise To offload to Wi-Fi networks, one or more of the UEs are (or have been) allocated an independent IP address, typically through DHCP (Dynamic Host Configuration Protocol), for data communication over the Wi-Fi network. The Wi-Fi assigned IP addresses generally support internet connectivity. The enterprise network PDN connections can be moved from the enterprise (LTE/NR) network to operate over the Wi-Fi assigned IP address as tunneled connections into the MNO (Mobile Network Operator) core. Traffic can be transferred between the IP address on enterprise (LTE/NR) to the one provided on Wi-Fi or the PDN connection established as IPSec (Internet Protocol Security) tunnels on top of the Wi-Fi IP address. More broadly, all traffic on a specific IP address may be transferred, or all traffic through a specific port can be transferred, or multiple IP addresses, or multiple ports may be transferred. Specific flows may be transferred, for example in streaming, the video flow may be transferred to, while the audio remains on the enterprise network. Many different types of data flows can be transferred (e.g., offloaded), such as voice, video, background traffic, streaming traffic, and IOT traffic. Accordingly, the UE may be communicating simultaneously with the enterprise network and the Wi-Fi network.

Based upon the type of flow, a decision may be made whether or not to offload to a Wi-Fi network based upon the type of service and QoS requirements, for example a voice call may be kept on the higher QoS enterprise network and video traffic may be offloaded to the Wi-Fi network. As one example of transferring a flow, if the footprint of the Wi-Fi network is known, then based on the understanding of the footprint of the Wi-Fi network relative to the BS/AP and/or UE, and the loading on that system, offloading the attached UE, e.g., by dropping the UE from the enterprise network, and anticipating that it is either currently attached to the Wi-Fi network, or will attach when dropped from the enterprise network. Particularly, the footprint of the Wi-Fi network relative to the BS/APs in the enterprise network and the loading on that system can be monitored to make a collective decision. Responsive to this information, ML techniques can be applied to determine pre-emptive steps to prevent users from attaching to the enterprise network, possibly direct them to the Wi-Fi network, and therefore reduce the possibility of overloading.

(23) Proactive Network Action

A network action is then chosen (STEP 1420) and is implemented proactively, i.e., at a time prior to the predicted congestion, for the purpose of reducing congestion and providing appropriate service levels to the UEs. The network action may include any of the approaches described herein, or a combination of the approaches. In other words, a collective decision (STEP 1420) is made regarding how to proceed, and this action is taken before the congestion is predicted.

After the decision (STEP 1420), in order to proactively control the network load and avoid service interruptions, the network can take action on any combination of the following: 1) take preemptive steps to prevent additional UEs from attaching to the enterprise network (STEP 1422), 2) offload data flows currently-attached UEs to other networks (STEP 1424), and 3) re-allocate resources among UEs already attached to the network (STEP 1430).

Offloading data flows (STEP 1422) may include offloading one or more data flows, or all traffic with the UE. It may include transferring one or more IP addresses, or one or more ports to the other network. It may include splitting an IP address between the enterprise network and the other network. After offloading some flows, the UE may be communicating with both the enterprise network and the other network.

Resource allocation operations (STEP 1430) are shown in FIG. 14B. At the start of resource allocation (STEP 1432), a decision made in the previous steps (how to allocate resources) will be implemented. Resource allocation has multiple mechanisms, any of which can be utilized, for example: 1) restricting the QoS of the wireless connections with the UE (STEP 1434), 2) controlling the transmit power of the BS/APs (STEP 1436) (e.g., cell-breathing), and 3) active load balancing (STEP 1438).

The step of restricting the QoS resource allocation for each BS/AP (STEP 1434) can be accomplished in a number of ways. The restrictions can be to limit:

the bitrate granted for a QoS bearer of certain type (STEP 1442); for example, the bitrate can be restricted to 720 kbps;

the number of PRBs for a particular BS/AP (STEP 1444);

the number of GBR bearers of a given type (STEP 1446); and/or the grants to the BS/APs.

Another way to allocate resources is to adjust BS/AP's transmit power (STEP 1436). The preferred mechanism to adjust BS/APs' transmit power is to allow for "cell-breathing" to regulate users camped on a BS/AP. Cell-breathing is a mechanism that allows overloaded BS/APs to offload subscriber traffic to neighboring BS/APs by changing the geographic size of the BS/AP's service area. One cell breathes in (transmit power reduces, footprint and coverage gets smaller) another cell breathes out (transmit power increases, footprint and coverage gets larger). Heavily-loaded cells decrease in size, while neighboring cells increase their service area to compensate for the decreased size of the heavily-loaded BS/APs. Thus, some traffic will be handed off from the overloaded BS/AP to neighboring BS/APs, to balance the load across the network.

Still another way to allocate resources is by active load balancing (STEP 1438) by the enterprise network to distribute the load and prevent service disruptions. Active load balancing operation includes a connected mode handover (STEP 1439) controlled by the network, in which communication of an attached UE is transferred from one BS/AP to another BS/AP, even though that transfer may lower the QoS. In some embodiments the load balancing approach is performed selectively based upon the user type (STEP 1440), allowing for different behaviors. For example, higher priority users such as campus executors/administrators may be given a higher priority to stay on a BS/AP than a regular employee, a student, or a visitor. As another example, a user with a higher security level may be given a higher priority than one with a lower security level The identified congestion hotspots, heatmaps, and restrictions, can be implemented across the full enterprise system, and/or for each cell in the system.

After the congestion period is over, the actions taken to address the congestion can end (STEP 1428), the network resources can be reallocated by the network, and new UEs can be admitted as appropriate for the network to provide appropriate service levels to the UEs to which the BS/APs are attached.

During operation, network performance and congestion are monitored to provide feedback to the AI system. Accordingly, by monitoring network operations to allow re-allocation of network resources proactively in response to usage and service patterns, congestion can be avoided, and appropriate service provided to several UEs. For example, new performance data can be compared and/or combined with the previous data and new learning can be performed. Also, reinforcement learning techniques can be implemented using the new data and historical data to improve the AI system and thereby improve network performance.

Figure 15:
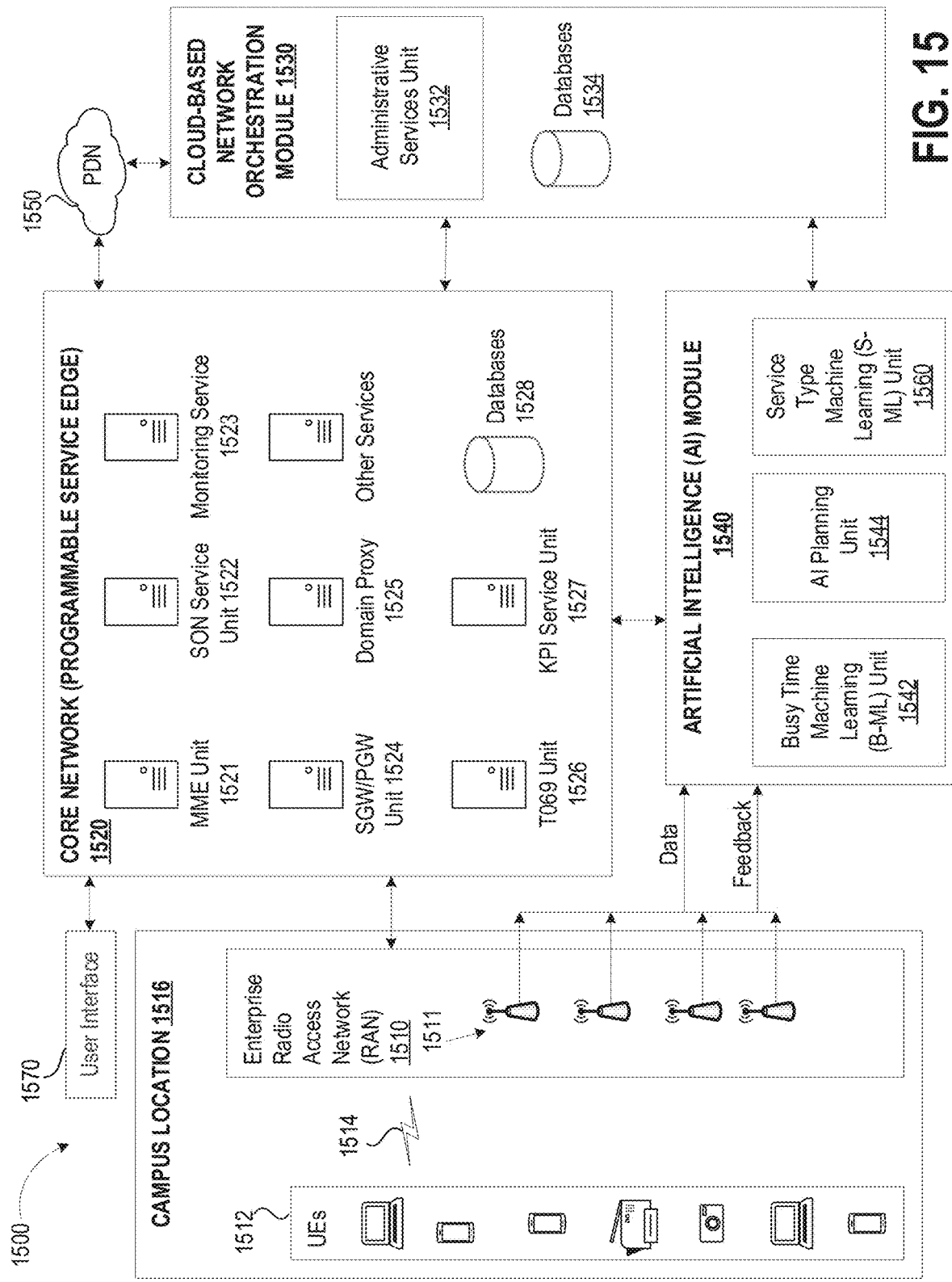
FIG. 15 is a block diagram of an implementation of an enterprise network that includes an Artificial Intelligence (AI) module, Machine Learning units, and an AI Planning unit.

(24) FIG. 15 Block Diagram

FIG. 15 is a block diagram of an implementation of an enterprise network 1500 that implements the techniques described herein. The enterprise network 1500 includes a radio access network (RAN) 1510 that includes a plurality of BS/APs 1511 that wirelessly communicate with a plurality of UEs 1512 over a wireless link 1514. The BS/APs 1511 are installed in a campus 1516, and the UEs 1512 are present in or around the campus 1516 to wirelessly communicate with one or more of the BS/APs 1511.

Data collected from the BS/APs 1511 is supplied to an Artificial Intelligence (AI) Module 1540 that includes a Busy Time Machine Learning (B-ML) Unit 1542 and an AI Planning Unit 1544. As discussed elsewhere, the data may include channel occupancy data, which is indicative of the load being experienced by the BS/APs 1511. Data can be collected in batches and history-based learning and/or ML techniques performed on the batch of data, and then implemented. Alternatively, or after initial learning using batches of data, data can be collected periodically or nearly continuously in real time, and learning and ML can be implemented automatically (e.g., 5-minute intervals) to continually improve the models and thereby continually improve network performance.

The AI module 1540, the B-ML Unit 1542, and the AI Planning Unit 1544 include appropriate circuitry to identify and learn busy time periods, consider options, choose actions, and determine when to perform the actions. AI systems are implemented, based upon any or all of the heatmaps, the estimated ability to defuse congestion by offloading traffic, and preemptive steps to prevent users from attaching to the enterprise network. The AI systems are implemented to monitor and anticipate congestion in the enterprise network, and respond proactively and appropriately using any of the techniques described herein to control the BS/APs and the network to reduce congestion or otherwise ensure that service needs of the UEs are met. The AI module 1540 is connected to the Core Network 1520, and supplies the results of its learning and other information the Core Network 1520, which in response directs and controls the BS/APs to proactively respond to predicted congestion.

The AI Module 1540 also receives feedback from the BS/APs 1511. Particularly, network performance and congestion may be monitored to provide feedback to the AI system. For example, new performance data can be compared and/or combined with the previous data and new learning can be performed. Also, reinforcement learning techniques can be implemented using the new data and historical data to improve the AI system and thereby improve network performance.

In the illustrated embodiment, the enterprise network 1500 includes a Core Network 1520 (also called a Programmable service edge or "PSE") that provides a variety of services for the network, and a cloud-based network orchestration module 1530 that provides administrative services 1532, databases 1534, and other functional units such as machine learning and artificial intelligence units. The Core Network 1520 includes a plurality of components that provide services for the network, including an MMF (Mobility Management Function) unit 1521, a SON (Self Organizing Network) service unit 1522, a monitoring service unit 1523, an SGW/PGW (Serving Gateway/Packet Data Network Gateway) unit 1524, a domain proxy 1525, a TR069 unit 1526, and a KPI (Key Performance Indicator) service unit 1527. The Core Network 1520 may also include databases 1528 and other units for additional network services 1529 as required or useful. In some implementations, the AI module 1540 may be implemented as part of the Core Network module 1520.

In some embodiments the Core Network 1520 is connected to a cloud-based network orchestration module 1530. The Core Network 1520 and the orchestration module 1530 may be connected via a Packet Data Network (PDN) 1550. The cloud-based orchestration components 1530 includes an Administrative Service Unit 1532 for remote administration of the enterprise network, databases 1534, and other components as may be necessary or useful. In some implementations, the AI module 1540 may be implemented as part of the orchestration module 1530.

(25) Managing Network Resources Based on Service Types

Many mobile devices (UEs) are simultaneously in use on campus locations, and many different application and services are popular and concurrently operating. Due the large number of UEs on campus locations, and coinciding schedules (e.g., breaks, lunch) that cause many people to make calls and access services around the same time, a strong possibility arises that the wireless system that supports these UEs will become overloaded at certain times and places. A system is described herein that learns service demand patterns and proactively adjusts network resources based upon service policies and preferences, to minimize service disruptions that may otherwise occur. In some embodiments, network resource adjusting includes adjusting QoS parameters and/or bitrate resource allocation based on recognized and/or predicted demand for a given service.

Examples of services that can be provided by a wireless network include:
voice calls;
web browsing;
downloads of document or other information;
video (e.g., YouTube);
social media (e.g., Facebook, Twitter);
video security cameras, sensors, and many others.

Any of these services may be requested by UEs, and most users expect to have access to services when requested or shortly thereafter, with at least an acceptable level of service. During the process of connecting to the network the UEs often indicate to the wireless network the type(s) of services that they are requesting. Based upon the service type, the wireless network can assign a certain Quality of Service (QoS) to the UE for its session.

Figure 16:
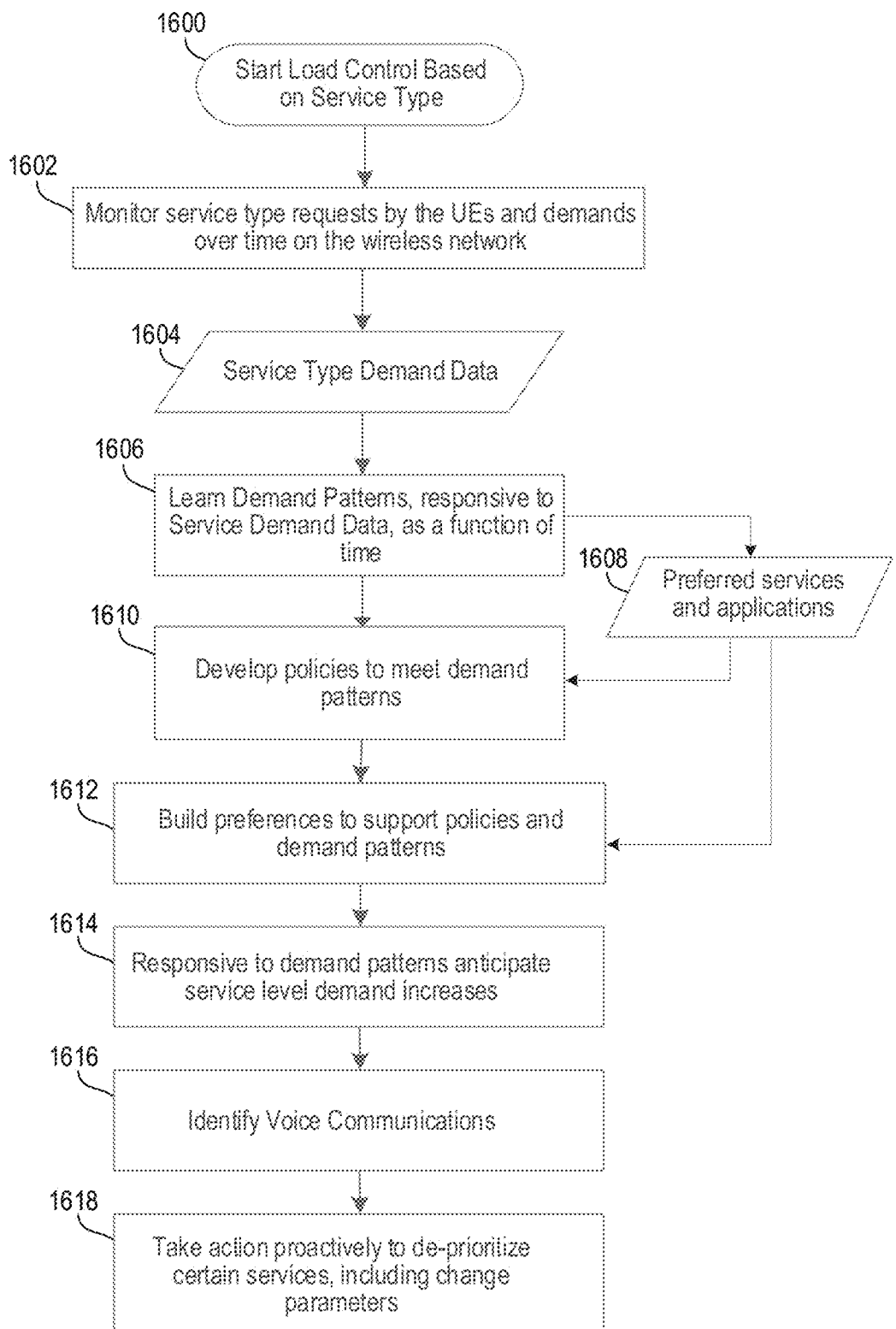
FIG. 16 is a flow chart of operations to learn service type patterns in a wireless communication network at a campus location, anticipate service requests, and control the services on the radio link to efficiently utilize network resources.

FIG. 16 is a flow chart of operations to learn service type patterns in a wireless communication network at a campus location, anticipate service requests, and control the services on the radio link to efficiently utilize network resources and provide appropriate service to as many UEs as possible. After starting operation (STEP 1600), the network begins monitoring service type requests by the UEs and the demands of those requesting (STEP 1602). Particularly, the numbers of each service type can be measured, including when the request was received, the type of service, the approximate location of the requesting UEs, the session time, and the BS/AP attached to the UE. Typically, this service type data (DATA 1604) is collected in the Core Network 1520, for example in the databases 1528.

(26) Recognize/Learn Demand for Services Using Machine Learning, Responsive to Service Data The service type data 1604 is then supplied from the Core Network 1520 to the Service Type Machine Learning (S-ML) Unit 1560 in the AI Module 1540 to learn the demand patterns for each service type as a function of time (or as a time-series of events), using any appropriate data mining, machine learning, and/or deep learning techniques. For example, the demand patterns for service types based on day-of-the-week/time-of-day can be learned and recognized. From these demand patterns or other information, preferred service and applications can be defined (DATA 1608). Accordingly, in some embodiments, the RAN that includes the plurality of BS/APs 1511 collects data and sends it to the AI module which performs data mining of the usage and service data to detect usage and service patterns.

(27) Develop Enterprise Policies and Preferences to Meet Predicted Service Demands.

Responsive to demand patterns, and the preferred services and application, policy configurations can be created (STEP 1610) for better supporting the preferred applications on the campus. Preferences can be built (STEP 1612) based on the learned information to adjust the parameters of both the application and the service based on the day/time, or a time-series of events. Following these preferences allows better regulation of the types of services that are admitted to the system, making the network more usable. These policies and preferences can be created and developed in the AI Planning Unit 1542 in the AI Module 1540, and stored in databases 1528 in the Core Network 1520, or in any suitable location.

In one embodiment, a User Interface (UI) 1570 is provided, connected to the Core Network 1520, which can be used by the managing entity (e.g., an IT administrator), to manually select and re-define the preferences and policies of the enterprise network. This UI 1570 allows the managing entity to change preferences and policies as needed or useful, which allows the enterprise to selectively throttle certain services and users (i.e., completely stop use reduced bit rates, or increase bit rates for certain services and users on one or more BS/APs), while giving other users priority. The services that can be selectively throttled include, for example, broadcast and multicast services. The services can be throttled at any time, for example throttling can be performed midstream. Throttling can be performed as a renegotiation of the current session that can be triggered if the QoS is reduced, or if more resources become available. Although not preferred, as an alternative the current session can be terminated, and then set up with different bitrate or QoS.

In some scenarios it is possible for a given user to be allowed certain services while other less preferred services are blocked. Unfortunately, blocking users' services is a denial of service that should be avoided under some circumstances; to address this, in some implementations certain users can be provided priority (e.g., by providing different levels of service for different classes of users such as gold, silver, bronze levels). For example, a user who is giving a presentation on campus in front of a group of people can be given a higher level of service. User service levels could be provided in the enterprise policy configuration.

In some instances, moving the UE to the MNO would be a better option for the UE. The Service Level Agreement (SLA) is negotiated using multi-dimensional parameterization with the managing entity establishing the allowed ranges, and these ranges could be implemented in the policies.

(28) Parameters Controlled

To establish preferences, some of the dimensions (parameters) to be considered include:

ranges in the allowed QoS parameters,
voice bit rate,
other bit rates (e.g., security camera bit rate, web browsing),
restrict the numbers of users supporting a given service (set to minimum),
region(s) of the network,
day-of-the-week,
time-of-the-day, and
using scheduler efficiency to define the relative priority of the particular service. Although it is not possible to directly control bit rates of many services (e.g., YouTube videos), the bit rate for a service can by indirectly changed by reducing the scheduler efficiency for the particular service or source (server) of a service, which de-prioritizes traffic (reduces priority), which causes the end-to-end efficiency of the service to automatically change. E.g., if students are taking a test, that server can be prioritized in the scheduler, which then de-prioritizes other services naturally, so that resources become available for the higher-priority services.

The User Interface (UI) 1570, which is connected to the Core Network 1520 and provided to the managing entity (e.g., an IT administrator), allows selection of these parameters, as well as select preferences and policies. Using the UI 1570 the managing entity can change preferences and policies as needed or useful, to allow the enterprise to selectively throttle certain services and users.

Responsive to learned service demand patterns, policies, and preferences of a particular enterprise network, an increase in services can be anticipated (STEP 1614) in, e.g., the AI Planning Unit 1542. When an increase is anticipated, voice calls are identified (STEP 1616), and action can be taken proactively (STEP 1618) to provide an appropriate service to a larger number of UEs, and to prevent service interruptions. This action can de-prioritize certain services, and/or change parameters. For example, the voice bit rate can be decreased, the ranges in the allowed QoS parameters can be decreased, bitrates can be decreased (e.g., voice, web browsing, video), the number of uses supported on a given service can be decreased (e.g., set to a minimum), and the scheduler efficiency can be changed as described above to prioritize certain services over others.

(29) Recognizing VoIP Call and Granting QoS

Recognizing VoIP packets in VoIP traffic, and allowing for an appropriate QoS to be granted can significantly improve the voice quality of a VoIP call. First however a VoIP call must be identified as a VoIP. Sometimes it is clear that a session's traffic is VoIP, for example the network may have been notified in some manner. However, in other instances, there is no indication, and the individual VoIP packets appear no different from any others.

Figure 17:
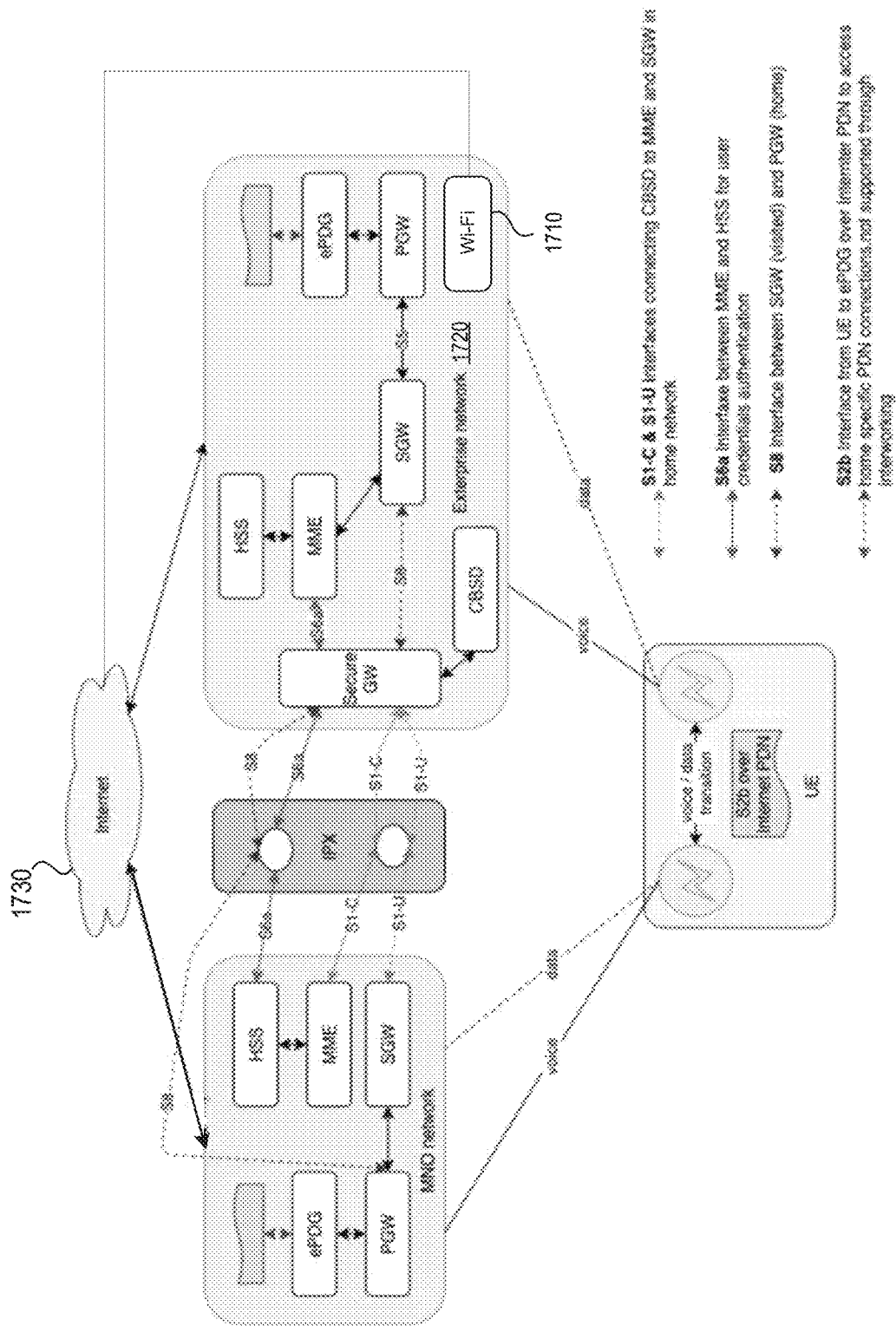
FIG. 17 is a block diagram of a communication system that shows an example of a scenario in which the VoIP call is routed from a UE, through the wireless (CBRS) network, through the internet, and then to the Mobile Network Operator (MNO).

For example, there are scenarios where the CBRS Enterprise network does not have direct connectivity with the MNO network, and the UE has acquired Enterprise credentials to allow for data offload on the CBRS network. FIG. 17 is a block diagram of a communication system that shows an example of a scenario in which the VoIP call is routed from a UE, through the wireless (CBRS) network, through the internet, and then to the Mobile Network Operator (MNO). Under such scenarios, the UE may have established an ePDG (evolved Packet Data Gateway) tunnel connectivity to reach, for example the IP Multimedia Subsystem (IMS) services from the MNO network. IMS is a general-purpose, open industry standard for voice and multimedia communications over packet-based IP networks. It is a Core Network technology, that can serve as a low-level foundation for technologies like VoIP, Push-To-Talk (PTT), Push-To-View, Video Calling, and Video Sharing. In this scenario, the VoIP packets are tunnel packets transmitted over the Internet PDN via the CBRS network.

The voice quality of a VoIP call can be significantly improved by recognizing VoIP calls in the wireless traffic, and allowing for an appropriate QoS to be granted to those calls. However, it can be difficult to distinguish the packets of a VoIP call from other, non-VoIP packets, especially if the packets are being transmitted through a tunnel such as a VPN tunnel. To identify VoIP call packets from the packets of all the other sessions at a BS/AP, incoming and/or outgoing packets are analyzed for signatures, using deep packet inspection, which inspects the headers and other portions of the packet to look for voice packet signatures. In some embodiments, VoIP packets are recognized using deep learning. Signatures of VoIP traffic include: uniform packet sizes that are relatively small (e.g., ~100 bytes-150 bytes) and packets that are periodic (e.g., the packets are generated every 20 ms). In addition, the VoIP packets may arrive bursty and with more jitter than other packets, especially in a system that operates in 40 ms DRX (Discontinuous Reception, which is used to conserve battery energy), in which the VoIP packets generated every 20 ms often arrive in groups of two or more.

In summary, the network traffic of a VoIP call with a given UE exhibits distinct listen, silence, talk periods that can be identified by observing, respectively: 1) the downlink (DL), 2) no-traffic (except control packets), and 3) uplink (UL). The ongoing communication sessions are analyzed to look for these signatures, and if found, the session is identified as a VoIP call session. Even during the silence periods, the control packets are exchanged in-band on the same channel as the VoIP traffic, and these control packets also exhibit the same signature that can be used to identify a VoIP session.

After a VoIP session has been identified, the appropriate QoS is assigned to it. If action is being taken (STEP 1618) to de-prioritize certain services in anticipation of an impending overload, then the VoIP session is marked as a voice call, which will give it a higher level of service than a generic data session. In addition, the VoIP-identified session packets may be marked with DSCP (Differentiated Services Code Points) codepoints for transmitting through the internet, e.g., the packets can be marked as expedited forwarding packets, so that internet recognizes that the packets are to be sent expeditiously, with minimal delay, jitter, and loss.

In some embodiments, recognizing the VoIP session may include recognizing voice over long-term evolution (VoLTE) packets, and in particular VoIP packets over ePDG. Furthermore, in some embodiments, the IP Planning system recognizes the congestion levels for appropriate bit rate grants for detected VoIP calls and the bit rate can be set accordingly, and in addition, the network may enable RTP (Real-time Transport Protocol) packet bundling.

The following summarizes some data collection and training/learning methods for service types. 1) To learn to recognize peak utilization of service types, data is collected to determine services that have peak utilization, per BS/AP, time-of-day, and day-of-week. The training/learning method is to determine the popular service(s) and ensure resource availability by regulating other traffic/QoS allowed for this service. 2) For voice traffic recognition, collect data and look for a specific pattern of talk/listen/silence, periodically-generated packets, and uniform packet sizes. The packet sizes are dependent on the type of connectivity. In one embodiment, recognizing a voice over ePDG (connecting to 4G Evolved Packet Core (EPC)) or N3IWF (Non-3GPP Interworking Function) (connecting to 5G core (5GC)) will need to be done given that QoS interface to the PCRF (Policy and Charging Rules Function) will not exist for this. The training/learning method has the purpose of granting the QoS bit rates based on the current congestion levels in the network. The bitrates need to account for the packet sizes carried over the ePDG/N3IWF connection. Features like RTP packet bundling can be enabled to reduce packet-header-size implications. Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

(30) Bearer Timers

(31) Overview

The following description discloses methods and apparatus for managing wireless Enterprise Networks (EN) for greater efficiency to provide better utilization of the EN's communication resources. Accordingly, UEs wirelessly connected to the EN, and UEs that request to be wirelessly connected to the EN, can be more efficiently allocated the EN's available resources, which allows greater overall UE utilization of the available resources.

The following description discloses a method and apparatus that learns a timer that provides an inactivity limit for short communication pauses that typically occur between bursts of activity in the packet streams in the communication traffic through the bearers of the particular EN. This inactivity limit predicts the behavior of the packet streams of similar service types, which allows the EN to more efficiently allocate network resources. The method and apparatus monitors real-time communication and utilizes this inactivity limit to determine whether or not to release a UE from a bearer. Particularly, the method and apparatus monitors packet communications on those bearers in real time and continuously determines an elapsed time since the last packet on each stream. An inactivity timer is selected based upon service type (and optionally time). The elapsed time is compared with the inactivity limit, and if the inactivity limit is exceeded, then the EN determines whether or not to release the bearer from a UE considering factors such as congestion, predicted congestion, expected lull time, probability and cost of reconstruction, service type, UE type, and UE location.

The term "bearer" is used broadly herein and includes communication links between two or more nodes in a communication system. In a Core Network, a bearer may be an end-to-end communication link that defines a particular Quality of Service (QoS), so that communications assigned to that bearer by the network can be promised the QoS suitable for its needs. For example, a voice call requires a tighter delay and jitter (i.e., has higher QoS) requirements than a small data download. Generally a single core network bearer can carry multiple packet streams; for example core network bearers may include two types: one type restricted to specific UEs and another type that carries traffic for a group of UEs, such as network slice/application-type bearers. The core bearers may span across the enterprise edge, a DC/private cloud, a metro edge, and/or a public cloud, based on the node where the functions are deployed. A "DC" refers to a "Data Center, and a DC/private cloud is a virtualized cloud running in the private data center of an enterprise.

In a Radio Access Network (RAN), a Radio Bearer (RB) may provide a bearer between the UE and the RAN Network. Another bearer (e.g., an S1 bearer in LTE) interconnects the RAN Network with the Core Network, and can carry multiple packet streams from multiple UEs. A Radio Access Bearer (RAB) is a combination of a Radio Bearer and a bearer (e.g., the S1 bearer) that interconnects the RAN to the core network. Generally, in telecommunications, a bearer service or data service is a service that allows transmission of information signals between network interfaces. These services give a subscriber the capacity required to transmit appropriate signals between certain access points, i.e., user network interfaces, with certain QoS expectations. A bearer can carry multiple packet streams.

Figure 18:
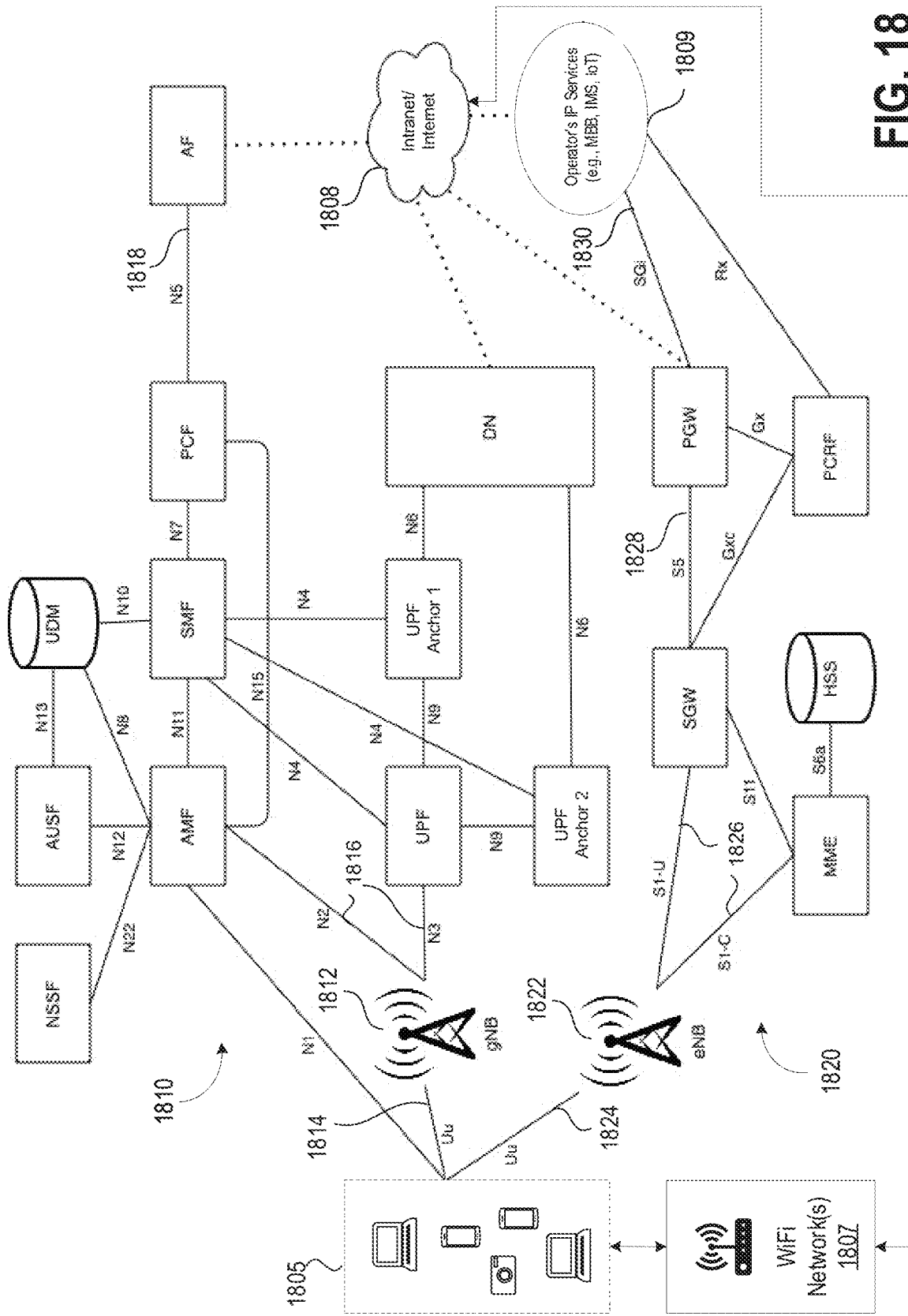
FIG. 18 is a block diagram of one example of an Enterprise Network (EN) including a number of bearers in an NR (5G) Network and an LTE (4G) Network.

FIG. 18 is a block diagram of one example of an EN showing a number of bearers. In this example, the EN includes a plurality of UEs 1805 each of which is connected to an NR (5G) Network shown generally at 1810 or an LTE (4G) Network shown generally at 1820.

Following is a list of the 5G acronyms shown in FIG. 18:
NSSF: Network Slice Selection Function
AUSF: Authentication Server Function
UDM: Unified Data Management
AMF: Access and Mobility Management Function
SMF: Session Management Function
PCF: Policy Control Function
AF: Application Function
UPF: User Plane Function
DN: (Software) Defined Networking Following is a list of the 4G acronyms shown in FIG. 18:
SGW: Serving Gateway
MME: Mobility Management Entity
HSS: Home Subscriber Server
PGW: Packet Gateway
PCRF: Policy and Charging Rules Function Any of the UEs 1805 may also be wirelessly connected to a Wi-Fi Network 1807 via a Wi-Fi router or other BS/AP. The Wi-Fi Network 1807 is connected to an Intranet/Internet 1808 that provides a connection to external networks and the core network, including the operator's IP services 1809 within the core network. FIG. 17 shows a prior art embodiment in which a Wi-Fi Network 1710 is part of an EN 1720, and connected directly to the internet 1730.

In the embodiment shown in FIG. 18, a RAN connection can connect any of the UEs 1805 with the NR Network 1810, the LTE Network 1820, a combination of the NR and LTE Networks, or the Wi-Fi Network 1807. In the embodiment shown in FIG. 18, the NR Network 1810 includes a gNB BS/AP 1812 that is connected to the UEs 1805 via an RRC Connection (Radio Bearer (RB)) 1814, which in this implementation includes a Uu-type bearer. The gNB 1812 is connected to the NR core network via core bearer 1816, including N2 and N3 bearers, which connect respectively to the AMF unit and UPF unit. Within the NR core network, a number of Core Network bearers connect the functional units, for example a Core Network bearer N5 (shown at 1818) connects the PCF unit to the AF unit, which connects to the Internet/Intranet, or other IP services. The LTE Network 1820 includes an eNB BS/AP 1822 that is connected to the UEs 1805 via an RRC Connection (Radio Bearer (RB)) 1824, which in this example is a second Uu-type bearer. The eNB 1822 is connected to the LTE core network via an S1-U bearer and an S1-C bearer (shown at 1826), which connect respectively to SGW and MME units. The combination of the RB 1824 and one of the S1 Bearers 1826 defines a Radio Access Bearer (RAB). Within the LTE network 1820, a number of other bearers connect the functional units, for example an S5 (shown at 1828) bearer connects the SGW and the PGW. An SGi bearer 1830 connects a PGW with the Operator's IP Services and also to an Intranet/Internet. Multiple bearers may be combined to define a single, longer bearer, and define an end-to-end connection for example. As will be described, a timer with an inactivity time limit for any of these bearers will be learned and if exceeded, the network will determine whether or not to release (or downgrade) the bearer from the UE to which the bearer is attached.

In an NR (5G) 5G system such as shown at 1810 there may be multiple bearer pathways available to a UE. Therefore, even if one of the bearers is released from a UE, the UE may be able to utilize an alternative bearer and avoid any service interruption, which can be advantageous.

The EN may comprise a CBRS network, which can be implemented using any appropriate wireless network technology that can connect to UEs. For example, either or both of the NR (5G) Network and the LTE (4G) shown in FIG. 18 may be implemented in a CBRS system. The EN with a CBRS network may also include a Wi-Fi network, such as shown in FIG. 17.

(32) Inter-Burst Packet Arrival Time

Figure 19:
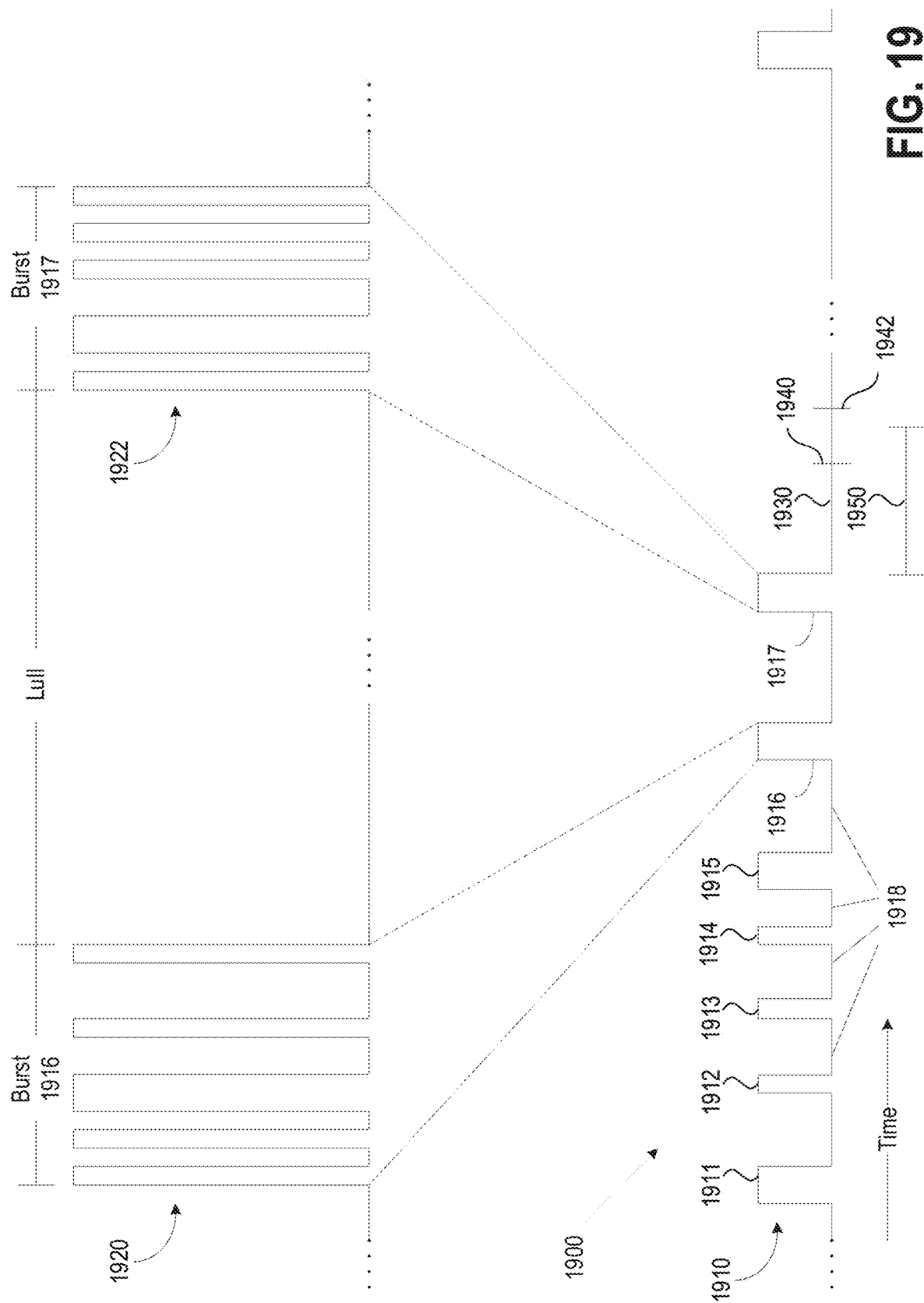
FIG. 19 is a packet waveform diagram showing an example of a packet stream communication with a UE through a network, which may be observed at a communication node.

Generally, packet-based communication streams transmitted across a network are characterized by a series of closely-spaced bursts of several packets separated by short time intervals (e.g. several milliseconds). FIG. 19 is an example of a packet stream 1900 between a UE and a remote server, which may be observed at a communication node.

The packet stream includes series of closely-spaced bursts 1910 including a first burst 1911, a second burst 1912, a third burst 1913, a fourth burst 1914, a fifth burst 1915, a sixth burst 1916, and a seventh burst 1917 separated by short lull intervals 1918.

Each burst 1910 includes a series of packets of varying length separated by varying intervals. The sixth packet 1916 and the seventh packet 1917 are shown expanded respectively into first series of packets 1920 and a second series of packets 1922. The packets are separated by varying intra-burst packet intervals that are much shorter than the typical inter-burst lull between bursts.

The closely-spaced bursts 1910 are generally followed by a much longer, extended lull period 1930 (e.g. 5-50 seconds or longer), after which the packet stream might resume or may be terminated. It has been found that the length of the extended lulls of certain service types can be correlated, to some extent, with a likelihood (probability) that the session will terminate, or if it will resume, how long until the packet stream might resume. The short intervals 1918, and the longer lulls 1930 of different service types can be observed, and an expected arrival for the next burst can be determined for each service type based upon observations and empirical results. For example, the observed short intervals and longer lulls can be built into a Poisson arrival model using an exponential inter-arrival packet delay, which predicts an expected arrival time of the next packet after the last packet in a burst. Based upon numerous observations of communications streams of the same service type, an inter-burst packet arrival time can be developed as a time-series, for both the short intervals and the long lulls between bursts.

Based upon the inter-burst packet arrival time, an inactivity timer including an inactivity timer that includes an inactivity time limit for the typical short lull intervals and an expected lull for the longer lulls can be developed for each service type as will be described, which predicts behavior of packet streams of each service type, based upon these empirical observations.

For example, a web page load between two entities has an extended lull period that depends upon the service type: typically, after loading a web page in a burst of activity, there is a usually predictable delay of e.g. 45-55 seconds before loading the next page. However for YouTube traffic, there is a generally predictable extended lull period of 5-10 seconds between bursts of activity. For a push to talk application, the longer lull period may be in the 2-3 second range, maybe you don't release the bearer from the UE.

To create a timer, as will be described, the expected inter-burst packet arrival time between typical bursts of activity is utilized to establish inactivity limits. For example, time 1940, which is the same time period as the longest typical lull interval in the packet stream can be used with a reasonable level of confidence (e.g. 95%) To get a higher level of confidence in the inactivity limit, a longer time period 1942 may be used. Advantageously, different values for the timer, dependent upon network conditions, can be chosen.

(33) Learning Inactivity Timers

Figure 20:
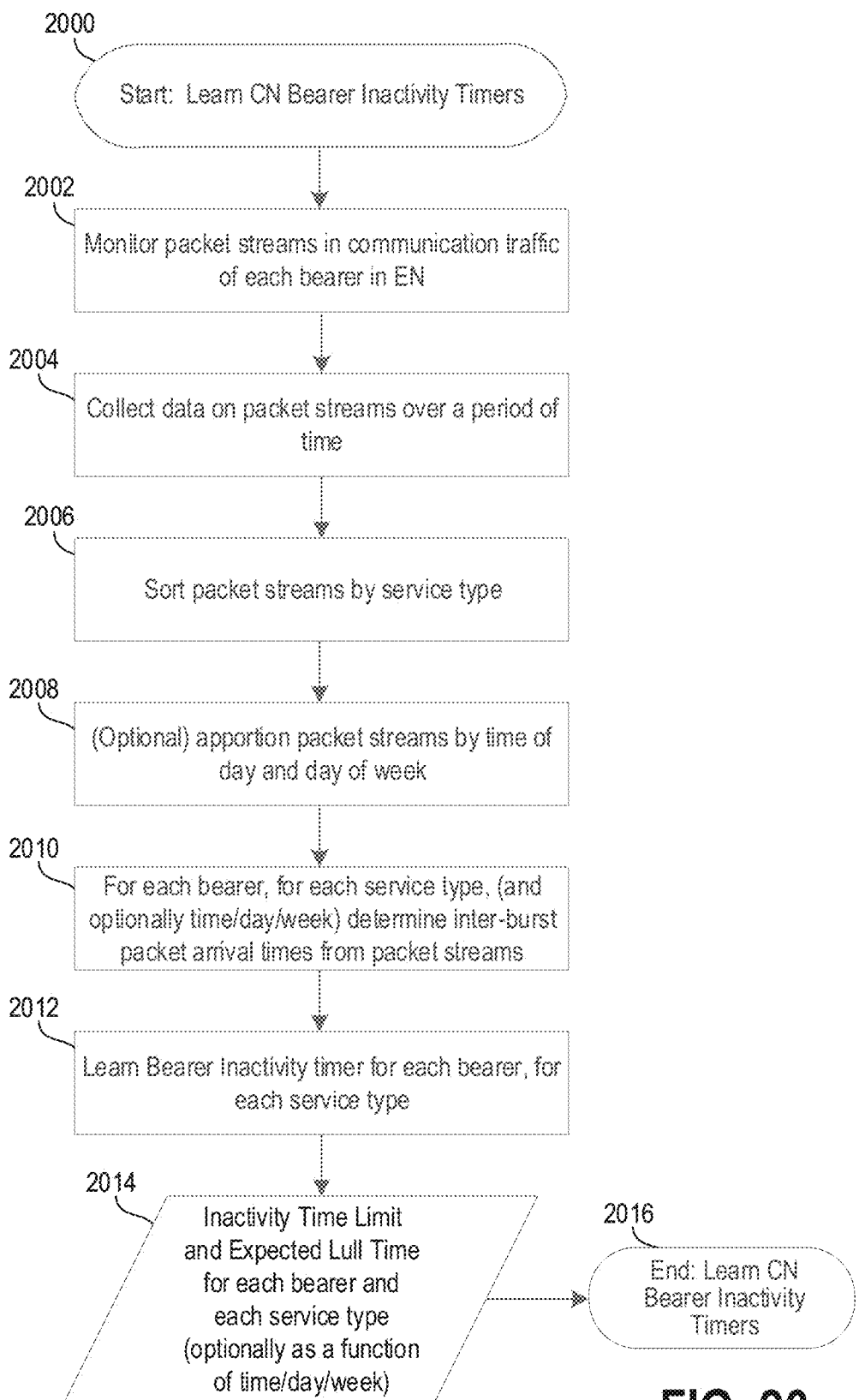
FIG. 20 is a flowchart of operations to learn a bearer inactivity timer including inactivity time limits and expected lull times for Core Networks.
Figure 21:
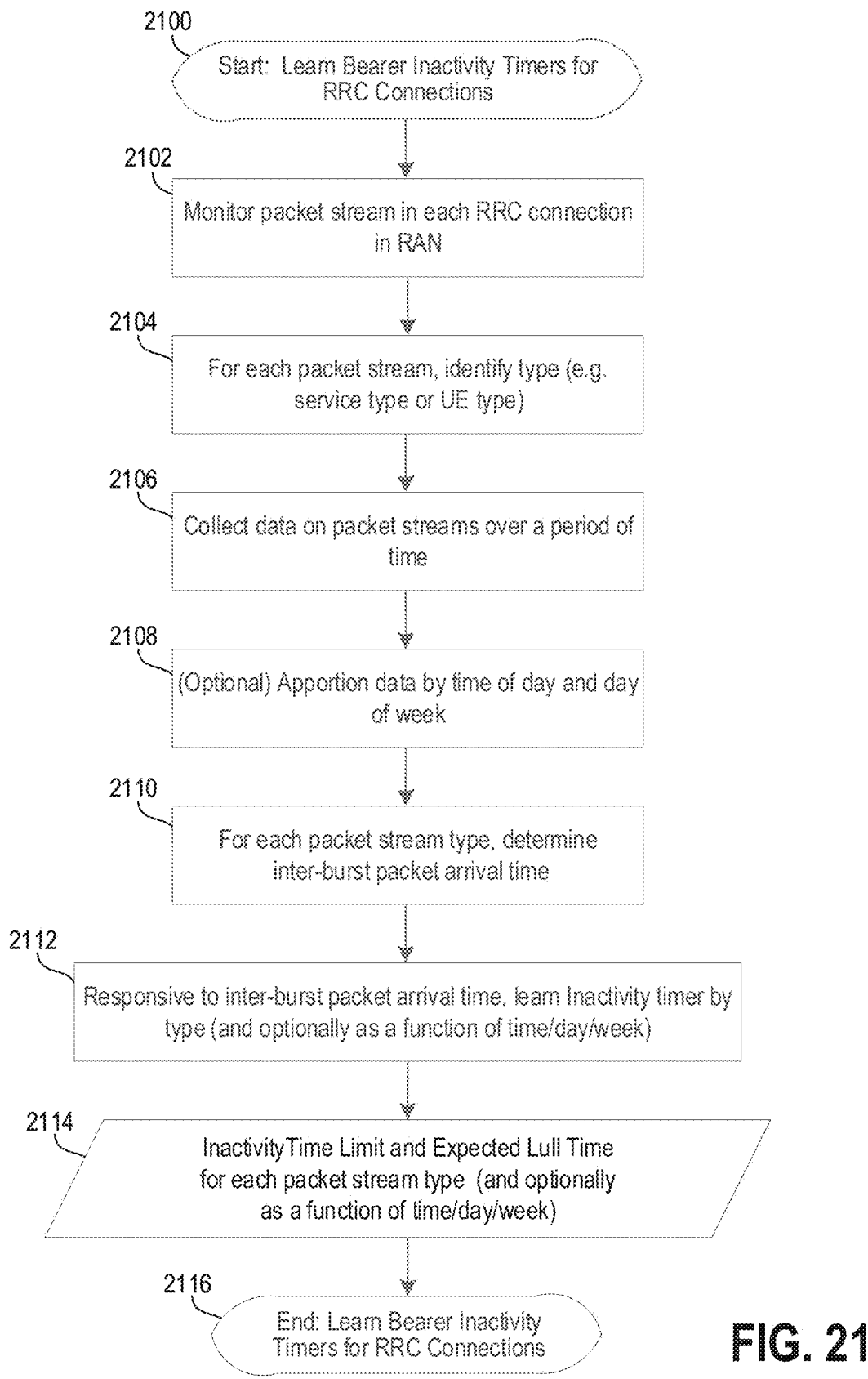
FIG. 21 is a flowchart of operations to learn the inactivity timers including inactivity time limits and expected lull times for RRC connections, including Radio Access Bearer (RB) connections between UEs and one or more BS/APs.
Figure 22:
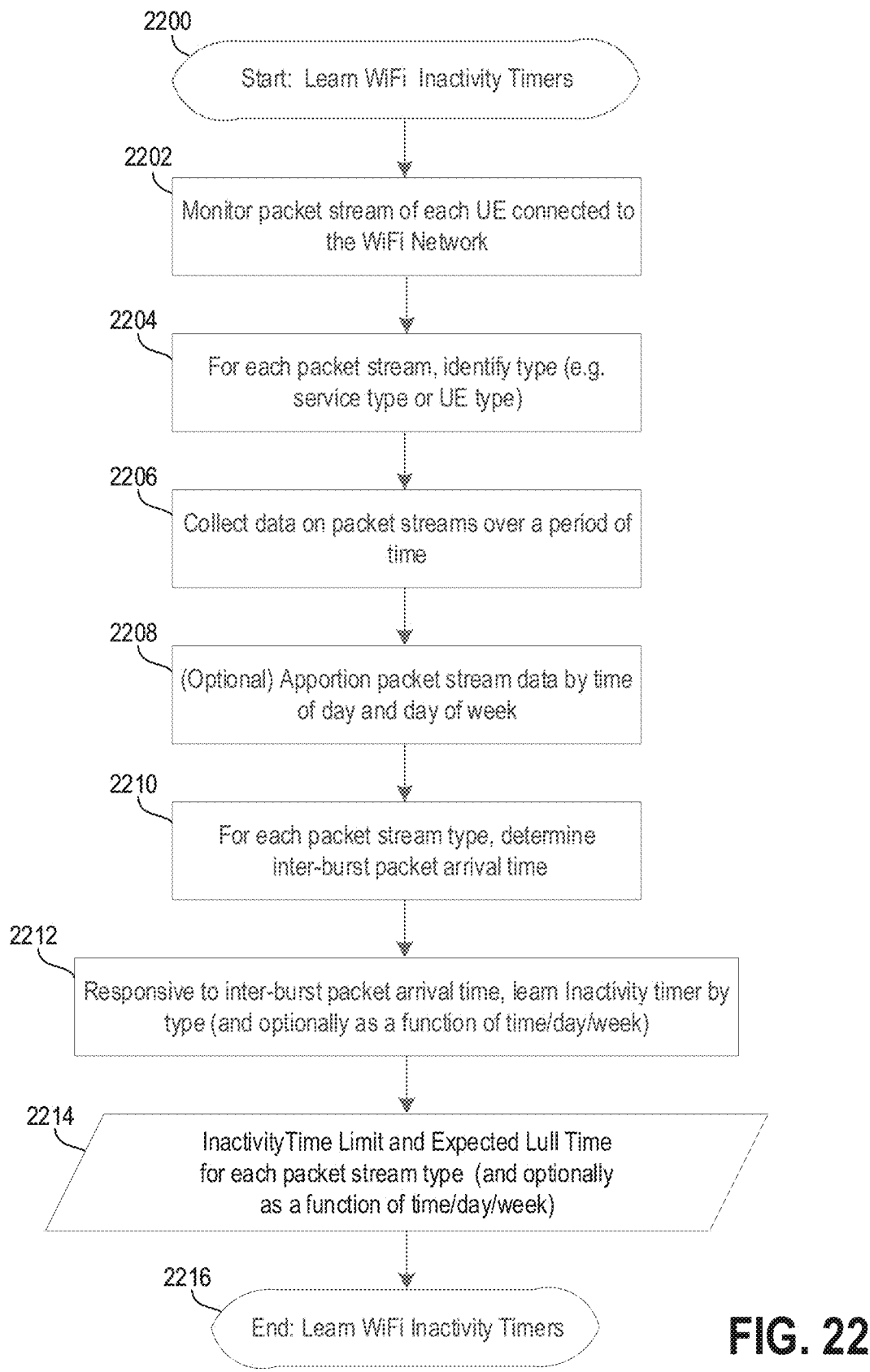
FIG. 22 is a flowchart of operations to learn a Wi-Fi inactivity timer.

FIGS. 20, 21, and 22 are flowcharts showing operations to learn bearer inactivity timers for the EN; particularly, FIG. 20 is a flowchart of operations to learn the Core Network bearer inactivity timer, FIG. 21 is a flowchart of operations to learn the Radio Bearer (RB) inactivity timer (for an RRC Connection), and FIG. 22 is a flowchart of operations to learn the Wi-Fi inactivity timer. For each network, these learning operations provide one or more inactivity timers that provide an inactivity limit for the UE packet stream in the network, which is then used, as will be described, as a threshold to then determine whether or not to release a bearer in its respective network from a UE that is using the bearer.

The inactivity timers can be developed to provide different timers depending upon the bearer, service type and time of day/day of week. The inactivity timers are developed empirically, based upon observations over time of packet streams for a particular service type for a particular bearer, connection, or UE. Learning the bearer inactivity timer may utilize Artificial Intelligence (AI) operations such as data mining or machine learning, and may utilize Poisson arrival time, exponential packet delay models. Time-series techniques and a moving time window time-series may be utilized in which changes in variables are monitored and utilized to look at sequence and rate of change.

(34) Learning Core Network Bearer Inactivity Timer (LTE, NR)

FIG. 20 is a flowchart of operations to learn a bearer inactivity timer including inactivity time limits and expected lull times for Core Networks, particularly for Core Networks that implement multiple bearers that provide different QoS's for different service types, such as the NR (5G) and LTE (4G) Core Networks shown in FIG. 19. In this network configuration, one or more UEs can be assigned to a single bearer, i.e., a single bearer in the Core Network may carry traffic for multiple UEs.

After starting (STEP 2000) to learn the Core Network (CN) Inactivity Timers, the packet streams in the communication traffic on each bearer in the EN are monitored (STEP 2002). This monitoring can be done at any node or other location where the traffic on the bearer can be monitored. The bearers can be monitored in parallel, or in any appropriate order. One, some, or all of the bearers in the EN may be monitored; but typically many of the bearers and many different types of traffic are monitored in order to create inactivity timers for each of the bearers for each of the major types of traffic.

Data of the packet streams from each bearer is collected (STEP 2004) over a period of time long enough to provide adequate data for the learning process, generally at least a week, and possibly many months. In some embodiments the data collection may be done periodically or even substantially continuously in order to update the inactivity timer with the most recent activity.

The packet stream data for each bearer is sorted (STEP 2006) by service type. The sorted data may be apportioned (STEP 2008) by time of day and day of week (time/day/week) using any appropriate interval (e.g., 10 minutes) for each bearer and each service type supported by that bearer. Then the sorted, apportioned data is used to determine the inter-burst packet arrival time (STEP 2010) for each packet stream such as by calculation, Artificial Intelligence (AI) operations such as data mining or machine learning, or other means. Responsive to the inter-burst packet arrival time, the bearer inactivity timer is determined (STEP 2012) which provides (DATA 2014) a bearer inactivity timer including an inactivity time limit for the normal short intervals between bursts, and an expected value for the long lull time after which the packet stream may resume (if it does resume rather than terminate). The inactivity timer is determined for each bearer and each service type, and optionally as a function of time/day/week. Learning the bearer inactivity timer may utilize Artificial Intelligence (AI) operations such as data mining or machine learning.

Operation to learn the CN bearers then ends (STEP 2016); however it may be repeated at a later time to update the inactivity timers with more recent information from the bearers.

(35) Learning RAN Bearer Inactivity Timer

FIG. 21 is a flowchart of operations to learn the inactivity timers including inactivity time limits and expected lull times for RRC connections, including Radio Access Bearer (RB) connections between UEs and one or more BS/APs. Each RRC connection with a UE is a Radio Bearer (RB) that provides the services needed by that UE; i.e., the RAN does not usually have separate connections (bearers) for different service types.

After starting (STEP 2100) to learn the RB Inactivity Timers, the packet streams in the communication traffic of each RRC connection with a UE are monitored (STEP 2102). This monitoring can be done at the connected BS/AP or any node or other location where the traffic on the connection can be monitored. The RRC connections can be monitored in parallel, or in any appropriate order. One, some, or all of the RRC connections in the RAN may be monitored; but typically all of the connections are monitored in order to create inactivity timers for each of the connections.

A packet stream type for each RCC packet stream is identified (STEP 2104). The type may include a service type, or may be determined based upon the type of UE.

The packet stream data is collected (STEP 2106) over a period of time long enough to provide adequate data for the learning process, generally at least a week, and possibly many months. In some embodiments the data collection may be done periodically or even substantially continuously in order to update the inactivity timer with the most recent activity.

The packet stream data from each RCC connection is then (optionally) apportioned (STEP 2108) by time of day and day of week (time/day/week) using appropriate intervals (e.g. 10 minutes). The processed data is collected by the packet stream type, which is then used to determine, for each packet stream type, the inter-burst packet arrival time (STEP 2110) in a suitable manner such as by calculation. Responsive to the inter-burst packet arrival time, the bearer inactivity timer is determined (STEP 2112) for each type of packet stream, which provides (DATA 2114) an RRC connection (bearer) inactivity timer including an inactivity time limit and an expected lull period for each packet stream type, optionally as a function of time/day/week. Operations relating to learning the bearer inactivity timer may utilize Artificial Intelligence (AI) operations such as data mining or machine learning.

Operation to learn the RRC Connection Inactivity Timers then ends (STEP 2116); however operations may be repeated at a later time to update the inactivity timers with more recent data.

(36) Learning Wi-Fi Bearer Inactivity Timer

FIG. 22 is a flowchart of operations to learn the Wi-Fi inactivity timer. In operation, a UE can connect both to WiFi and EN Networks, each using a different IP address; i.e., the UE has two different IP addresses. Wi-Fi networks utilize multiple channels to communicate packet data, however, the channels in WiFi are not bearers as they are not dedicated to a UE; i.e., no bearer is dedicated or assigned in WiFi, and therefore Wi-Fi networks don't set up a connection. Channels in Wi-Fi are allocated upon request, and then terminate. Regardless, an inactivity timer can be developed for the Wi-Fi using principles discussed herein.

FIG. 22 is a flowchart of operations to learn Wi-Fi inactivity timers including inactivity time limits and expected lull times for Wi-Fi connected UEs. After starting (STEP 2200) to learn the Wi-Fi Inactivity Timers, the packet streams in the communication traffic with each UE are monitored (STEP 2202). This monitoring can be done at the connected Wi-Fi access point or any node or other location where the traffic on the connection can be monitored.

A packet stream type for each Wi-Fi packet stream is identified (STEP 2204). The type may include a service type, or may be determined based upon the type of UE.

The Wi-Fi packet stream data is collected (STEP 2206) over a period of time long enough to provide adequate data for the learning process, generally at least a week, and possibly many months. In some embodiments the data collection may be done periodically or even substantially continuously in order to update the inactivity timer with the most recent activity.

The packet stream data from each UE is then (optionally) apportioned (STEP 2208) by time of day and day of week (time/day/week) using appropriate intervals (e.g. 10 minutes). The processed data is collected by the Wi-Fi packet stream type, which is then used to determine, for each packet stream type, the inter-burst packet arrival time (STEP 2210) in a suitable manner such as by calculation. Responsive to the inter-burst packet arrival time, the Wi-Fi inactivity timer is determined (STEP 2212) for each packet stream type, which provides (DATA 2214) a Wi-Fi inactivity timer including an inactivity time limit and an expected lull period for each packet stream type, optionally as a function of time/day/week. Operations relating to learning the Wi-Fi inactivity timer may utilize Artificial Intelligence (AI) operations such as data mining or machine learning.

Operation to learn the Wi-Fi Inactivity Timers then ends (STEP 2216); however operations may be repeated at a later time to update the inactivity timers with more recent data.

(37) Overview: Utilizing Inactivity Timers

Figure 23:
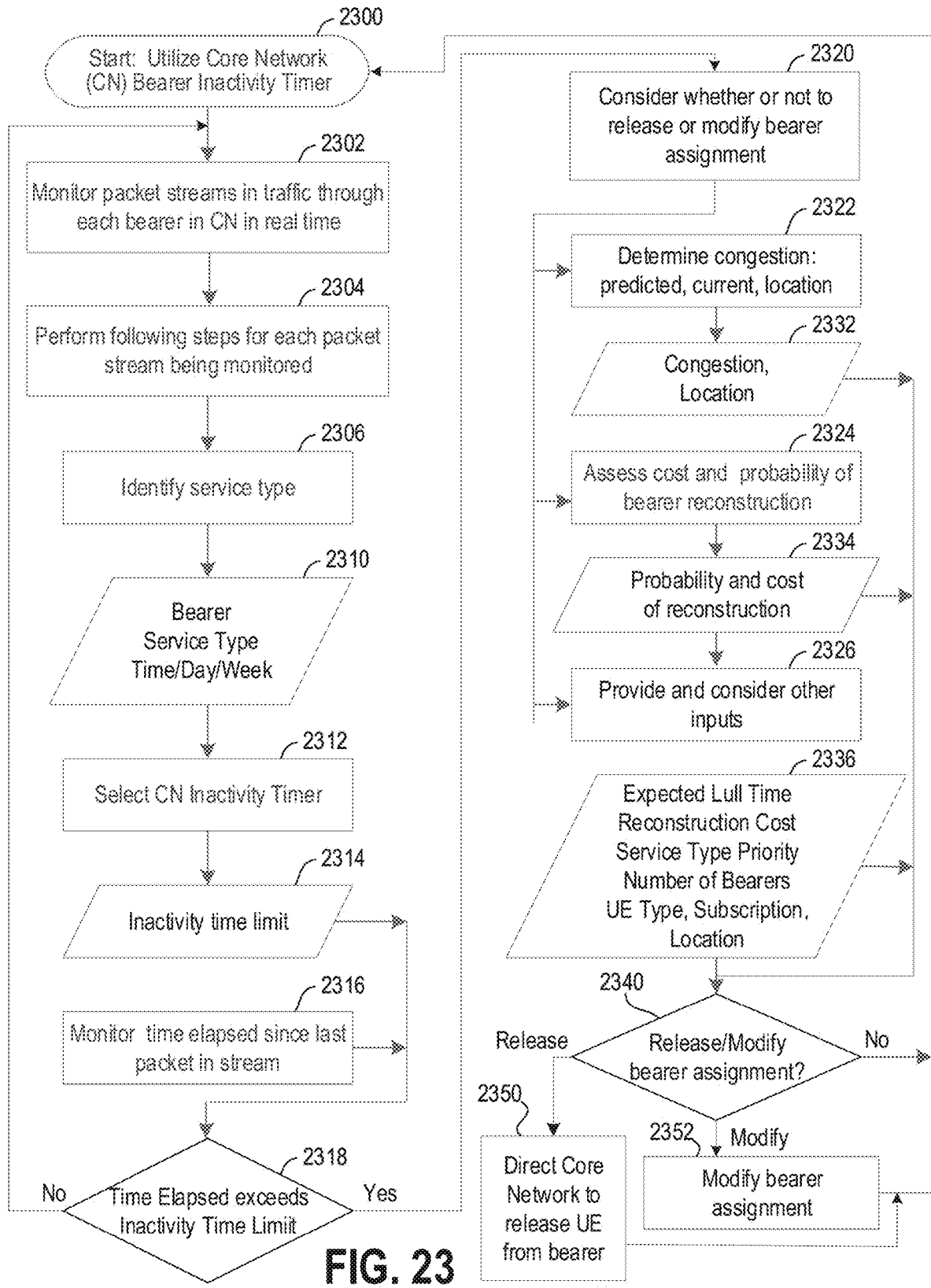
FIG. 23 is a flowchart of operations to utilize the bearer inactivity timer and inactivity time limits for Core Networks to release or modify a bearer assigned to a UE.
Figure 24:
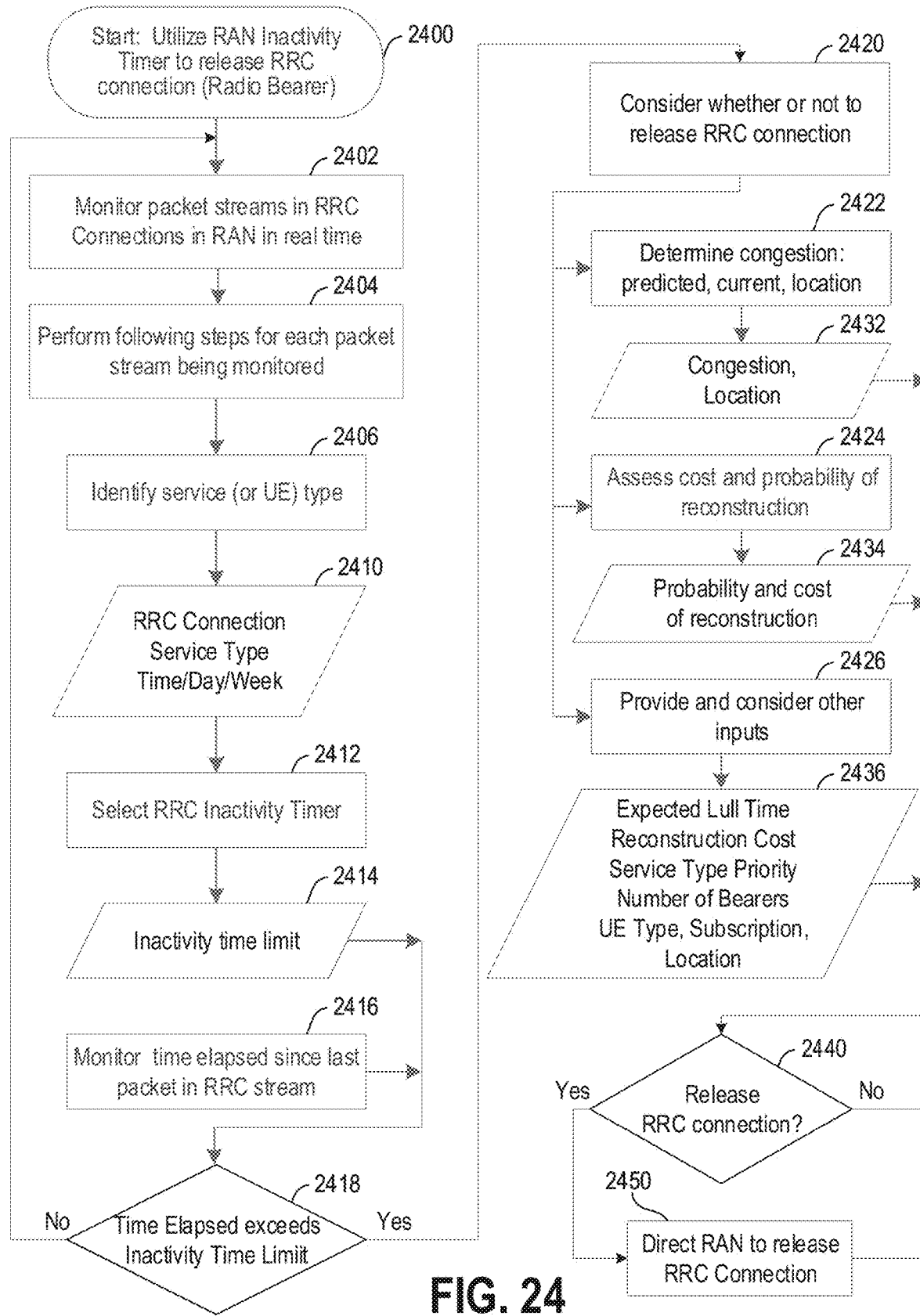
FIG. 24 is a flowchart of operations to utilize the RRC connection inactivity timer and inactivity time limits for the RAN to release an RRC connection.

FIGS. 23, and 24 are flowcharts showing operations to release UEs from bearers responsive to inactivity limits; particularly, FIG. 23 is a flowchart of operations to utilize the Core Network bearer inactivity limit in a process to determine whether or not to release a Core Network bearer. FIG. 24 is a flowchart of operations to utilize the Radio Access Network (RAN) inactivity timer in a process to determine whether or not to release an RRC connection. These bearer release operations can be used by the EN management to more efficiently operate the EN and provide better service overall.

Figure 25:
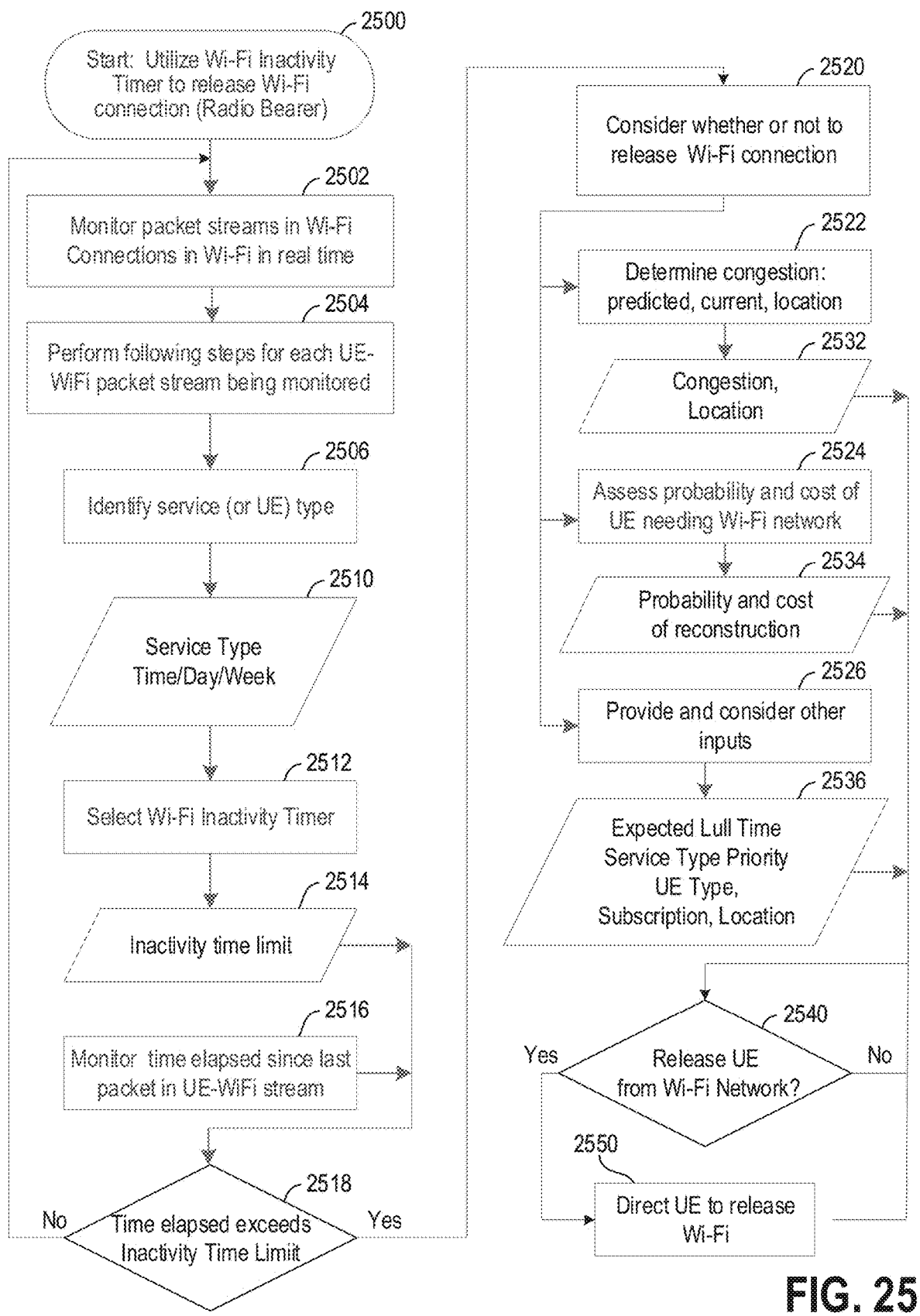
FIG. 25 is a flowchart of operations to utilize the Wi-Fi inactivity timer and inactivity time limits for the Wi-Fi network to release a UE from the Wi-Fi Network.

FIG. 25 is a flowchart of operations to utilize the Wi-Fi network inactivity timer in a process to determine whether or not to terminate or modify UE communications with a Wi-Fi Network. These operations can be used by the EN management to more efficiently operate the EN and provide better service overall.

As will be described these operations provide the EN with tools to manage network congestion and flexibility to determine which UEs it wants to release, which allows the network to manage its communications and more efficiently use its resources.

(38) Utilizing Core Network Bearer Inactivity Timer

FIG. 23 is a flowchart of operations to utilize the previously-determined (see FIG. 20) bearer inactivity timer and inactivity time limits for Core Networks. The Core Networks may implement multiple bearers that provide different QoS's for different service types, and can implement either or both of the NR (5G) and LTE (4G) Core Networks shown in FIG. 19. Multiple UEs can be assigned to a single bearer, i.e., a single bearer in the Core Network may carry traffic for multiple UEs.

After starting (STEP 2300) operations to utilize the Core Network (CN) Inactivity Timers to release a bearer, the packet streams in the communication traffic with each bearer in the EN are monitored (STEP 2302) in real time. This monitoring can be done at any node or other location where the traffic on the bearer can be monitored. The bearers can be monitored in parallel, or in any appropriate order. One, some, or all of the bearers in the EN may be monitored; but typically all of the bearers that have inactivity timers associated with them are monitored.

As shown at STEP (2304) the following operations are performed for each packet stream being monitored in real time. These operations may be performed in parallel or in series, and may be executed in the Core Network or other suitable location.

The service type for the packet stream is then identified (STEP 2306). Based upon the service type, bearer, and (optionally) time of day and day of week (time/day/week), the corresponding inactivity timer is selected (STEP 2312).

The packet stream, which is being monitored in real time (STEP 2302), is also monitored to determine the time elapsed since the last packet in the stream was received. The time elapsed is continually changing with time. FIG. 18 shows one example of a time elapsed 1950 following the seventh packet 1917.

Responsive to the elapsed time, a determination (STEP 2318) is made as to whether or not the elapsed time exceeds the inactivity time limit. For example in FIG. 18 if the inactivity time limit is at time 1940, then the time elapsed 1950 exceeds the inactivity time limit.

For each packet stream, if the inactivity time limit has been not been exceeded (STEP 2318), then operation returns to monitoring the packet stream (STEP 2302) and repeats the following steps for the packet stream until the network determines that an inactivity limit has been exceeded.

However, if the inactivity timer has been exceeded (from STEP 2318), then a decision (STEP 2340) will be made as to whether or not to release or modify (release/modify) the UE's bearer assignment, (the "bearer assignment" is the bearer assigned to the UE whose packet stream inactivity timer has been exceeded). In order to make a decision, consideration (STEP 2320) may be made of one or more one or more factors, which typically relate to network conditions. Some factors that may be considered in determining whether or not to release/modify (e.g., release or downgrade) a bearer assignment after its inactivity timer has been exceeded include:
Congestion level in the network, predicted and/or current,
Location of congestion (e.g. congestion on the bearer assigned to the UE, or elsewhere in the network),
Expected Lull Time
Probability of reconstructing the bearer for the UE,
Cost of reconstruction of the bearer,
Number of available bearers implemented in the network,
Service Type Priority
UE Type, and
Physical location of UE.
(39) Release Decision Factors One important release/modify decision factor is the congestion level of the network, current and/or predicted, and location. Therefore, the congestion level is determined (STEP 2322) and supplied as an input (DATA 2332) to the release decision (STEP 2340). The congestion itself may be localized (e.g. on particular bearer or bearers), or the congestion may exist substantially across the network, or in certain areas of the network. Knowing where the congestion is located can be useful; for example if the bearer assigned to the UE is not congested, then it may not be useful to release or downgrade the bearer; on the other hand, if the bearer is congested, or in a part of the network that is congested, then that can be an important factor in deciding to release/downgrade the bearer. Predicted and current congestion are determined. Predicting and observing congestion is discussed in detail elsewhere in this specification, for example beginning with the section titled Overview of a Network Load Control System, and in the figures beginning at FIG. 14A, methods and apparatus for predicting and observing congestion and responding to congestion, are described therein. A congestion occurrence may be observed or predicted using any appropriate technique, including the techniques described therein.

Another release/modify decision consideration is the probability that the bearer for the UE will need to be reconstructed, if it is released. Therefore, the probability of reconstruction is assessed (STEP 2324) and supplied as an input (DATA 2334) to the release decision (STEP 2340). Often, the longer the lull, the less the reconstruction probability, however if some types of communication are detected, then a longer (or shorter) lull may be expected. As part of the probability determination, the packet communications can be analyzed to determine if the session is likely to continue, for example if a long session is being observed, then the session may be more likely to continue after the expected lull period than if shorter sessions are being observed. Also, if the end of a page is observed, then a longer lull is more likely, and the probability of reconstruction will be higher during an expected time that the page is being read, such as 40-50 seconds.

A number of other inputs may be considered (STEP 2326) and supplied as inputs (DATA 2336) to the decision (STEP 2340) as to whether or not to release/modify the bearer assignment, or to downgrade to a lower throughput. These inputs include the reconstruction cost, which is the time and resources that will be required to reconstruct the bearer assignment if it is released. A smaller reconstruction cost increases the likelihood of releasing the bearer assignment, a higher reconstruction cost suggests that release should be avoided or delayed. The service type priority can also be a factor; for example a higher priority service type such a voice call may treated differently from a lower priority service such as a data download. Certain users may have priority in the EN, too, and that may also be a consideration. Additionally, the number of bearers available in the network, the UE type, the UE's subscription type, and the UE's location may all be considered in the decision (STEP 2340) as to whether or not to release the bearer assignment.

Another release/modify decision factor is the expected lull time. For example if the expected lull time is 55 seconds and the cost of reconstruction is low, then it may be advantageous for the EN to release the UE from the bearer, and allow other traffic to use the bearer until reconstruction is needed. However, if the cost of reconstruction is high or the expected lull period is short (e.g. 3 seconds), then it may be better for the EN to maintain the UE's assignment on the bearer.

If the network decides (at STEP 2340) not to release or modify the UE's bearer assignment, then operation may return to monitoring the bearer (STEP 2302) and repeats the following steps, or may wait and continue to monitor the packet stream until more time has elapsed. However, if the network decides (at STEP 2340) to release the UE from the bearer, then the Core Network is directed to release the bearer assignment (STEP 2350), using conventional network operations. For another option, the network can decide to modify the bearer (STEP 2352) and by how much to modify or downgrade. Modifying (e.g., downgrading) a bearer's QoS instead of completely releasing the bearer can be advantageous because service continuity is maintained, which may still meet the needs of the UE although at a lower quality. Additionally, a larger number of UEs may be accommodated on the bearer at a lower QoS. After either the bearer assignment is released (STEP 2350) or modified (STEP 2352), operation then returns to monitoring the packet streams (STEP 2302), and repeating the following steps to monitor network operations in real time utilizing the inactivity timer for more efficient operation.

(40) Utilizing RAN Inactivity Timer to Release RRC Connection

FIG. 24 is a flowchart of operations to utilize the previously-determined (see FIG. 21) RRC connection inactivity timer and inactivity time limits for the RAN. Generally, each RAN connection (each bearer) is assigned to a single UE, however some of the steps in FIG. 24 are similar to the steps shown in FIG. 23.

After starting (STEP 2400) operations to utilize the RAN Inactivity Timers to release a RRC connection (bearer), the packet stream in each RRC connection in the RAN are monitored (STEP 2402). This monitoring can be done at any node or other location where the traffic on the RRC connection can be monitored. The connections can be monitored in parallel, or in any appropriate order. One, some, or all of the connections in the RAN may be monitored; but typically all of the connections that have inactivity timers associated with them are monitored.

As shown at STEP (2404) the following operations are performed for each RRC packet stream being monitored in real time. These operations may be performed in parallel or in series, and may be executed in the Core Network, the RAN, or other suitable location.

The service (e.g. UE) type for the RRC packet stream is then identified (STEP 2306). Based upon the service type, RRC connection, and (optionally) time of day and day of week (time/day/week), the corresponding RRC inactivity timer is selected (STEP 2412).

The RRC packet stream, which is being monitored in real time (STEP 2402), is also monitored to determine the time elapsed since the last packet in the stream was received. The time elapsed is continually changing with time. FIG. 18 shows one example of a time elapsed 1950 following the seventh packet 1917.

Responsive to the elapsed time, a determination (STEP 2418) is made as to whether or not the elapsed time exceeds the inactivity time limit. For example in FIG. 18 if the inactivity time limit is at time 1940, then the time elapsed 1950 exceeds the inactivity time limit.

For each RRC packet stream, if the inactivity time limit has been not been exceeded (STEP 2418), then operation returns to monitoring the packet stream (STEP 2402) and repeats the following steps for the packet stream (and other packet streams) until the network determines that an RRC inactivity limit has been exceeded.

However, if the RRC inactivity timer has been exceeded (from STEP 2418), then a decision (STEP 2440) will be made as to whether or not to release the UE's bearer (RRC Connection). In order to make a decision, consideration (STEP 2420) may be made of one or more one or more factors, which typically relate to network conditions. Some factors that may be considered in determining whether or not to release an RRC Connection after its inactivity timer has been exceeded include:

Congestion level in the network, predicted and/or current,
Location of congestion (e.g. congestion on the bearer assigned to the UE, or elsewhere in the network),
Expected Lull Time
Probability of reconstructing the RRC connection,
Cost of reconstruction of the RRC connection, which can be significant,
UE type, priority, and physical location.

(41) RRC Connection Release Decision Factors

One important factor in the RRC connection context is the cost of reconstruction; constructing an RRC connection can consume significant time and resources, for example the cost of teardown and reconstruction of an RRC connection can be several seconds or more (e.g. 10 seconds); in comparison the cost of teardown and reconstruction of a CN bearer which may be on the order of 100-300 milliseconds. Therefore, the RRC connection may only be released when there is a high likelihood that it will not be needed soon, or if the expected lull time is long. If the expected lull time is short (e.g. 10 seconds) then it will likely not be worthwhile to release the RRC connection due to the cost of reconstruction.

Another release decision factor is the congestion level in the RAN, current and/or predicted, and location of the congestion. Therefore, the congestion level is determined (STEP 2422) and supplied as an input (DATA 2432) to the connection release decision (STEP 2440). The congestion itself may be localized (e.g. on particular connection or connections), or the congestion may exist substantially across the RRC or other network areas, or in certain areas of the RRC. Knowing where the congestion is located can be useful; for example if the target connection is not congested, then it may not be useful to release the connection; on the other hand, if the connection is congested, or in a part of the network that is congested, then that can be an important factor in deciding to release the connection. Predicted and current congestion may be determined. Predicting and observing congestion is discussed in detail elsewhere in this specification, for example beginning with the section titled Overview of a Network Load Control System, and in the figures beginning at FIG. 14A, methods and apparatus for predicting and observing congestion and responding to congestion, are described therein. A congestion occurrence may be observed or predicted using any appropriate technique, including the techniques described therein.

Another release decision consideration is the probability that the target connection will need to be reconstructed and cost of reconstruction, if it is released. If an RRC connection is terminated, the cost of reconstruction is typically much higher than for a bearer in the core network. The cost of reconstruction of an RRC connection includes the control signaling that will be required to re-establish the connection, and the negative impact to service continuity experienced by the UE. The higher reconstruction cost suggests that release of an RRC connection should be delayed or avoided unless there is a low probability of reconstruction. Therefore the probability of reconstruction is assessed (STEP 2424) and supplied as an input (DATA 2434) to the release decision (STEP 2440). Often, the longer the lull, the less the reconstruction probability, however if some types of communication are detected, then a longer (or shorter) lull may be expected. As part of the probability determination, the packet communications can be analyzed to determine if the session is likely to continue, for example if a long session is being observed, then the session may be more likely to continue after the expected lull period than if shorter sessions are being observed. Also, if the end of a page is observed, then a longer lull is more likely, and the probability of reconstruction will be higher during an expected time that the page is being read, such as 40-50 seconds.

A number of other factors may be considered (STEP 2426) and supplied as inputs (DATA 2436) to the decision (STEP 2440) as to whether or not to release the target connection. The User Type can be a factor; for example a higher priority User Type may treated differently from a lower priority User Type. Additionally, the number of connections available in the network, the UE's subscription type, and the UE's location may all be considered in the decision (STEP 2440) as to whether or not to release the target connection.

If the network decides (at STEP 2440) not to release the RAN connection, then operation returns to monitoring the RRC connection (STEP 2402) and repeats the following steps. However, if the network decides (at STEP 2440) to release the RAN connection, then the Core Network directs the RRC to release the wireless connection with the UE (STEP 2450), using conventional network operations such as releasing the UE from the RRC connected mode, which transitions the UE to the idle mode.

Operation then returns to monitoring the connection (STEP 2402), and repeats the following steps to monitor network operations in real time utilizing the RRC inactivity timer.

(42) Utilizing Wi-Fi Inactivity Timer to Release UEs from Wi-Fi Network

FIG. 25 is a flowchart of operations to utilize the previously-determined (see FIG. 22) Wi-Fi inactivity timer and inactivity time limits for the Wi-Fi network. Unlike core network bearers and RRC connections, the UEs are not assigned guaranteed communication paths in bearers, instead, one or more UEs request communication channels in a Wi-Fi network, requests which the Wi-Fi network may grant by authorizing temporary use of one or more channels to a UE, or deny depending upon factors such as channel availability and user priority. For purposes herein a UE-WiFi packet stream will reference all packet communications of a single UE over a Wi-Fi network, and releasing a UE will reference all methods by which a UE can be prevented from accessing a Wi-Fi network, such as instructing the UE directly.

After starting (STEP 2500) operations to utilize the Wi-Fi Inactivity Timers to release UE, the UE-WiFi packet streams in the Wi-Fi Network are monitored (STEP 2502). This monitoring can be done at any node or other location where the traffic on the Wi-Fi network can be monitored. The UE-WiFi packet streams can be monitored in parallel, or in any appropriate order. One, some, or all of the node connections in the Wi-Fi network may be monitored; but typically all of the node connections that have inactivity timers associated with them are monitored.

As shown at STEP (2504) the following operations are performed for each UE-WiFi packet stream being monitored in real time. These operations may be performed in parallel or in series, and may be executed in the Core Network, the Wi-Fi network, or other suitable location.

The service (e.g. UE) type for the UE-WiFi packet stream is then identified (STEP 2306). Based upon the service type, and (optionally) time of day and day of week (time/day/week), the corresponding Wi-Fi inactivity timer is selected (STEP 2512).

The Wi-Fi packet stream, which is being monitored in real time (STEP 2502), is also monitored to determine the time elapsed since the last packet in the stream was received. The time elapsed is continually changing with time. FIG. 18 shows one example of a time elapsed 1950 following the seventh packet 1917.

Responsive to the elapsed time, a determination (STEP 2518) is made as to whether or not the elapsed time exceeds the inactivity time limit. For example in FIG. 18 if the inactivity time limit is at time 1940, then the time elapsed 1950 exceeds the inactivity time limit.

For each Wi-Fi packet stream, if the inactivity time limit has been not been exceeded (STEP 2518), then operation returns to monitoring the packet stream (STEP 2502) and repeats the following steps for the packet stream (and other packet streams) until the network determines that a Wi-Fi inactivity limit has been exceeded.

However, if the Wi-Fi inactivity timer has been exceeded (from STEP 2518), then a decision (STEP 2540) will be made as to whether or not to release the UE from the Wi-Fi Network. In order to make a decision, consideration (STEP 2520) may be made of one or more one or more factors, which typically relate to network conditions. Some factors that may be considered in determining whether or not to release a UE after its inactivity timer has been exceeded include:

Congestion level in the network, predicted and/or current,
Location of congestion (e.g. congestion on the bearer assigned to the UE, or elsewhere in the network),
Expected Lull Time
Probability that the UE will need the Wi-Fi network,
UE type, priority, and physical location.

(43) UE Release Decision Factors

One release decision factor is the congestion level in the Wi-Fi network or other networks in the EN, current and/or predicted, and location of the congestion. Therefore, the congestion level is determined (STEP 2522) and supplied as an input (DATA 2532) to the connection release decision (STEP 2540). The congestion itself may be localized (e.g. on particular connection or connections), or the congestion may exist substantially across the Wi-Fi or other network areas, or in certain areas of the Wi-Fi network. Knowing where the congestion is located can be useful; for example if the target connection is not congested, then it may not be useful to release the connection; on the other hand, if the connection is congested, or in a part of the network that is congested, then that can be an important factor in deciding to release the connection. Predicted and current congestion may be determined. Predicting and observing congestion is discussed in detail elsewhere in this specification, for example beginning with the section titled Overview of a Network Load Control System, and in the figures beginning at FIG. 14A, methods and apparatus for predicting and observing congestion and responding to congestion, are described therein. A congestion occurrence may be observed or predicted using any appropriate technique, including the techniques described therein.

The probability that the UE may need the Wi-Fi network and cost of later access (if needed) may be assessed (STEP 2424) and supplied as an input (DATA 2434) to the release decision (STEP 2440); however this is usually not a significant consideration for Wi-Fi compared to the other considerations.

A number of other factors may be considered (STEP 2526) and supplied as inputs (DATA 2536) to the decision (STEP 2540) as to whether or not to release the target connection. The User Type can be a factor; for example a higher priority User Type may treated differently from a lower priority User Type. Additionally, the UE's subscription type, and the UE's location may all be considered in the decision (STEP 2540) as to whether or not to release the UE.

If the network decides (at STEP 2540) not to release the UE, then operation returns to monitoring the UE-WiFi packet streams (STEP 2502) and repeats the following steps. However, if the network decides (at STEP 2540) to release the UE, then the UE is directed to be released (STEP 2550), using conventional network operations. For example the context of WiFi association with UE can be deleted, although not preferred. The UE can be directed to stop sending data to the Wi Fi network. Alternatively, the Wi-Fi Network can change QoS by changing time to re-request channel to a very long time, thereby practically removing the UE from the Wi-Fi Network.

Operation then returns to monitoring the UE-WiFi packet streams (STEP 2502), and repeats the following steps to monitor network operations in real time utilizing the Wi-Fi inactivity timer.

(44) EN implementation of Inactivity Timer

FIG. 26 is a block diagram of Bearer Inactivity Timer Processing Units 2600 (shown in the Core Network 820 in the EN of FIG. 8, which illustrates one implementation of inactivity timers to proactively release the network's bearers. All these units and modules are interconnected by any appropriate network structure, circuits, and controlled by appropriate logic circuits.

The bearers include Core Network (CN) Bearers 2602 (examples are shown in FIG. 18 at 1818 and 1828), and RRC connection bearers (examples are shown in FIG. 18 at 1814 and 1824). A Wi-Fi communication node 2606 in a Wi-Fi network 2608 is connected to a Wi-Fi Monitoring and Data Processing Unit 2616 in the Core Network.

As in FIG. 8, the Core Network 820 is connected to a RAN 810 that is wirelessly connected to a plurality of UEs 820. The CN bearers 2602 reside within the Core Network 820, the RRC Connections (Bearers) 2604 reside within the RAN 810, and the Wi-Fi Bearers 2606 reside within the Wi-Fi Network 2608. In many embodiments the processing of the data from the bearers will be performed in the Core Network 820, in the units shown in FIG. 26. In alternative embodiments some or all of the processes may be done outside the core network, such as in the RAN or the cloud-based network orchestration module 830 shown in FIG. 8.

The bearers and nodes are connected to a Packet Stream Monitoring and Data Processing (DP) Module 2610 within the Core Network 2600 that include units for monitoring and initial processing of the monitored data. In alternative embodiments some of the monitoring and data processing may be done outside the core network, such as in the RAN or the cloud-based network orchestration module 830 shown in FIG. 8. Particularly, the CN bearers 2602 are connected to a CN Bearer Monitoring and DP Unit 2612 in the Monitoring and DP Module 2610, the RRC Connection (Bearers) 2604 are connected to a RRC Connection Monitoring and DP Unit in the Monitoring and DP Module 2610, and the Wi-Fi Node(s) 2606 are connected to a Wi-Fi Bearer Monitoring and Data Processing Unit 2616 in the Bearer Monitoring and DP Module 2610.

The CN Bearer Monitoring and DP Unit 2612 is connected at a node to monitor the packet traffic on the bearers in the core network, collect and process the data to sort the data by different service types for each bearer, optionally apportion the data by time of day/day of week, and supply the processed data to an inter-burst packet arrival time unit 2620. The inter-burst packet arrival time unit 2620 utilizes the processed data to provide CN inter-burst packet arrival results to the inactivity timer learning unit 2630.

The RRC Connection Monitoring and DP Unit 2614 monitors the packet traffic on the RRC connections, collects the data, optionally apportions the data by time of day/day of week, and supplies the processed data to the inter-burst packet arrival time unit 2620, which utilizes the processed data to provide RAN inter-burst packet arrival results to the inactivity timer learning unit 2630.

The Wi-Fi Monitoring and DP Unit 2616 monitors the packet traffic on the Wi-Fi Network, processes the data to sort the data, optionally apportions the data by time of day/day of week, and supplies the processed data to the inter-burst packet arrival time unit 2620, which utilizes the processed data to provide Wi-Fi inter-burst packet arrival results to the inactivity timer learning unit 2630.

The inactivity timer learning unit 2630 receives the CN, RAN, and Wi-Fi inter-burst packet arrival results, and responsive thereto, learns inactivity timers for each of CN, RAN, and Wi-Fi packet streams by type, optionally by time of day/day of week. For the CN bearers, the timers are divided by service type, for example a bearer may have different timers for voice traffic, video traffic, and download traffic. The inactivity timer learning unit 2630 includes machine learning and other AI circuitry to support the process of learning inactivity timers.

The Inactivity Timer Learning Unit 2630 supplies the resulting timers to the Timer Data Storage Unit 2640, from which they become available to a UE Release Decision Unit 2650. Particularly, the CN Inactivity timers 2642 are stored in the Inactivity Timer Learning Unit 2630 and made available to a CN Bearer Release Unit 2652. The RAN Inactivity timers 2644 are stored in the Inactivity Timer Learning Unit 2630 and made available to a RRC Connection Release Unit 2654. The Wi-Fi Inactivity timers 2646 are stored in the Inactivity Timer Learning Unit 2630 and made available to a UE (Wi-Fi) Release Unit 2656.

The UE Release Decision Unit 2650 includes a CN Bearer Release Unit 2652 connected to the CN Inactivity Timers 2642, a RRC Connection Release Unit 2654 connected to the RAN Inactivity Timers 2644, a UE (Wi-Fi) Release Unit 2656 connected to the Wi-Fi Inactivity Timers 2646, and a Decision Management Unit 2658 that can determine which type of bearer (CN, RAN or Wi-Fi), if any, to release when a timer is exceeded. The Decision Management Unit 2658 in conjunction with the CN Release Bearer Unit 2652 can also determine whether to modify (e.g., downgrade) a bearer instead of completely releasing it.

The UE Release Decision Unit 2650, in addition to connection to the Timer Storage Unit 2640, is connected to receive a number of inputs that are useful in making a decision whether to release a bearer, downgrade a bearer, delay release, or continue communications without interruption. The UE Release Decision Unit 2650 is connected to receive Inter-Burst Packet Arrival Time results, including the expected lull period, in real time or near real time, from the each of the networks being monitored. The units in the UE Release Decision Unit 2650 determine if the inactivity limit has been exceeded, and if so, determines whether or not to release a UE, downgrade a bearer, delay release, or continue communications without interruption utilizing a number of inputs including congestion, reconstruction probability, UE data, and other release decision considerations.

A Congestion Monitoring Unit 2660 is connected to receive UE data, network data, and determine congestion in the EN, such as shown in FIG. 11 and elsewhere herein. The congestion monitoring unit determines current congestion and its location, and also may predict congestion based upon time of day and day of week, and is connected to supply these inputs to the UE Release Decision Unit 2650.

A Reconstruction Probability Assessment Unit 2670 is connected to the UE Release Decision Unit 2650 to receive information about the UE and bearer whose timer has been exceeded and estimate the probability that it will need to be reconstructed.

Additional release considerations 2680 may be supplied to the UE Release Decision Unit 2650, such as service type, cost of reconstruction of connection, the number of available bearers implemented in the network, and the physical location of the UE.

UE Data 2690 regarding the UEs whose inactivity timer has been exceeded may also be supplied to the UE Release Decision Unit 2650. This data may include for example its device type and capabilities, and any other information useful to make the decision.

The UE Decision Release Unit 2650, is connected to the appropriate elements in the Core Network 820 that can direct release of the UE or modify/downgrade the bearer to a lower QoS.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of releasing a wireless User Equipment device (UE) from a bearer assigned to the UE by a wireless Enterprise Network (EN) to provide an assigned path for a packet stream with the UE, the EN providing bearers that define assigned paths for a plurality of packet streams with a plurality of UEs, comprising:
   learning a plurality of inactivity timers comprising
      monitoring a plurality of packet streams in the EN over a period of time,
      determining the service type of each of the plurality of packet streams,
      responsive to the packet streams, bearers, and service types, determining an inter-burst packet arrival time for each service type and bearer, and
      responsive to said inter-burst arrival time, learning a timer for each service type and bearer, including an inactivity time limit;
   monitoring a plurality of packet streams in the EN in real time, including determining a service type and bearer for each packet stream;
   responsive to the service type and bearer, selecting an inactivity timer including an inactivity time limit for each packet stream;
   responsive to the inactivity time limit for each packet stream, determining whether or not to release a UE from the bearer associated with said UE; and
   if a determination is made to release said UE from the bearer, then releasing said UE.

2. The method of claim 1 further comprising:
   the step of learning a plurality of inactivity timers includes monitoring the time when the packet streams were received;
   the step of determining the inter-burst packet arrival time is also responsive to said time when the packet streams were received;
   the step of learning a timer includes learning the timer also responsive to said time; and
   the step of selecting an inactivity timer is also responsive to said time.

3. The method of claim 1 wherein the step of determining whether or not to release a UE includes:
   determining an elapsed time after receiving the last packet in each packet stream;
   comparing the elapsed time with the inactivity time limit; and
   if the elapsed time does not exceed the inactivity time limit, then continuing to monitor the packet streams; and
   if the elapsed time exceeds the inactivity time limit, then determining whether or not to release the UE from the bearer associated with at least one of the real-time packet streams.

4. The method of claim 1 wherein the step of determining whether or not to release the UE is also responsive to at least one of:
   current day of week/time of day;
   an expected lull time;
   current congestion level;
   congestion location in the network;
   congestion level predicted by time and day of week;
   reconstruction cost;
   number of bearers implemented by the EN;
   UE type;
   UE's subscription type, and
   UE location.

5. The method of claim 1 wherein the plurality of bearers includes a RAN bearer and a Core Network bearer.

6. The method of claim 1 wherein the step of determining whether or not to release a bearer includes determining whether to release, modify, or maintain current status of the bearer.

7. The method of claim 6 wherein step of determining an inactivity timer responsive to the inter-burst packet arrival time also includes determining an expected lull time, and the step of determining whether or not to release a bearer is also responsive to the expected lull time, reconstruction cost, and congestion in the network.

8. The method of claim 1 further including a Wi-Fi network connected to the Core Network, wherein a plurality of UEs are connected to the Wi-Fi network and the Core Network, each UE having a Wi-Fi packet stream, and including the steps of:
monitoring the Wi-Fi packet streams,
determining a service type and an inter-burst packet arrival time for each packet stream;
learning a Wi-Fi inactivity timer, including an inactivity time limit for each service type responsive to the inter-burst packet arrival times for each corresponding service type;
monitoring real time Wi-Fi packet streams from a plurality of UEs, including determining a service type for each packet stream; and
responsive to said service type, selecting a Wi-Fi inactivity timer;
responsive to said real time monitoring and said Wi-Fi inactivity timer for a packet stream, determining whether or not to release the UE from the Wi-Fi network; and
if a determination is made to release said UE from the bearer, then releasing said UE.

9. A method of releasing a wireless User Equipment device (UE) from a core network bearer of packet-based communication traffic assigned to the UE by a wireless Enterprise Network (EN) that includes a core network, the communication traffic on the core network bearer including a plurality of packet streams respectively associated with a plurality of UEs connected to a wireless Enterprise Network (EN) communication system, comprising:
learning a timer including an inactivity time limit and an expected lull time for the service types being communicated on the bearer, comprising:
monitoring a plurality of packet streams on the bearer over a period of time,
determining the service type of each of the plurality of packet streams,
responsive to the packet streams, service type and time when the packet stream was received, for each service type and bearer, determining an inter-burst packet arrival time as a function of time, and
responsive to the inter-burst arrival time, learning an inactivity timer for each service type on each bearer as a function of time, including an inactivity time limit and an expected lull time;
monitoring packet streams on the bearer in real time, including determining a service type and bearer for each packet stream;
responsive to the service type and bearer for each packet stream, and current time, selecting an inactivity timer including an inactivity time limit;
responsive to the inactivity time limit for each packet stream, determining whether or not to release a UE from the bearer associated with said UE; and
if a determination is made to release said UE from the bearer, then releasing said UE.

10. The method of claim 9 wherein said time includes time of day and day of week.

11. The method of claim 9 wherein the step of determining whether or not to release a UE includes:
determining an elapsed time after receiving the last packet in each packet stream;
comparing the elapsed time with the inactivity time limit; and
if the elapsed time does not exceed the inactivity time limit, then continuing to monitor the packet streams;
if the elapsed time exceeds the inactivity time limit, then determining whether or not to release the UE from the bearer associated with at least one of the real-time packet streams.

12. The method of claim 9 wherein the step of determining whether or not to release a bearer includes determining whether to release, modify, or maintain current status of the bearer.

13. The method of claim 12 wherein the step of determining whether or not to release the UE is also responsive to at least one of:
current day of week/time of day;
the expected lull time;
current congestion level;
congestion location in the network;
congestion level predicted by time and day of week;
reconstruction cost;
number of bearers implemented by the EN;
UE type;
the UE's subscription type, and
UE location.

14. The method of claim 9 wherein the Core Network includes at least one of a CBRS network, an 4G (LTE) network, and a 5G (NR) network.

15. The method of claim 9 further including a Wi-Fi network connected to the Core Network, wherein a plurality of UEs are connected to the Wi-Fi network and the Core Network, each UE having a Wi-Fi packet stream, and including the steps of:
monitoring the Wi-Fi packet streams,
determining a service type and an inter-burst packet arrival time for each packet stream;
learning a Wi-Fi inactivity timer, including an inactivity time limit for each service type responsive to the inter-burst packet arrival times for each corresponding service type;
monitoring real time Wi-Fi packet streams from a plurality of UEs, including determining a service type for each packet stream; and
responsive to said service type, selecting a Wi-Fi inactivity timer;
responsive to said real time monitoring and said Wi-Fi inactivity timer for a packet stream, determining whether or not to release the UE from the Wi-Fi network; and
if a determination is made to release said UE from the bearer, then releasing said UE.

16. A network apparatus for proactively releasing UEs from bearers of packet-based communication traffic in a wireless Enterprise Network (EN) communication system, comprising:
a packet stream monitoring and data processing module for monitoring, collecting, and processing packet stream data on communication traffic on at least one of said bearers;
an inter-burst packet arrival time unit connected to said module for calculating the interpacket arrival time responsive to said packet stream data;
an inactivity timer learning unit for learning an inactivity timer including an inactivity limit and an expected lull time responsive to said inter-burst packet arrival time;
a data storage unit for storing said inactivity timer; and
a UE release decision unit responsive to said inactivity timer.

17. The network apparatus of claim 16 further comprising:
- a congestion monitoring unit connected to the UE release decision unit; and
- a reconstruction probability assessment unit connected to the UE release decision unit.

18. The network apparatus of claim 16 wherein the EN comprises a core network that includes a core network bearer that communicates a plurality of packet streams respectively associated with a plurality of UEs connected to a wireless Enterprise Network (EN) communication system, and further comprising a core network bearer monitoring and data processing unit in the packet stream monitoring and data processing module.

19. The network apparatus of claim 16 wherein the EN comprises a Citizen's Broadband Radio Service (CBRS) system.

* * * * *